United States Patent
Wang et al.

(10) Patent No.: US 7,609,829 B2
(45) Date of Patent: Oct. 27, 2009

(54) MULTI-PLATFORM CAPABLE INFERENCE ENGINE AND UNIVERSAL GRAMMAR LANGUAGE ADAPTER FOR INTELLIGENT VOICE APPLICATION EXECUTION

(75) Inventors: Sandy Chai-Jen Wang, Hayward, CA (US); Arumugam Appadurai, Sunnyvale, CA (US); John Robert LaBarge, Palo Alto, CA (US); Margaret Ann Boothroyd, San Francisco, CA (US); Cory Andrew Luellen, Mountain View, CA (US); Mang Kang Yong, Menlo Park, CA (US); Leo K. Chiu, Daly City, CA (US)

(73) Assignee: Apptera, Inc., San Bruno, CA (US)

( * ) Notice: Subject to any disclaimer, the term of this patent is extended or adjusted under 35 U.S.C. 154(b) by 925 days.

(21) Appl. No.: 10/803,851

(22) Filed: Mar. 17, 2004

(65) Prior Publication Data

US 2004/0225499 A1 Nov. 11, 2004

Related U.S. Application Data

(63) Continuation-in-part of application No. 10/613,857, filed on Jul. 2, 2003, now Pat. No. 7,242,752, which is a continuation-in-part of application No. 10/190,080, filed on Jul. 2, 2002, which is a continuation-in-part of application No. 10/173,333, filed on Jun. 14, 2002.

(60) Provisional application No. 60/523,042, filed on Nov. 17, 2003, provisional application No. 60/302,736, filed on Jul. 3, 2001.

(51) Int. Cl.
*H04M 3/42* (2006.01)
*H04M 5/00* (2006.01)

(52) U.S. Cl. .............................. 379/201.01; 379/265.01

(58) Field of Classification Search ............................... 379/201.01–201.03, 265.01–265.14
See application file for complete search history.

(56) References Cited

U.S. PATENT DOCUMENTS

| 2002/0032564 A1* | 3/2002 | Ehsani et al. ............... 704/235 |
| 2004/0083092 A1* | 4/2004 | Valles ........................... 704/9 |

OTHER PUBLICATIONS

U.S. Appl. No. 60/523,042, Wang et al.
U.S. Appl. No. 10/173,333, Yuen et al.
U.S. Appl. No. 60/302,736, Yuen et al.
U.S. Appl. No. 10/190,080, Yuen et al.
U.S. Appl. No. 10/613,857, Chiu.

* cited by examiner

*Primary Examiner*—William J Deane
(74) *Attorney, Agent, or Firm*—Steven R. Sponseller; Stevens Law Group

(57) ABSTRACT

A voice application creation and deployment system includes a voice application server for creating and serving voice applications to clients over a communication network; at least one voice portal node having access to the communication network, the portal node for facilitating client interaction with the voice applications; and an inference engine executable from the application server. In a preferred embodiment the inference engine is called during one or more predetermined points of an ongoing voice interaction to decide whether an inference of client need can be made based on analysis of existing data related to the interaction during a pre-determined point in an active call flow of the served voice application, and if an inference is warranted, determines which inference dialog will be executed and inserted into the call flow.

15 Claims, 44 Drawing Sheets

Dialog Design Window

| Dialog Design Panel | Save Dialog | Save and Close | Undo Changes |
|---|---|---|---|

Route from John Doe
Route to Jane Doe

| Dialog Name | Field Support |
|---|---|
| Dialog Description | Machine number <resource: Machine_code/> is broken. Are you available to fix it? |

— 1301

— 1302

Radio Dialog Expected Responses

| Response | Follow-Up Action | | | | | | |
|---|---|---|---|---|---|---|---|
| ☐ Yes | ○ No Action | ○ Connect | Select ▼ | ○ Send R-Dialog | To | Select ▼ | Details |
| ☐ No | ○ No Action | ○ Connect | Select ▼ | ○ Send Request | To | John Doe ▼ | Details |

| Create New Responses | Delete Dialog Response |
|---|---|

Route-to Connection Exceptions

— 1303

| Exception | Follow-Up Action | | | | | |
|---|---|---|---|---|---|---|
| Caller Reject | ○ No Action | ○ Redial | ○ Send RR ▼ | To | John Doe ▼ | Details |
| Line Busy | ○ No Action | ○ Redial | ○ Send RR ▼ | To | John Doe ▼ | Details |
| Voice Mail | ○ No Action | ○ Redial | ○ Send RR ▼ | To | John Doe ▼ | Details |

| Save Dialog | Save and Close | Undo Changes |
|---|---|---|

Dialog Design Window

*Fig. 13*

```xml
<?xml version="1.0"?>
<GRAMMAR toplevel="YesNo" mode="1">
<ANDGRAMMAR name="ROOT" return="yes" scope="public">
<ITEMLIST>
<ITEM type="rule">Boolean</ITEM>
</ITEMLIST>
</ANDGRAMMAR>
<ANDGRAMMAR name="Boolean" return="yes" scope="public">
<ITEMLIST>
<ITEM repeat="0-1" type="rule" type="0.01">PreFiller</ITEM>
<ITEM type="rule">YesNo</ITEM>
</ITEMLIST>
</ANDGRAMMAR>
<ORGRAMMAR name="PreFiller" return="no" scope="private">
<ITEMLIST>
<ITEM>hm</ITEM>
<ITEM>um</ITEM>
<ITEM>uh</ITEM>
</ITEMLIST>
</ORGRAMMAR>
 2 <ORGRAMMAR name="YesNo" return="yes" scope="private">
<ITEMLIST>
<ITEM type="rule">Yes</ITEM>
<ITEM type="rule">No</ITEM>
</ITEMLIST>
</ORGRAMMAR>
<ORGRAMMAR name="Yes" return="no" scope="private">
<ITEMLIST>
<ITEM type="text">yes</ITEM>
<ITEM type="text">yup</ITEM>
<ITEM type="text">yeah</ITEM>
<ITEM type="text">right</ITEM>
<ITEM type="text">correct</ITEM>
</ITEMLIST>
</ORGRAMMAR>
<ORGRAMMAR name="No" return="no" scope="private">
<ITEMLIST>
<ITEM type="text">no</ITEM>
<ITEM type="text">nope</ITEM>
<ITEM type="text">wrong</ITEM><ITEM type="text">incorrect</ITEM>
</ITEMLIST>
</ORGRAMMAR>
</GRAMMAR>
```

*Fig. 35*

```xml
<grammar xml:lang="en-US" version="1.0" root="YesNo" mode="voice">
<rule id="ROOT" scope="public">
<one-of>
<item tag="response=n0">
<item tag="n0=Boolean.response;"><ruleref uri="#Boolean"/></item>
</item>
</one-of>
</rule>
<rule id="Boolean" scope="public">
<one-of>
<item tag="response=n1">
<item weight="0.01" tag="n0=PreFiller.response;"><count number="optional"><ruleref uri="#PreFiller"/></count></item>
<item tag="n1=YesNo.response;"><ruleref uri="#YesNo"/></item>
</item>
</one-of>
</rule>
<rule id="PreFiller">
<one-of>
<item>hm</item>
<item>um</item>
<item>uh</item>
</one-of>
</rule>
<rule id="YesNo">
<one-of>
<item tag="response='yes';"><ruleref uri="#Yes"/></item>
<item tag="response='no';"><ruleref uri="#No"/></item>
</one-of>
</rule>
<rule id="Yes">
<one-of>
<item>yes</item>
<item>yup</item>
<item>yeah</item>
<item>right</item>
<item>correct</item>
</one-of>
</rule>
<rule id="No">
<one-of>
<item>no</item>
<item>nope</item>
<item>wrong</item>
<item>incorrect</item>
</one-of>
</rule>
</grammar>
```

*Fig. 36*

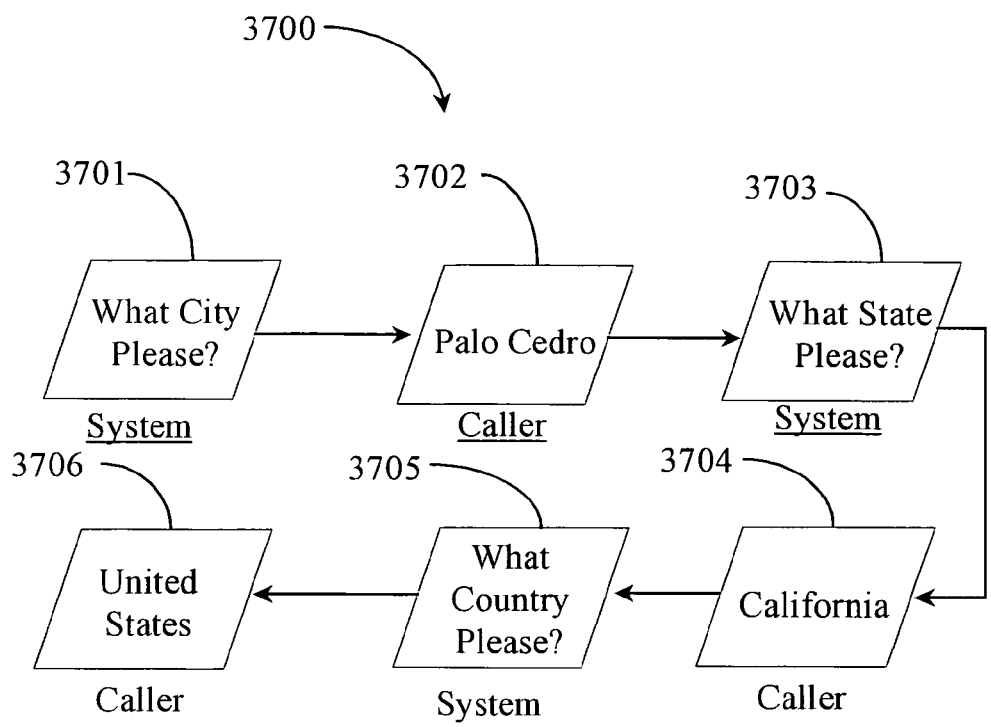
*Fig. 37A (prior art)*
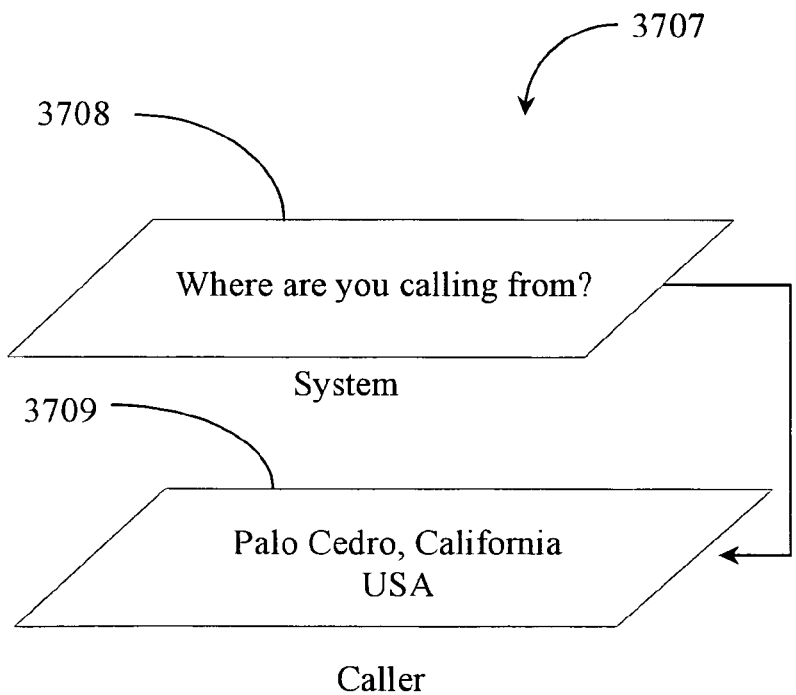
*Fig. 37B (multi-data capture)*

3800

Thank you for choosing
ABC books.
Your transaction is
complete.

System static response

*Fig. 38A (static-prior art)*

3801

You seem to prefer books on
nature.
Would like to subscribe to
our monthly wildlife news
service?

Content intelligent

*Fig. 38B*

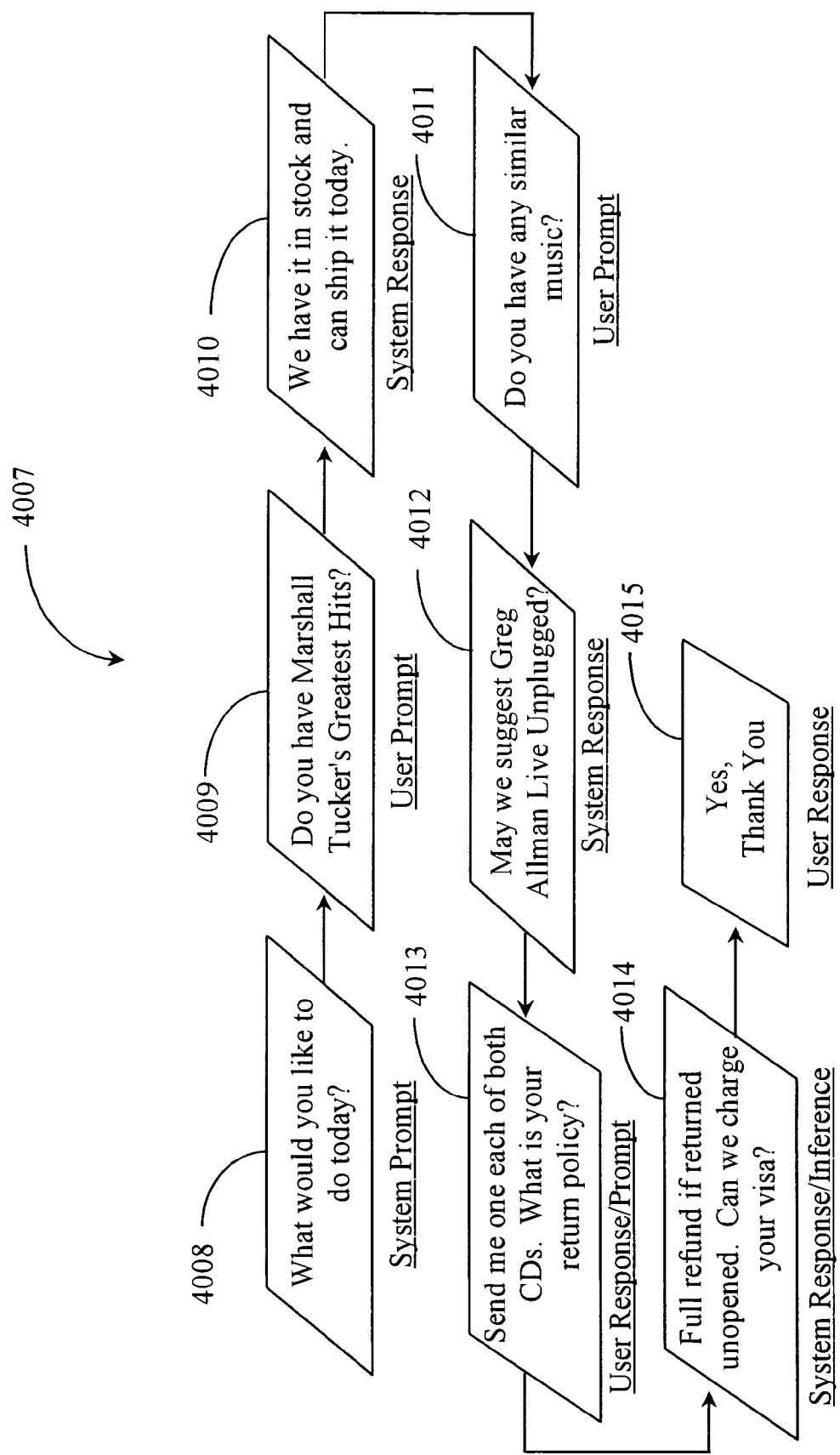
Fig. 40B (natural language recognition)

MULTI-PLATFORM CAPABLE INFERENCE ENGINE AND UNIVERSAL GRAMMAR LANGUAGE ADAPTER FOR INTELLIGENT VOICE APPLICATION EXECUTION

CROSS-REFERENCE TO RELATED DOCUMENTS

The present application claims priority to provisional application Ser. No. 60/523,042, filed on Nov. 17, 2003. The present invention also claims priority as a continuation in part of a U.S. patent application Ser. No. 10/613,857 filed Jul. 2, 2003, now U.S. Pat. No. 7,242,752 which is a continuation in part of a U.S. patent application Ser. No. 10/190,080, entitled "Method and Apparatus for Improving Voice recognition performance in a voice application distribution system" filed on Jul. 2, 2002, which is a continuation in part of U.S. patent application Ser. No. 10/173,333, entitled "Method for Automated Harvesting of Data from A Web site using a Voice Portal System", filed on Jun. 14, 2002, which claims priority to provisional application Ser. No. 60/302,736 filed Jul. 3, 2001. The instant application claims priority to the above-mentioned applications, and incorporates the disclosures in their entirety by reference.

FIELD OF THE INVENTION

The present invention is in the area of voice application software systems and pertains particularly to methods and apparatus for conducting automated voice transactions in a platform independent manner.

BACKGROUND OF THE INVENTION

A speech application is one of the most challenging applications to develop, deploy and maintain in a communications (typically telephony) environment. Expertise required for developing and deploying a viable application includes expertise in computer telephony integration (CTI) hardware and software, voice recognition software, text-to-speech software, and speech application logic.

With the relatively recent advent of voice extensive markup language (VXML) the expertise require to develop a speech solution has been reduced somewhat. VXML is a language that enables a software developer to focus on the application logic of the voice application without being required to configuring underlying telephony components. Typically, the developed voice application is run on a VXML interpreter that resides on and executes on the associated telephony system to deliver the solution.

As is shown in FIG. 1A (prior art) a typical architecture of a VXML-compliant telephony system comprises a voice application server (110) and a VXML-compliant telephony server (130). Typical steps for development and deployment of a VXML enabled IVR solutions are briefly described below using the elements of FIG. 1A.

Firstly, a new application database (113) is created or an existing one is modified to support VXML. Application logic 112 is designed in terms of workflow and adapted to handle the routing operations of the IVR system. VXML pages, which are results of functioning application logic, are rendered by a VXML rendering engine (111) based on a specified generation sequence.

Secondly, an object facade to server 130 is created comprising the corresponding VXML pages and is sent to server 130 over a network (120), which can be the Internet, an Intranet, or an Ethernet network. The VXML pages are integrated into rendering engine 111 such that they can be displayed according to set workflow at server 110.

Thirdly, the VXML-telephony server 130 is configured to enable proper retrieval of specific VXML pages from rendering engine 111 within server 110. A triggering mechanism is provided to server 110 so that when a triggering event occurs, an appropriate outbound call is placed from server 110.

A VXML interpreter (131), a voice recognition text-to-speech engine (132), and the telephony hardware/software (133) are provided within server 130 and comprise server function. In prior art, the telephony hardware/software 130 along with the VXML interpreter 131 are packaged as an off-the-shelf IVR-enabling technology. Arguably the most important feature, however, of the entire system is the application server 110. The application logic (112) is typically written in a programming language such as Java and packaged as an enterprise Java Bean archive. The presentation logic required is handled by rendering engine 111 and is written in JSP or PERL.

An enhanced voice application system is known to the inventor and disclosed in the U.S. patent application entitled "Method and Apparatus for Development and Deployment of a Voice Software Application for Distribution to one or more Application Consumers" to which this application claims priority. That system uses a voice application server that is connected to a data network for storing and serving voice applications. The voice application server has a data connection to a network communications server connected to a communications network such as the well-known PSTN network. The communication server routes the created voice applications to their intended recipients.

A computer station is provided as part of the system and is connected to the data network and has access to the voice application server. A client software application is hosted on the computer station for the purpose of enabling users to create applications and manage their states. In this system, the user operates the client software hosted on the computer station in order to create voice applications through object modeling and linking. The applications, once created, are then stored in the application server for deployment. The user can control and manage deployment and state of deployed applications including scheduled deployment and repeat deployments in terms of intended recipients.

In one embodiment, the system is adapted for developing and deploying a voice application using Web-based data as source data over a communications network to one or more recipients. The enhanced system has a voice application server capable through software and network connection of accessing a network server and Web site hosted therein and for pulling data from the site. The computer station running a voice application software has control access to at least the voice application server and is also capable of accessing the network server and Web site. An operator of the computer station creates and provides templates for the voice application server to use in data-to-voice rendering. In this aspect, Web data can be harvested from a Web-based data source and converted to voice for delivery as dialogue in a voice application.

In another embodiment, a method is available in the system described above for organizing, editing, and prioritizing the Web-based data before dialog creation is performed. The method includes harvesting the Web-based data source in the form of its original structure; generating an object tree representing the logical structure and content type of the harvested, Web-based data source; manipulating the object tree generated to a desired hierarchal structure and content; creating a voice application template in VXML and populating the template with the manipulated object tree; and creating a voice application capable of accessing the Web-based data source according to the constraints of the template. The method allows streamlining of voice application deployment and executed state and simplified development process of the voice application.

A security regimen is provided for the above-described system. The protocol provides transaction security between a Web server and data and a voice portal system accessible through a telephony network on the user end and through an XML gateway on the data source end. The regimen includes one of a private connection, a virtual private network, or a secure socket layer, set-up between the Web server and the Voice Portal system through the XML gateway. Transactions carried on between the portal and the server or servers enjoy the same security that is available between secure nodes on the data network. In one embodiment, the regimen further includes a voice translation system distributed at the outlet of the portal and at the telephone of the end user wherein the voice dialog is translated to an obscure language not that of the users language and then retranslated to the users language at the telephone of the user.

In such as system where templates are used to enable voice application dialog transactions, voice application rules and voice recognition data are consulted for the appropriate content interpretation and response protocol so that the synthesized voice presented as response dialog through the voice portal to the user is both appropriate in content and hopefully error free in expression. The database is therefore optimized with vocabulary words that enable a very wide range of speech covering many different vocabulary words akin to many differing business scenarios.

According to yet another aspect of the invention, vocabulary recognition is tailored for active voice applications according to client parameters. This is accomplished through a vocabulary management system adapted to constrain voice recognition processing associated with text-to-speech and speech-to-text rendering associated with use of an active voice application in progress between a user accessing a data source through a voice portal. The enhancement includes a vocabulary management server connected to a voice application server and to a telephony server, and an instance of vocabulary management software running on the management server for enabling vocabulary establishment and management for voice recognition software. In practice of the enhanced vocabulary management capability, an administrator accessing the vocabulary management server uses the vocabulary management software to create unique vocabulary sets or lists that are specific to selected portions of vocabulary associated with target data sources the vocabulary sets differing in content according to administrator direction.

It will be appreciated by one with skill in the art of voice application deployment architecture that many users vying to connect and interact with a voice portal may in some cases create a bottleneck wherein data lines connecting voice application components to Web-sources and other data sources become taxed to their capacities. This problem may occur especially at peak use periods as is common for many normal telephony environments. It has occurred to the inventor that still more streamlining in terms of traffic optimization is required to alleviate potential line-use issues described above.

A particular enhancement to the voice application distribution system known to the inventor addresses the traffic challenges described in the above paragraph. Application logics are provided for determining which portions (dialogs) of a voice application for deployment are cached at an application-receiving end system based on static and dynamic rules and in some cases (dynamic caching), statistical analysis results are used in the determination. The application logic utilizes a processor for processing the voice application according to sequential dialog files and rules of the application. Logic components include a static content optimizer connected to the processor for identifying files containing static content; and a dynamic content optimizer connected to the processor for identifying files containing dynamic content. The optimizers determine which files should be cached at which end-system facilities, tag the files accordingly, and prepare those files for distribution to selected end-system cache facilities for local retrieval during consumer interaction with the deployed application.

Being able to retrieve dialog portions of a voice application from a local cache facility increases response time at the voice portal by decreasing the load on the network connection to the voice application server. However, in addition to reduced traffic requirements, it is also important that text to speech recognition and speech to text renderings are clear and accurate. Accuracy of synthesized speech delivered to a caller is key to creating a successful voice application that can be interacted with in a dynamic fashion at both ends.

As voice application distribution architectures expand to cross regional boundaries and even cultural boundaries the prospect of standardizing speech recognition rules dealing with terms and phrases that are commonly spoken becomes increasingly difficult. For example, pronunciations of certain terms in a same language will vary significantly according to region. Common labels such as the way major roads and highways are written and spoken can also vary significantly. There are many examples of phrase and term variations that need to be addressed if voice application interaction is practiced on larger architectures spanning large geographic regions.

In yet another system enhancement known to the inventor, text-to speech preprocessing is used to render synthesized voice that is somewhat personalized to a caller according to pre-set constraints. The enhanced system is capable of preprocessing text strings for VXML view generation and subsequent voice rendering. The system has a text-to-speech preprocessing logic and a software table accessible to the preprocessing logic, the table adapted to serve text dialog options related to one or more text entities.

A rules base is provided and accessible to the preprocessing logic. The rules base is adapted to serve dialog selection constraints used to match specific dialog portions that are then used to annotate a text string. Dialog options and text entities are stored in an accessible data store. In a preferred embodiment the preprocessing logic accesses the software table during client interaction with a deployed voice application and selects a specific dialog option from more than one dialog option related to a single text entity, and inserts the selected option into the VXML page rendering process, the selection is made according to return of one or more of the served constraints.

While the enhanced system provides personalization of voice dialog to specific groups of callers depending upon pre-set constraints, which may cover a wide variety of industry specific, social, geographic and cultural considerations, the system is still largely robotic and does not respond to individual attitudes and behaviors. It has occurred to the inventor that instant attitudes moods and behaviors of callers interacting with a voice application, if understood at the time of interaction, could be leveraged to increase customer satisfaction, enterprise sales figures, and efficiency of the interaction process in general.

A behavioral adaptation engine is known to the inventor and is integrated with a voice application creation and deployment system. The adaptation engine has at least one data input port for receiving XML-based client interaction data including audio files attached to the data; at least one data port for sending data to and receiving data from external data systems and modules; a logic processing component including an XML reader, voice player, and analyzer for processing received data; and a decision logic component for processing result data against one or more constraints. The engine intercepts client data including dialog from client interaction with a served voice application in real time and processes the received data for behavioral patterns and if attached, voice characteristics of the audio files whereupon the engine according to the results and one or more valid constraints identifies one or a set of possible enterprise responses for return to the client during interaction.

The enhanced system described in the above paragraph can dynamically select responses based on detection of a particular mood state and re-arrange a menu or response-options accordingly. The behavioral adaptation engine has the capability of determining what appropriate response dialog from a pool of possible dialogs will be executed during a session based on voice and selection analysis performed by the client during the session.

In addition to the much-enhanced voice application system known to the inventor, there are several prior-art VXML compliant voice application deployment systems that use various proprietary grammar mark-up languages or script languages for creating voice applications that can be used only with certain voice systems, which may then render the script as a standard VXML or CCXML and distributed to portal (client access) systems. A proprietary grammar language may be used on the application side (application language) as input to a VXML rendering engine wherein the output is the W3C standard VXML, which is useable at the interaction point of the caller. Caller responses then may be transported as VXML back to the proprietary system and translated back into the application language for interpretation and dialog service at the application server site.

To give one example of the above-described interactivity, a speech synthesis engine capable of text-to-speech and speech-to-text conversion owned by Nuance™ Corporation is integrated into a voice application deployment system known as the Tellme™ system. Nuance™ provides a proprietary scripting language known as Grammar Specification Language (GSL) for creating voice applications. The GSL is converted to VXML that is interpreted by speech synthesis engine interacting with the caller at a VXML-enabled Web-based Portal or telephony IVR system.

More recently, the Worldwide Web (W3C) referenced herein by the address http://www.w3c.org/ has been developing a grammar extensible mark-up language (GRXML) that can be used with Nuance™, SpeechWorks™, and other speech engine technologies, that support VXML and in some cases CCXML, the latter of which provides more integrated telephony call-control functionality than is supported by VXML such as outbound calling and so on.

FIG. 33 illustrates an overview 3300 of a prior-art relationship between various script languages input into different core VMXL rendering engines. GSL 3301 is used as was described above as input into a Nuance™ engine 3302. A GRXML language 3303 is supported by the Nuance™ engine, and a SpeechWorks™ engine 3304. Other existing or newly developed XML-based script languages 3306 are used as input into other proprietary engines 3305, and so on.

Although there is some interoperability using a semi standard like GRXML with respect to different application languages used by proprietary VXML compliant systems, GRXML is not useable in many systems. GRXML may only be compatible with the larger and most popular systems that are widely recognized. A customer site might have more than one different proprietary system deployed wherein GRXML is not supported and might have to move from one system to another during interaction. An example would be that of an enterprise contracting with more than one speech application deployment service and architecture. In this respect there would be some difficulty in that new scripts would have to be written that support the particular engine the customer is using.

In addition to the above-describe problem, there are still many limitations apparent with client-to-system voice application-driven sessions. Voice synthesis tends to rely on single speech components representing parts of a subject matter that must be communicated in order to complete a transaction. For example, city, state, and country represent three components of location information that must be provided in order to complete some transactions. Prior-art application systems typically deal with these components separately by using three separate prompt/response actions. While the behavior adaptation engine known to the inventor may offer some streamlining by allowing a client to skip certain standard prompts of a voice application more enhancement is required to further streamline interaction between clients and a voice application.

What is clearly needed are methods and apparatus for enabling inference of client objectives when interacting with a voice application and a platform and system independent script language that can bridge multiple end systems to an application server system. A system of such capability could reduce and eliminate the above-states limitations.

SUMMARY OF THE INVENTION

A voice application creation and deployment system is provided and includes a voice application server for creating and serving voice applications to clients over a communication network; at least one voice portal node having access to the communication network, the portal node for facilitating client interaction with the voice applications; and an inference engine executable from the application server. In a preferred embodiment the inference engine is called during one or more predetermined points of an ongoing voice interaction to decide whether an inference of client need can be made based on analysis of existing data related to the interaction during a pre-determined point in an active call flow of the served voice application, and if an inference is warranted, determines which inference dialog will be executed and inserted into the call flow.

In one embodiment the communications network is the Internet network. In another embodiment the communications network is a combination of an Internet and telephony network. In one embodiment the inference engine is part of the application logic maintained in the voice application server.

In one embodiment the at least one voice portal is an interactive voice response system combined with a telephony server. In another embodiment the at least one voice portal is a computerized node connected to a data network having access to the Internet.

In a preferred aspect the inference engine is called at pre-determined points in a call flow of an interaction using a voice application. In this embodiment the inference engine uses session information and or historical data collected about a caller to decide if an inference should be executed.

In another embodiment of the invention the system further includes a universal grammar adapter adapted to produce universal grammar script from a specialized input, the script transformable into any one of a plurality of scripting languages supported by and referred to as a specification parameter of a speech-to-text/text-to-speech engine. In one embodiment the inference dialogs are multi part composites of separate dialogs. Also in one embodiment the related data includes one or a combination of caller line identification, caller number identification, and caller history data. In one embodiment the related data is mined for statistics that are compared with an inference model to determine a particular inference.

In another aspect of the invention, the system described in the first paragraph of this section further includes an inference model, including an ontology set and a semantic index. In this embodiment the inference engine causes generation of voice dialog from a base of semantics. In preferred applications the inference engine causes an inference to occur at more than one time during the course of an interaction.

According to another aspect of the invention, a language adaptor system is provided for converting a general descriptor language into an intermediate descriptor language for transformation into a specific XML-based script language for use in a text-to-speech engine. In one embodiment the adaptor system includes a first set of constructs defining the general descriptor language; a grammar adapter for equating selected ones of the first set of constructs to individual ones of a second set of intermediate constructs; and a language transformation utility for converting the adapter output into the specific script language desired.

In one aspect the language transformation utility is an extensible style sheet transformation program integrated with the adaptor. Also in one aspect the specific script language is one of a grammar specification language (GSL) or a grammar extensible mark-up language (GRXML).

In one embodiment the adaptor system is manually operated during manual creation of a voice application. In another embodiment the adaptor system executes automatically during automated generation of a new voice application dialog.

According to yet another aspect of the present invention a method is provided for determining which dialog of more than one available dialog will be executed during a voice interaction using a voice application and speech engine. The method includes (a) providing one or more detectable system points within the voice application being executed; (b) detecting said system points serially during the course of execution and deployment of the application; (c) upon each detection, accessing any available data related to the nature of the portion of the application just deployed; (d) comparing any available data found against a reference data model; and (e) selecting for execution one or more dialogs from the available dialogs based on the results of the comparison.

In a preferred application in (a) the detectable system points are installed according to a pre-transaction and post transaction model for the voice application. In this application in (c) the data includes one or a combination of client session data, client dialog data, or client historical activity data. In a preferred application in (d) the reference data model includes ontology and a semantic index.

In one aspect in (d) the reference data model includes a threshold value previously attributed to the data type and context of data that may be found at a particular system point. In another aspect in (d) comparison may include computation of statistical values from raw data. In still another aspect in (e) the comparison result is a breach of a pre-determined threshold value and the dialog is selected based on the class or nature of the value as it applies to that portion of the voice application.

BRIEF DESCRIPTION OF THE DRAWING FIGURES

FIG. 13 is a screen shot 1300 of dialog design panel of FIG. 12 illustrating progression of dialog state to a subsequent contact.

FIG. 35 is an example of a universal grammar script written in XML format.

FIG. 36 is an example of the UGS of FIG. 35 translated into a GRXML language using an XSLT program according to an embodiment of the present invention.

FIG. 37A is a dialog flow diagram of a voice system/client interaction according to prior art.

FIG. 37B is a dialog flow diagram of the same content as the flow of FIG. 37A enhanced by multi-slot language transformation according to an embodiment of the present invention.

FIG. 38A is a text block logically representing a static system prompt according to prior art FIG. 38B is a system prompt generated and/or selected through inference according to an embodiment of the present invention.

FIG. 40B is a flow diagram illustrating a system/client interaction dialog using natural language recognition according to an embodiment of the present invention.

DESCRIPTION OF THE PREFERRED EMBODIMENTS

According to preferred embodiments of the present invention, the inventor teaches herein, in an enabling fashion, a novel system for developing and deploying real-time dynamic or static voice applications in an object-oriented way that enables inbound or outbound delivery of IVR and other interactive voice solutions in supported communications environments.

Figure 1A:
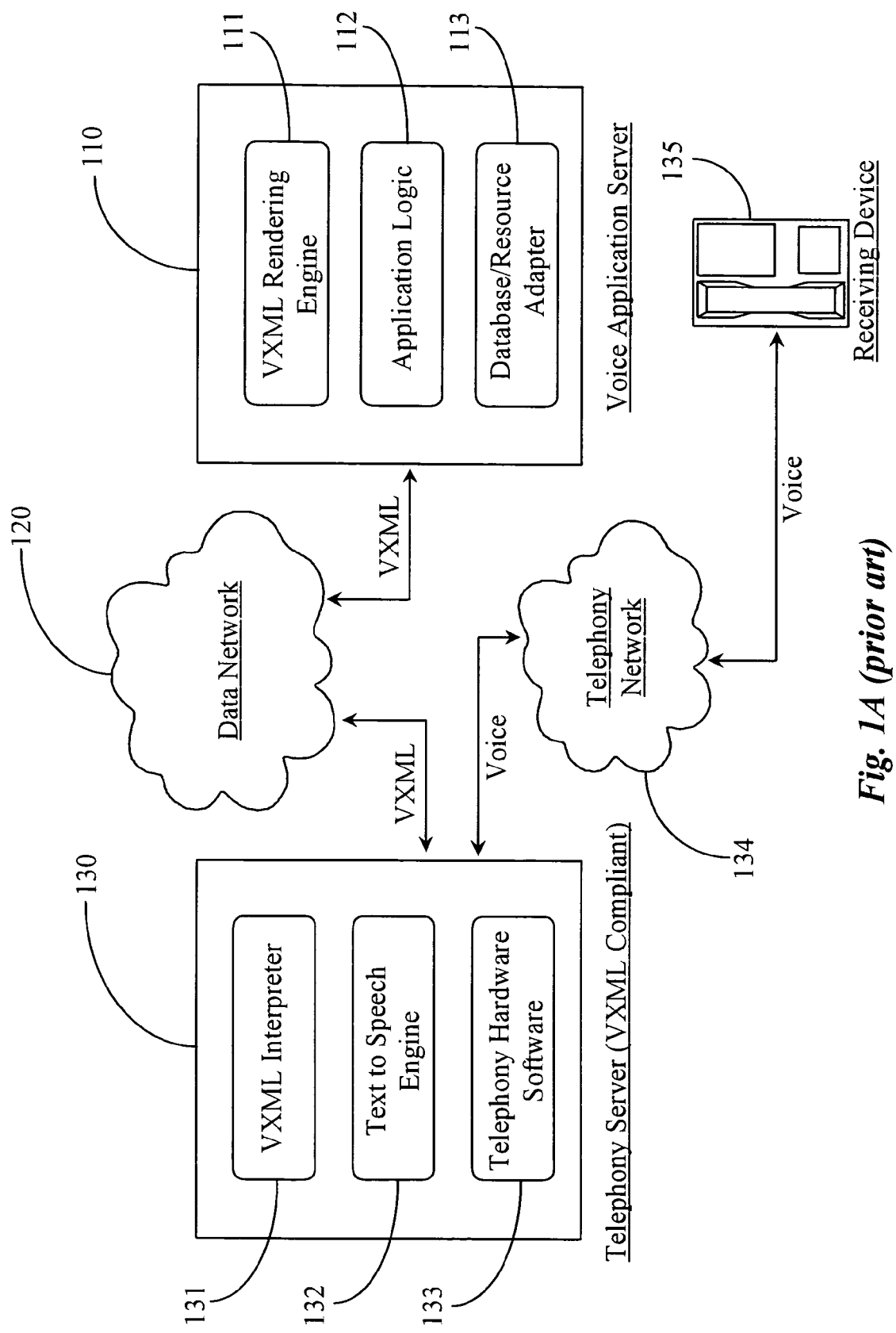
FIG. 1A is a block diagram illustrating a basic architecture of a VXML-enabled IVR development and deployment environment according to prior-art.

FIG. 1A is a block diagram illustrating a basic architecture of a VXML-enabled IVR development and deployment environment according to prior art. As described with reference to the background section, the prior-art architecture of this example is known to and available to the inventor. Developing and deploying voice applications for the illustrated environment, which in this case is a telephony environment, requires a very high level of skill in the art. Elements of this prior-art example that have already been introduced with respect to the background section of this specification shall not be re-introduced.

In this simplified scenario, voice application server 110 utilizes database/resource adapter 113 for accessing a database or other resources for content. Application logic 112 comprising VXML script, business rules, and underlying telephony logic must be carefully developed and tested before single applications can be rendered by rendering engine 111. Once voice applications are complete and servable from server 110, they can be deployed through data network 120 to telephony server 130 where interpreter 131 and text-to speech engine 132 are utilized to formulate and deliver the voice application in useable or playable format for telephony software and hardware 133. The applications are accessible to a receiving device, illustrated herein as device 135, a telephone, through the prevailing network 134, which is in this case a public-switched-telephone-network (PSTN) linking the telephony server to the consumer (device 135) generally through a telephony switch (not shown).

Improvements to this prior-art example in embodiments of the present invention concern and are focused in the capabilities of application server 110 with respect to development and deployment issues and with respect to overall enhancement to response capabilities and options in interaction dialog that is bidirectional. Using the description of existing architecture deemed state-of-art architecture, the inventor herein describes additional components that are not shown in the prior-art example of FIG. 1A, but are illustrated in a novel version of the example represented herein by FIG. 1B.

Figure 1B:
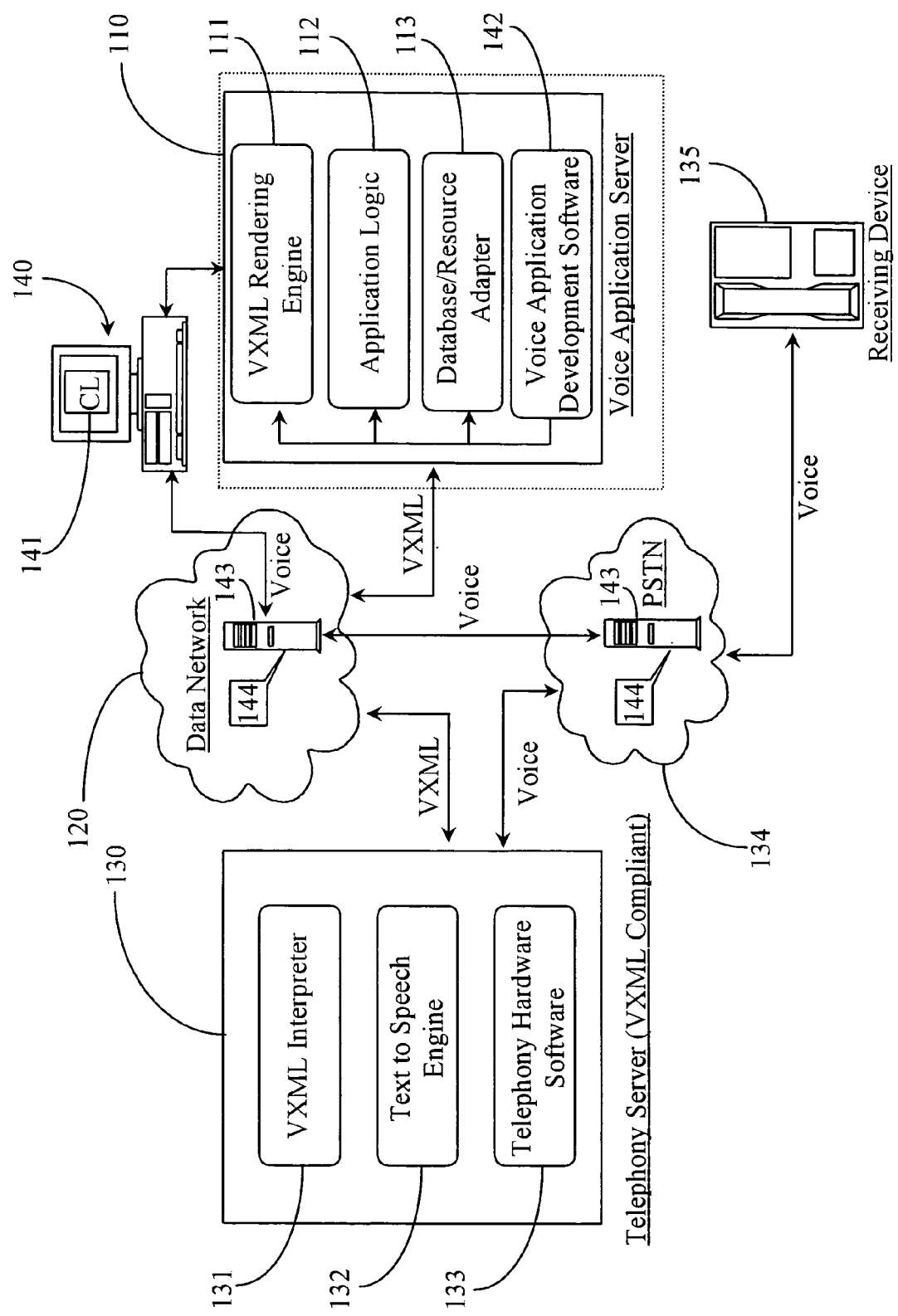
FIG. 1B is a block diagram illustrating the basic architecture of FIG. 1A enhanced to practice the present invention.

FIG. 1B is a block diagram illustrating the basic architecture of FIG. 1A enhanced to illustrate an embodiment of the present invention. Elements of the prior-art example of FIG.

1A that are also illustrated in FIG. 1B retain their original element numbers and are not re-introduced. For reference purposes an entity (a person) that develops a voice application shall be referred to hereinafter in this specification as either a producer or developer.

A developer or producer of a voice application according to an embodiment of the present invention operates preferably from a remote computerized workstation illustrated herein as station 140. Station 140 is essentially a network-connected computer station. Station 140 may be housed within the physical domain also housing application server 110. In another embodiment, station 140 and application server 110 may reside in the same machine. In yet another embodiment, a developer may operate station 140 from his or her home office or from any network-accessible location including any wireless location.

Station 140 is equipped with a client software tool (CL) 141, which is adapted to enable the developer to create and deploy voice applications across the prevailing system represented by servers 110, 130, and by receiving device 135. CL 141 is a Web interface application similar to or incorporated with a Web browser application in this example, however other network situations may apply instead. CL 141 contains the software tools required for the developer to enable enhancements according to embodiments of the invention. Station 140 is connected to a voice portal 143 that is maintained either on the data network (Internet, Ethernet, Intranet, etc.) and/or within telephony network 134. In this example portal 143 is illustrated logically in both networks. Voice portal 143 is adapted to enable a developer or a voice application consumer to call in and perform functional operations (such as access, monitor, modify) on selected voice applications.

Within application server 110 there is an instance of voice application development server 142 adapted in conjunction with the existing components 111-113 to provide dynamic voice application development and deployment according to embodiments of the invention.

Portal 143 is accessible via network connection to station 140 and via a network bridge to a voice application consumer through telephony network 134. In one example, portal 143 is maintained as part of application server 110. Portal 143 is, in addition to an access point for consumers is chiefly adapted as a developer's interface server. Portal 143 is enabled by a SW instance 144 adapted as a server instance to CL 141. In a telephony embodiment, portal 143 may be an interactive voice response (IVR) unit.

In a preferred embodiment, the producer or developer of a voice application accesses application server 110 through portal 143 and data network 120 using remote station 140 as a "Web interface" and first creates a list of contacts. In an alternative embodiment, station 140 has direct access to application server 110 through a network interface. Contacts are analogous to consumers of created voice applications. CL 141 displays, upon request and in order of need, all of the required interactive interfaces for designing, modifying, instantiating, and executing completed voice applications to launch from application server 110 and to be delivered by server 130.

The software of the present invention enables voice applications to be modeled as a set of dialog objects having business and telephony (or other communication delivery/access system) rules as parameters without requiring the developer to perform complicated coding operations. A dialog template is provided for modeling dialog states. The dialog template creates the actual speech dialog, specifies the voice application consumer (recipient) of the dialog, captures the response from the voice application consumer and performs any follow-up actions based upon system interpretation of the consumer response. A dialog is a reusable component and can be linked to a new dialog or to an existing (stored) dialog. A voice application is a set of dialogs inter-linked by a set of business rules defined by the voice application producer. Once the voice application is completed, it is deployed by server 110 and is eventually accessible to the authorized party (device 135) through telephony server 130.

The voice applications are in a preferred embodiment in the form of VXML to run on VXML-compliant telephony server 130. This process is enabled through VXML rendering engine 111. Engine 111 interacts directly with server 130, locates the voice application at issue, retrieves its voice application logic, and dynamically creates the presentation in VXML and forwards it to server 130 for processing and delivery. Once interpreter 131 interprets the VXML presentation it is sent to or accessible to device 135 in the form of an interactive dialog (in this case an IVR dialog). Any response from device 135 follows the same path back to application server 110 for interpretation by engine 111. Server 110 then retrieves the voice application profile from the database accessible through adapter 113 and determines the next business rule to execute locally. Based upon the determination a corresponding operation associated with the rule is taken. A next (if required) VXML presentation is then forwarded to rendering engine 111, which in turn dynamically generates the next VXML page for interpretation, processing and deployment at server 130. This two-way interaction between the VXML-compliant telephony server (130) and the voice application server (110) continues in the form of an automated logical sequence of VXML dialogs until the voice application finally reaches its termination state.

A voice application (set of one or more dialogs) can be delivered to the consumer (target audience) in outbound or inbound fashion. For an inbound voice application, a voice application consumer calls in to voice portal 143 to access the inbound voice application served from server 130. The voice portal can be mapped to a phone number directly or as an extension to a central phone number. In a preferred embodiment the voice portal also serves as a community forum where voice application producers can put their voice applications into groups for easy access and perform operational activities such as voice application linking, reporting, and text-to-speech recording and so on.

For an outbound voice application there are two sub-types. These are on-demand outbound applications and scheduled outbound applications. For on-demand outbound applications server 110 generates an outbound call as soon as the voice application producer issues an outbound command associated with the application. The outbound call is made to the target audience and upon the receipt of the call the voice application is launched from server 130. For scheduled outbound applications, the schedule server (not shown within server 110) launches the voice application as soon as the producer-specified date and time has arrived. In a preferred embodiment both on-demand and scheduled outbound application deployment functions support unicast, multicast, and broadcast delivery schemes.

As described above, a voice application created by application server 110 consists of one or more dialogs. The contents of each dialog can be static or dynamic. Static content is content sourcing from the voice application producer. The producer creates the contents when the voice application is created. Dynamic content sources from a third-party data source.

In a preferred embodiment a developers tool contains an interactive dialog design panel (described in detail later) wherein a producer inputs a reference link in the form of eXtensible Markup Language (XML) to the dialog description or response field. When a dialog response is executed and interpreted by application server 110, the reference link invokes a resource Application-Program-Interface (API) that is registered in resource adapter 113. The API goes out in real time and retrieves the requested data and integrates the returned data into the existing dialog. The resulting and subsequent VXML page being generated has the dynamic data embedded onto it.

One object of the present invention is a highly dynamic, real time IVR system that tailors itself automatically to the application developer's specified data source requirement. Another object of the present invention is to enable rapid development and deployment of a voice application without requirement of any prior knowledge of VXML or any other programming technologies. A further object of the present invention is to reduce the typical voice application production cycle and drastically reduce the cost of production.

Figure 2:
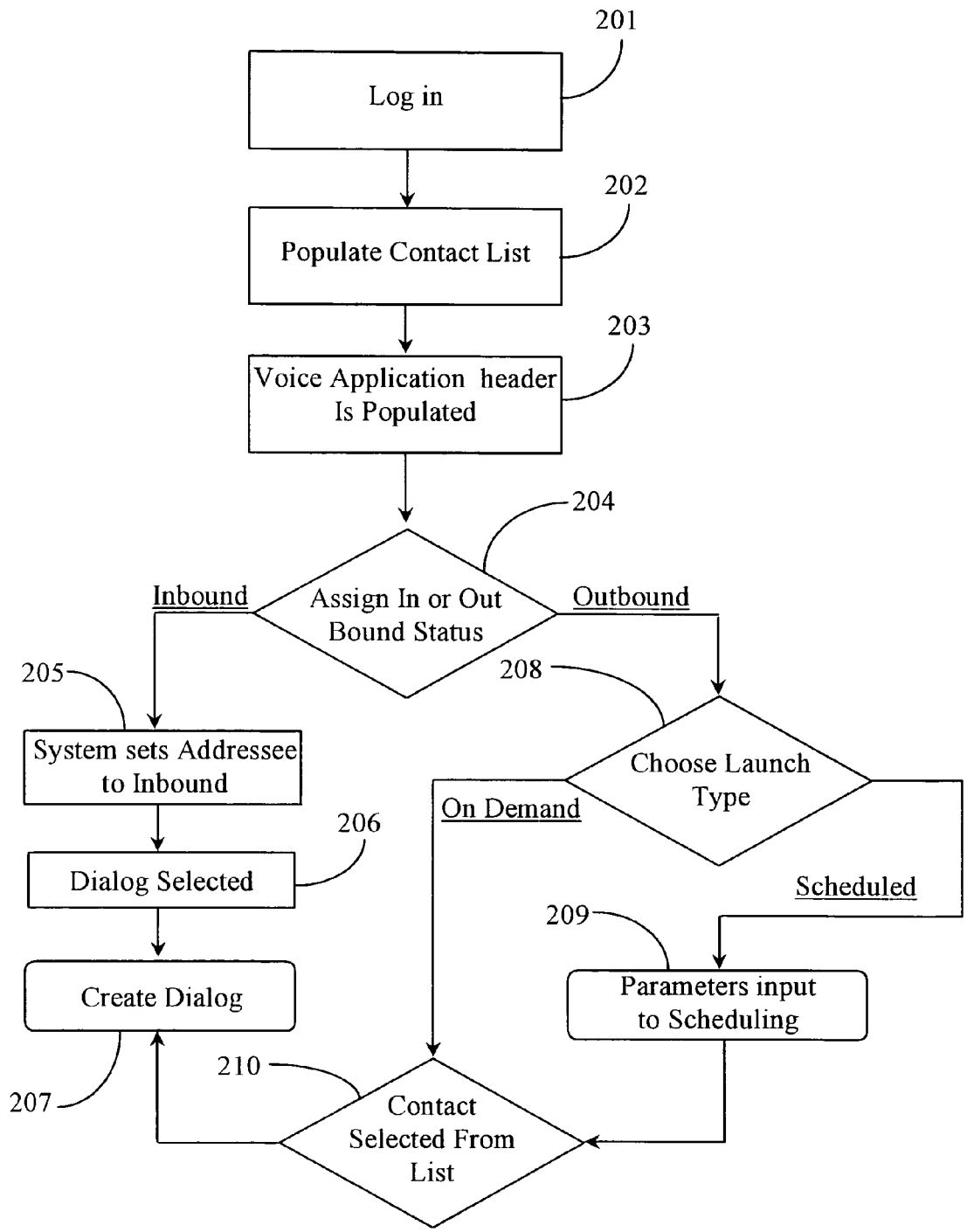
FIG. 2 is a process flow diagram illustrating steps for creating a voice application shell or container for a VXML voice application according to an embodiment of the present invention.

FIG. 2 is a process flow diagram illustrating steps for creating a voice application shell or container for a VXML voice application according to an embodiment of the present invention. A developer utilizing a client application known as a thin client analogous to CL 141 on station 140 described with reference to FIG. 1b, creates a voice application shell or voice application container. At step 201 the developer logs in to the system at a login page. At step 202 the developer creates a contact list of application consumers. Typically a greeting or welcome page would be displayed before step 202. An application consumer is an audience of one or more entities that would have access to and interact with a voice application. A contact list is first created so that all of the intended contacts are available during voice application creation if call routing logic is required later on. The contact list can either be entered individually in the event of more than one contact by the producer or may be imported as a set list from some organizer/planner software, such as Microsoft Outlook™ or perhaps a PDAT™ organizer.

In one embodiment of the present invention the contact list may reside on an external device accessed by a provided connector (not shown) that is configured properly and adapted for the purpose of accessing and retrieving the list. This approach may be used, for example, if a large, existing customer database is used. Rather than create a copy, the needed data is extracted from the original and provided to the application.

At step 203, a voice application header is populated. A voice application header is simply a title field for the application. The field contains a name for the application and a description of the application. At step 204, the developer assigns either and inbound or outbound state for the voice application. An outbound application is delivered through an outbound call while the consumer accesses an inbound voice application.

In the case of the inbound application, in step 205 the system sets a default addressee for inbound communications. The developer selects a dialog from a configured list in step 206. It is assumed in this example that the dialogs have already been created. At step 207, the developer executes the dialog and it is deployed automatically.

In the case of an outbound designation in step 204, the developer chooses a launch type in step 208. A launch type can be either an on-demand type or a scheduled type. If the choice made by the developer in step 208 is scheduled, then in step 209, the developer enters all of the appropriate time and date parameters for the launch including parameters for recurring launches of the same application. In the case of an on demand selection for application launch in step 208, then in step 210 the developer selects one or more contacts from the contact list established in step 202. It is noted herein that step 210 is also undertaken by the developer after step 209 in the case of a scheduled launch. At step 207, the dialog is created. In this step a list of probable dialog responses for a voice application wherein interaction is intended may also be created and stored for use.

In general sequence, a developer creates a voice application and integrates the application with a backend data source or, optionally, any third party resources and deploys the voice application. The application consumer then consumes the voice application and optionally, the system analyzes any consumer feedback collected by the voice application for further interaction if appropriate. The steps of this example pertain to generating and launching a voice application from "building blocks" that are already in place.

Figure 3:
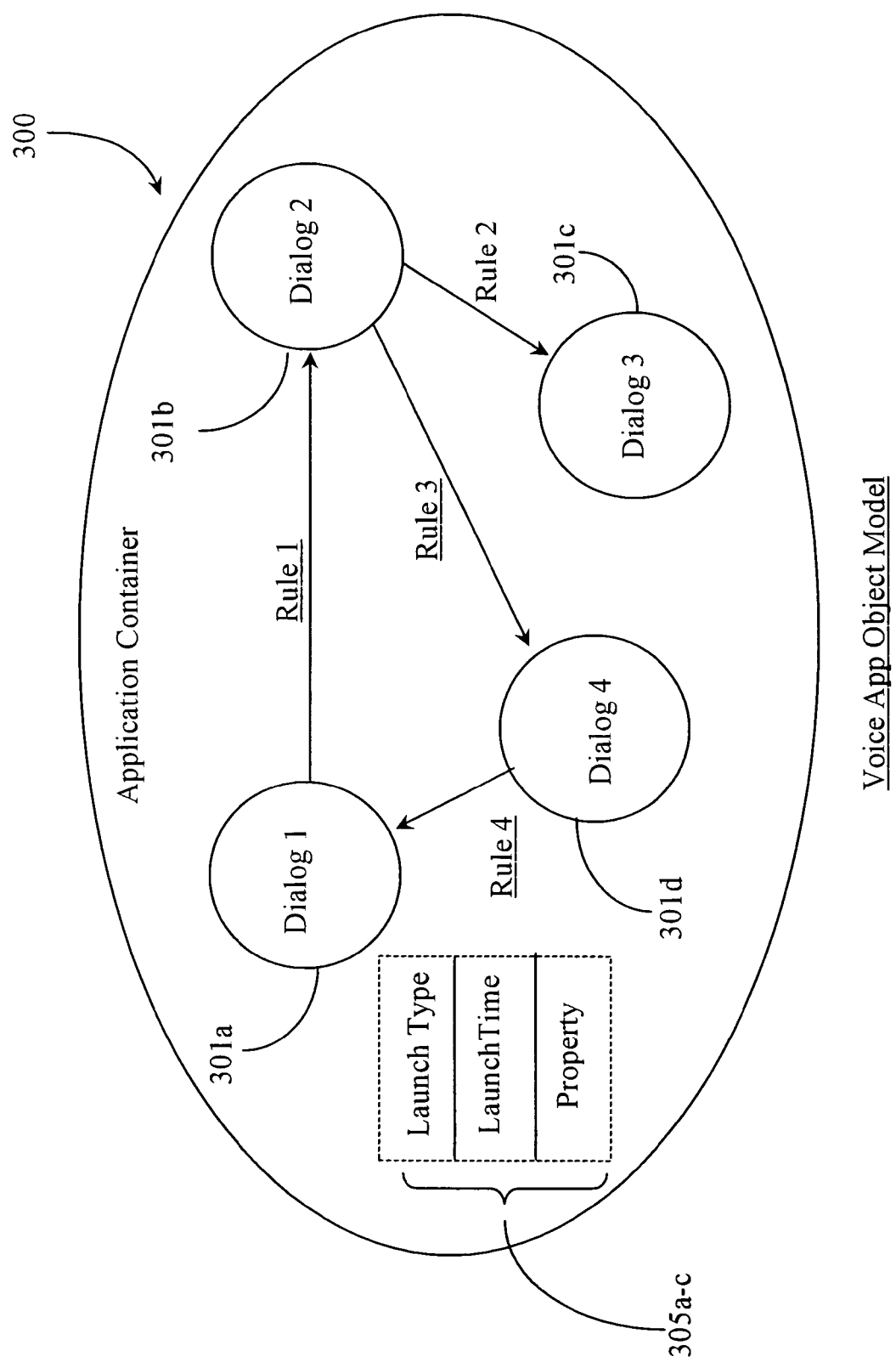
FIG. 3 is a block diagram illustrating a simple voice application container according to an embodiment of the present invention.

FIG. 3 is a block diagram illustrating a simple voice application container 300 according to an embodiment of the present invention. Application container 300 is a logical container or "voice application object" 300. Also termed a shell, container 300 is logically illustrated as a possible result of the process of FIG. 2 above. Container 300 contains one or more dialog states illustrated herein as dialogs 301a-n labeled in this example as dialogs 14. Dialogs 301a-n are objects and therefore container 300 is a logical grouping of the set of dialog objects 301a-n.

The represented set of dialog objects 301a-n is interlinked by business rules labeled rules 1-4 in this example. Rules 1-4 are defined by the developer and are rule objects. It is noted herein that that there may be many more or fewer dialog objects 301a-n as well as interlinking business rule objects 1-4 comprising container object 300 without departing from the spirit and scope of the present invention. The inventor illustrates 4 of each entity and deems the representation sufficient for the purpose of explaining the present invention.

In addition to the represented objects, voice application shell 300 includes a plurality of settings options. In this example, basic settings options are tabled for reference and given the element number 305a-c illustrating 3 listed settings options. Reading in the table from top to bottom, a first setting launch type (305a) defines an initial entry point for voice application 300 into the communications system. As described above with reference to FIG. 2 step 204, the choices for launch type 305a are inbound or outbound. In an alternative embodiment, a launch type may be defined by a third party and be defined in some other pattern than inbound or outbound.

Outbound launch designation binds a voice application to one or more addressees (consumers). The addressee may be a single contact or a group of contacts represented by the contact list or distribution list also described with reference to FIG. 2 above (step 202). When the outbound voice application is launched in this case, it is delivered to the addressee designated on a voice application outbound contact field (not shown). All addressees designated receive a copy of the outbound voice application and have equal opportunity to interact (if allowed) with the voice application dialog and the corresponding backend data resources if they are used in the particular application.

In the case of an inbound voice application designation for launch type 305a, the system instructs the application to assume a ready stand-by mode. The application is launched when the designated voice application consumer actively makes a request to access the voice application. A typical call center IVR system assumes this type of inbound application.

Launch time setting (305b) is only enabled as an option if the voice application launch type setting 305a is set to outbound. The launch time setting is set to instruct a novel scheduling engine, which may be assumed to be part of the application server function described with reference to FIG. 1B. The scheduling engine controls the parameter of when to deliver of when to deliver the voice application to the designated addressees. The time setting may reflect on-demand, scheduled launch, or any third-party-defined patterns.

On-demand gives the developer full control over the launch time of the voice application. The on-demand feature also allows any third-party system to issue a trigger event to launch the voice application. It is noted herein that in the case of third-party control the voice application interaction may transcend more than one communications system and or network.

Property setting 305c defines essentially how the voice application should behave in general. Possible state options for setting 305c are public, persistent, or sharable. A public state setting indicates that the voice application should be accessible to anyone within the voice portal domain so that all consumers with minimum privilege can access the application. A persistent state setting for property 305c ensures that only one copy of the voice application is ever active regardless of how many consumers are attempting to access the application. An example of such a scenario would be that of a task-allocation voice application. For example, in a task-allocation scenario there are only a number of time slots available for a user to access the application. If the task is a request from a pool of contacts such as perhaps customer-support technicians to lead a scheduled chat session, then whenever a time slot has been selected, the other technicians can only select the slots that are remaining. Therefore if there is only one copy of the voice application circulating within the pool of technicians, the application captures the technician's response on a first-come first-serve basis.

A sharable application state setting for property 305a enables the consumer to "see" the responses of other technicians in the dialog at issue, regardless of whether the voice application is persistent or not. Once the voice application shell is created, the producer can then create the first dialog of the voice application as described with reference to FIG. 2 step 207. It is reminded herein that shell 300 is modeled using a remote and preferably a desktop client that will be described in more detail later in this specification.

Figure 4:
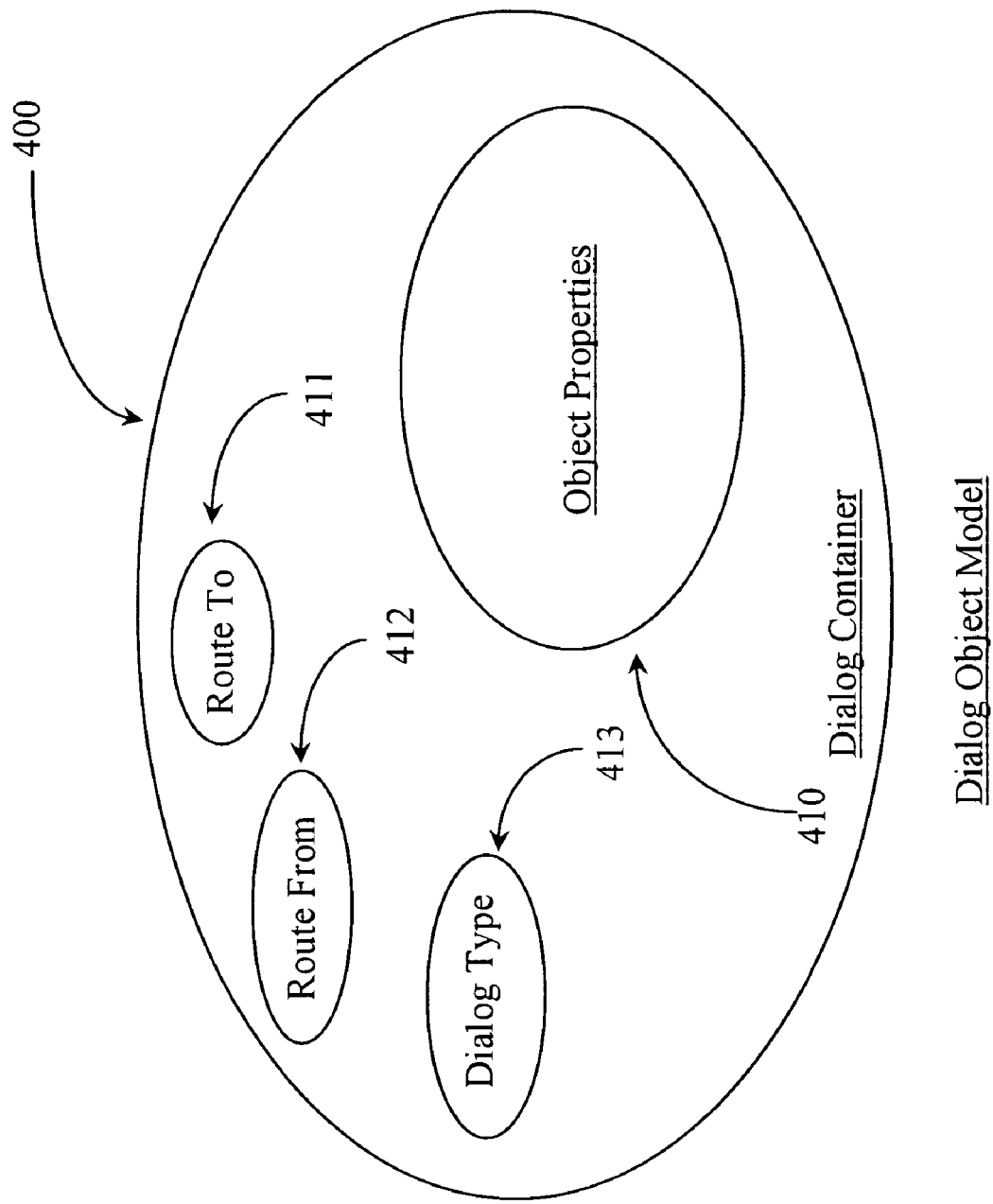
FIG. 4 is a block diagram illustrating a dialog object model according to an embodiment of the present invention.

FIG. 4 is a block diagram illustrating a dialog object model 400 according to an embodiment of the present invention. Dialog object model 400 is analogous to any of dialog objects 301a-n described with reference to FIG. 3 above. Object 400 models a dialog and all of its properties. A properties object illustrated within dialog object 400 and labeled Object Properties (410) contains the dialog type and properties including behavior states and business rules that apply to the dialog.

For example, every dialog has a route-to property illustrated in the example as Route To property (411). Property 411 maps to and identifies the source of the dialog. Similarly, every dialog has a route-from property illustrated herein as Route From property (412). Route from property 412 maps to and identifies the recipient contact of the dialog or the dialog consumer.

Every dialog falls under a dialog type illustrated in this example by a property labeled Dialog Type and given the element number 413. Dialog type 413 may include but is not limited to the following types of dialogs:

1. Radio Dialog: A radio dialog allows a voice application consumer to interactively select one of available options from an option list after hearing the dialog description.
2. Bulletin Dialog: A bulletin dialog allows a voice application consumer to interact with a bulletin board-like forum where multiple consumers can share voice messages in an asynchronous manner.
3. Statement Dialog: A statement dialog plays out a statement to a voice application consumer without expecting any responses from the consumer.
4. Open Entry Dialog: An open entry dialog allows a voice application consumer to record a message of a pre-defined length after hearing the dialog description.
5. Third Party Dialog: A third party dialog is a modular container structure that allows the developer to create a custom-made dialog type with its own properties and behaviors. An example would be Nuance's SpeechObject™.

Each dialog type has one or more associated business rules tagged to it enabling determination of a next step in response to a perceived state. A rule compares the application consumer response with an operand defined by the application developer using an operational code such as less than, greater than, equal to, or not equal to. In a preferred embodiment of the invention the parameters surrounding a rule are as follows:

If user response is equal to the predefined value, then perform one of the following:
  A. Do nothing and terminate the dialog state.
  B. Do a live bridge transfer to the contact specified; Or,
  C. Send another dialog to another contact.

In the case of an outbound voice application, there are likely to be exception-handling business rules associated with perceived states. In a preferred embodiment of the present invention, exception handling rules are encapsulated into three different events:

1. An application consumer designated to receive the voice application rejects a request for interacting with the voice application.
2. An application consumer has a busy connection at the time of launch of the voice application, for example, a telephone busy signal. And,
3. An application consumer's connection is answered by or is redirected to a non-human device, for example, a telephone answering machine.

For each of the events above, any one of the three follow-up actions are possible according to perceived state:
  1. Do nothing and terminate the dialog state.
  2. Redial the number.
  3. Send another dialog to another contact.

Figure 5:
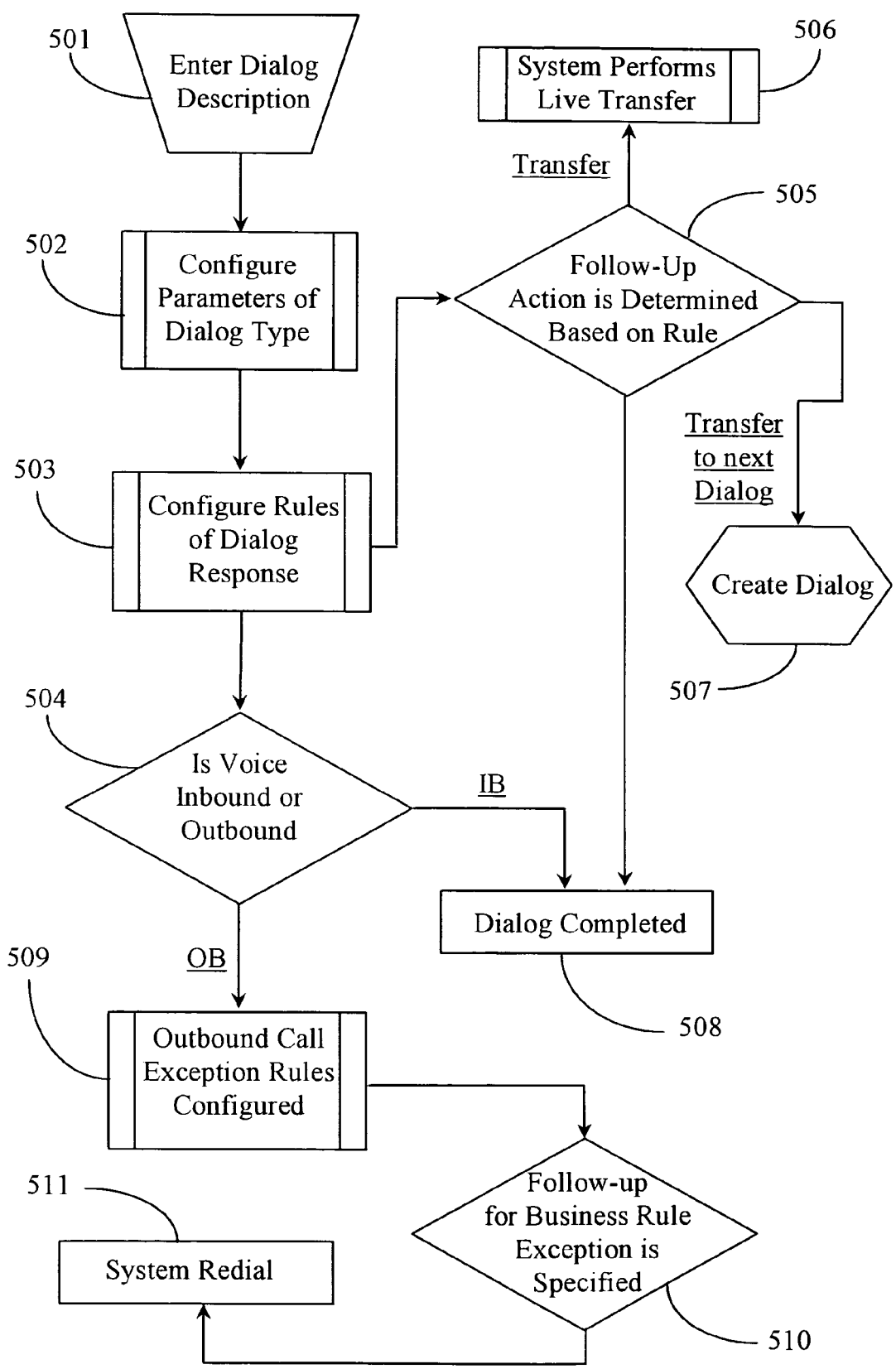
FIG. 5 is a process flow diagram illustrating steps for voice dialog creation for a VXML-enabled voice application according to an embodiment of the present invention.

FIG. 5 is a process flow diagram illustrating steps for voice dialog creation for a VXML-enabled voice application according to an embodiment of the present invention. All dialogs can be reused for subsequent dialog routing. There is, as previously described, a set of business rules for every dialog and contact pair. A dialog be active and be able to transit from one dialog state to another only when it is rule enabled.

At step 501 a developer populates a dialog description field with a dialog description. A dialog description may also contain reference to XML tags as will be described further below. At step 502, parameters of the dialog type are entered based on the assigned type of dialog. Examples of the available parameters were described with reference to FIG. 4 above.

At step 503 the developer configures the applicable business rules for the dialog type covering, as well, follow up routines. In one embodiment rules configuration at step 503 resolves to step 505 for determining follow-up routines based on the applied rules. For example, the developer may select at step 505, one of three types of transfers. For example, the developer may configure for a live transfer as illustrated by step 506; transfer to a next dialog for creation as illustrated by step 507; or the developer may configure for dialog completion as illustrated by step 508.

If the developer does not branch off into configuring subroutines 506, 507, or 508 from step 505, but rather continues from step 503 to step 504 wherein inbound or outbound designation for the dialog is system assigned, then the process must branch from step 504 to either step 508 or 509, depending on whether the dialog is inbound or outbound. If at step 504, the dialog is inbound, then at step 508 the dialog is completed. If the assignment at step 504 is outbound, then at step 509 to configure call exception business rules.

At step 510, the developer configures at least one follow-up action for system handling of exceptions. If no follow-up actions are required to be specified at step 510, then the process resolves to step 508 for dialog completion. If an action or actions are configured at step 510, then at step 511 the action or actions are executed such as a system re-dial, which the illustrated action for step 511.

In a preferred embodiment, once the voice application has been created, it can be deployed and accessed through the telephone. The method of access, of course, depends on the assignment configured at step 504. For example, if the application is inbound, the application consumer accesses a voice portal to access the application. As described further above, a voice portal is a voice interface for accessing a selected number of functions of the voice application server described with reference to FIG. 1B above. A voice portal may be a connection-oriented-switched-telephony (COST) enabled portal or a data-network-telephony (DNT) enabled portal. In the case of an outbound designation at step 504, the application consumer receives the voice application through an incoming call to the consumer originated from the voice application server. In a preferred embodiment, the outbound call can be either COST based or DNT based depending on the communications environment supported.

Figure 6:
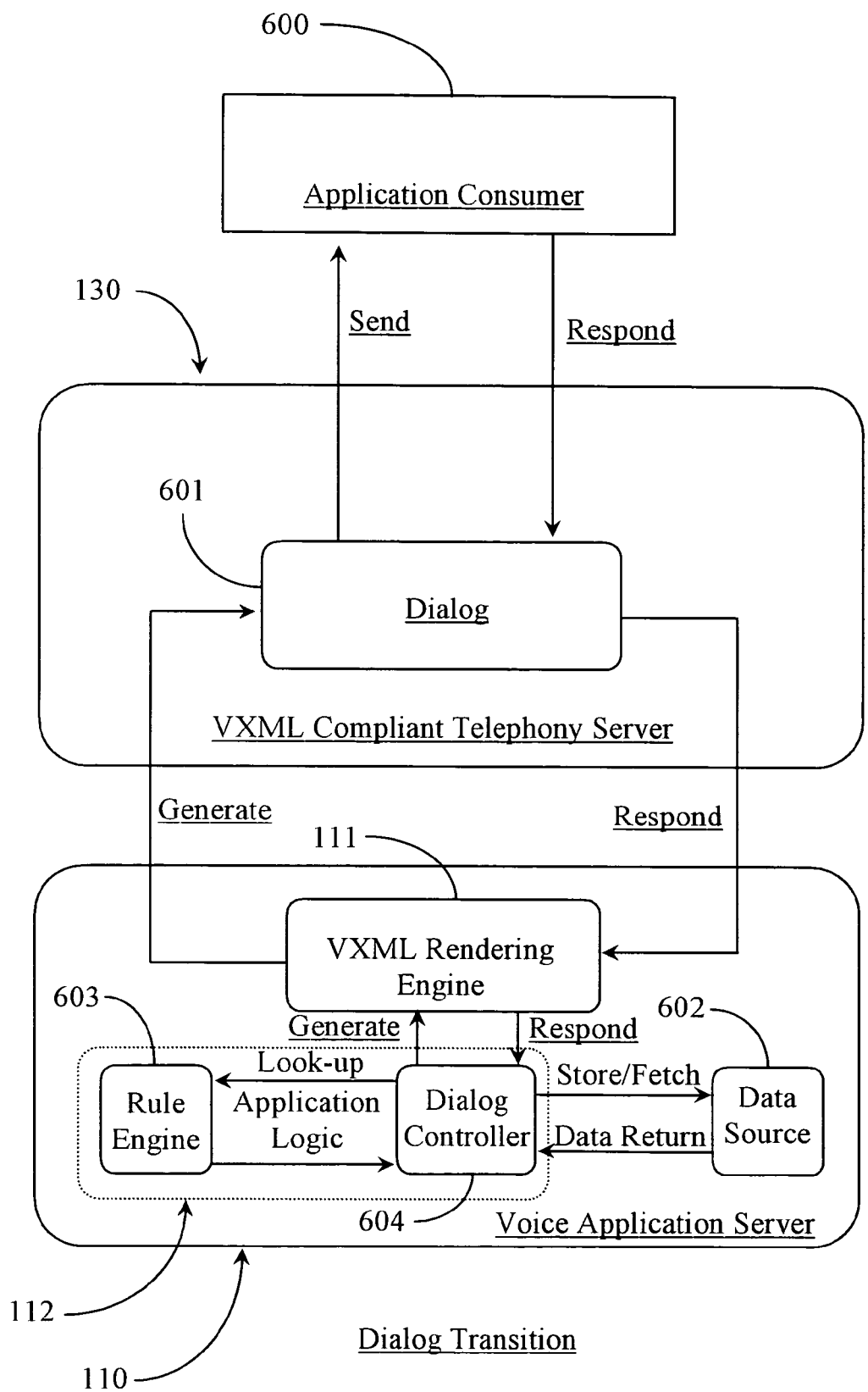
FIG. 6 is a block diagram illustrating a dialog transition flow after initial connection with a consumer according to an embodiment of the present invention.

FIG. 6 is a block diagram illustrating a dialog transition flow after initial connection with a consumer according to an embodiment of the present invention. Some of the elements illustrated in this example were previously introduced with respect to the example of FIG. 1B above and therefore shall retain their original element numbers. In this example, an application consumer is logically illustrated as Application Consumer 600 that is actively engaged in interaction with a dialog 601 hosted by telephony server 130. Server 130 is, as previously described a VXML compliant telephony server as is so labeled.

Application server 110 is also actively engaged in the interaction sequence and has the capability to provide dynamic content to consumer 600. As application consumer 600 begins to interact with the voice application represented herein by dialog 600 within telephony server 130, voice application server 110 monitors the situation. In actual practice, each dialog processed and sent to server 130 for delivery to or access by consumer 600 is an atomic unit of the particular voice application being deployed and executed. Therefore dialog 601 may logically represent more than one single dialog.

In this example, assuming more than one dialog, dialog 601 is responsible during interaction for acquiring a response from consumer 600. Arrows labeled Send and Respond represent the described interaction. When consumer 600 responds to dialog content, the response is sent back along the same original path to VXML rendering engine 111, which interprets the response and forwards the interpreted version to a provided dialog controller 604. Controller 604 is part of application logic 112 in server 110 described with reference to FIG. 1B. Dialog controller 604 is a module that has the ability to perform table lookups, data retrieve and data write functions based on established rules and configured response parameters.

When dialog controller 604 receives a dialog response, it stores the response corresponding to the dialog at issue (601) to a provided data source 602 for data mining operations and workflow monitoring. Controller 604 then issues a request to a provided rules engine 603 to look-up the business rule or rules that correspond to the stored response. Once the correct business rule has been located for the response, the dialog controller starts interpretation. If the business rule accessed requires reference to a third-party data source (not shown), controller 604 makes the necessary data fetch from the source. Any data returned by controller 604 is integrated into the dialog context and passed onward VXML rendering engine 111 for dialog page generation of a next dialog 601. The process repeats until dialog 601 is terminates.

In one embodiment, the business rule accessed by controller 604 as a result of a received response from consumer 600 carries a dialog transition state other than back to the current application consumer. In this case controller 604 spawns an outbound call from application server 110 to deliver the next or "generated dialog" to the designated target application consumer. At the same time, the current consumer has his/her dialog state completed as described with reference to FIG. 5 step 508 according to predefined logic specified in the business rule.

It will be apparent to one with skill in the art that a dialog can contain dynamic content by enabling controller 604 to have access to data source 602 according to rules served by rule engine 603. In most embodiments there are generally two types of dynamic content. Both types are, in preferred embodiments, structured in the form of XML and are embedded directly into the next generated dialog page. The first of the 2 types of dynamic content is classified as non-recurring. Non-recurring content makes a relative reference to a non-recurring resource label in a resource adapter registry within a resource adapter analogous to adapter 113 of voice application server 110 described with reference to FIG. 1B.

In the above case, when dialog controller 604 interprets the dialog, it first scans for any resource label. If a match is found, it looks up the resource adapter registry and invokes the corresponding resource API to fetch the required data into the new dialog context. Once the raw data is returned from the third-party data source, it passes the raw data to a corresponding resource filter for further processing. When completed in terms of processing by the filter, the dialog resource label or tag is replaced with the filtered data and is integrated transparently into the new dialog.

The second type of dynamic content is recurring. Recurring content usually returns more than one set of a name and value pair. An example would be a list of stocks in an application consumer's stock portfolio. For example, a dialog that enables consumer 600 to parrot a specific stock and have the subsequent quote returned through another dialog state is made to use recurring dynamic content to achieve the desired result. Recurring content makes a relative reference to a recurring resource label in the resource adapter registry of voice application server 110. When controller 604 interprets the dialog, it handles the resource in an identical manner to handling of non-recurring content. However, instead of simply returning the filtered data back to the dialog context, it loops through the data list and configures each listed item as a grammar-enabled keyword. In so doing, consumer 600 can parrot one of the items (separate stocks) in the list played in the first dialog and have the response captured and processed for return in the next dialog state. The stock-quote example presented below illustrates possible dialog/response interactions from the viewpoint of consumer 600.

Voice Application: "Good morning Leo, what stock quote do you want?"

Application Consumer: "Oracle"

Voice Application: "Oracle is at seventeen dollars."

Voice Application: "Good morning Leo, what stock quote do you want?"

This particular example consists of two dialogs.

The first dialog plays out the statement "Good morning Leo, what stock quote do you want?" The dialog is followed by a waiting state that listens for keywords such as Oracle, Sun, Microsoft, etc. The statement consists of two dynamic non-recurring resource labels. The first one is the time in day: Good morning, good afternoon, or good evening. The second dynamic content is the name of the application consumer. In this case, the name of the consumer is internal to the voice application server, thus the type of the resource label is SYSTEM. In the actual dialog description field, it may look something like this:

<resource type='ADAPTER' name='time greeting'/><resource type='SYSTEM' name='target_contact'/>, what stock quote do you want?

Because the dialog is expecting the consumer to say a stock out of his/her existing portfolio, the dialog type is radio dialog, and the expected response property of the radio dialog is

```
<resource type='ADAPTER' name='stock_list'>
<param>
<resource type='SYSTEM' name='target_contact_id'/>
</param>
</resource>
```

This XML resource label tells dialog controller 604 to look for a resource label named stock_list and to invoke the corresponding API with target_contact_id as the parameter. Upon completion of the data fetching, the list of stocks is integrated into the dialog as part of the grammars. And whatever the user responds to in terms of stock identification is matched against the grammars at issue (stocks in portfolio) and assigned the grammar return value to the dialog response, which can then forward it to the next dialog as resource of DIALOG type.

The producer can make reference to any dialog return values in any subsequent dialog by using <resource type='DIALOG' name='dialog_name'/>. This rule enables the producer to play out the options the application consumer selected previously in any follow-up dialogs.

The second dialog illustrated above plays out the quote of the stock selected from the first dialog, then returns the flow back to the first dialog. Because no extra branching logic is involved in this dialog, the dialog type in this case is a statement dialog. The dialog's follow-up action is simply to forward the flow back to the first dialog. In such a case, the dialog statement is: <resource type='DIALOG' name='select stock dialog'/>

```
<resource type='ADAPTER' name='get_stock_quote'>
<param>
<resource type='DIALOG' name='select_stock_dialog'/>
</param>
</resource>
```

Besides making reference to ADAPTER, DIALOG and SYSTEM type, the dialog can also take in other resource types such as SOUND and SCRIPT. SOUND can be used to impersonate the dialog description by inserting a sound clip into the dialog description. For example, to play a sound after the stock quote, the producer inserts <resource type='SOUND' name='beep'/> right after the ADAPTER resource tag. The producer can add a custom-made VXML script into the dialog description by using <resource type='RESOURCE' name='confirm'/> so that in the preferred embodiment, any VXML can be integrated into the dialog context transparently with maximum flexibility and expandability.

It will be apparent to one with skill in the art that while the example cited herein use VXML and XML as the mark-up languages and tags, it is noted herein that other suitable markup languages can be utilized in place of or integrated with the mentioned conventions without departing from the spirit and scope of the invention. It will also be apparent to the skilled artisan that while the initial description of the invention is made in terms of a voice application server having interface to a telephony server using generally HTTP requests and responses, it should be noted that the present invention can be practiced in any system that is capable of handling well-defined requests and responses across any distributed network.

FIGS. 7-15 illustrate various displayed Browser frames of a developer platform interface analogous to CL 141 of station 140 of FIG. 1B. Description of the following interface frames and frame contents assumes existence of a desktop computer host analogous to station 140 of FIG. 1B wherein interaction is enabled in HTTP request/response format as would be the case of developing over the Internet network for example. However, the following description should not limit the method and apparatus of the invention in any way as differing protocols, networks, interface designs and scope of operation can vary.

Figure 7:
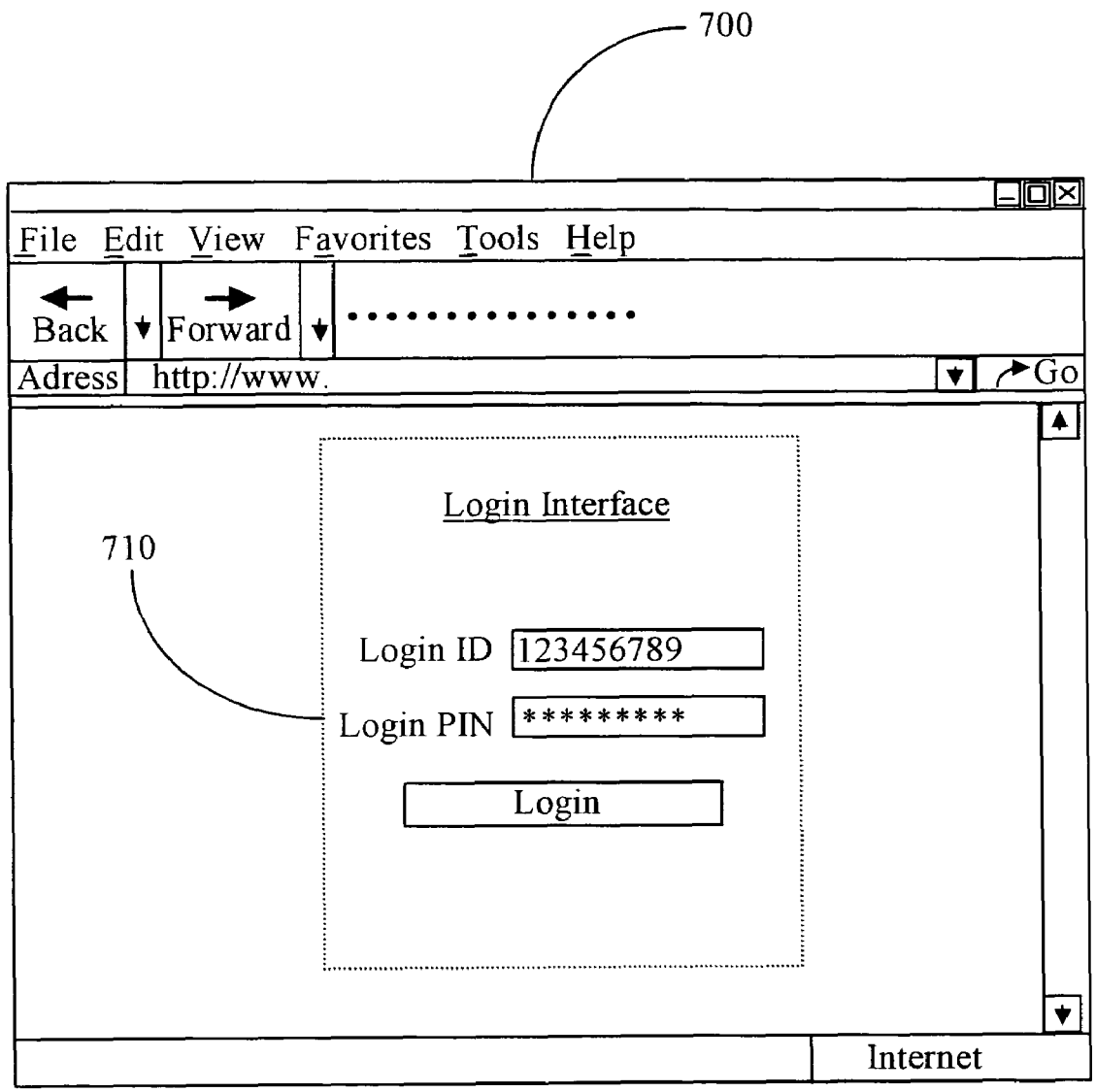
FIG. 7 is a plan view of a developer's frame containing a developer's login screen of according to an embodiment of the present invention.

FIG. 7 is a plan view of a developer's frame containing a developer's login screen of 700 according to an embodiment of the present invention. Frame 700 is presented to a developer in the form of a Web browser container according to one embodiment of the invention. Commercial Web browsers are well known and any suitable Web browser will support the platform. Frame 700 has all of the traditional Web options associated with most Web browser frames including back, forward, Go, File, Edit, View, and so on. A navigation tool bar is visible in this example. Screen 710 is a login page. The developer may, in one embodiment, have a developer's account. In another case, more than one developer may share a single account. There are many possibilities.

Screen 710 has a field for inserting a login ID and a field for inserting a login personal identification number (PIN). Once login parameters are entered the developer submits the data by clicking on a button labeled Login. Screen 710 may be adapted for display on a desktop computer or any one of a number of other network capable devices following specified formats for display used on those particular devices.

Figure 8:
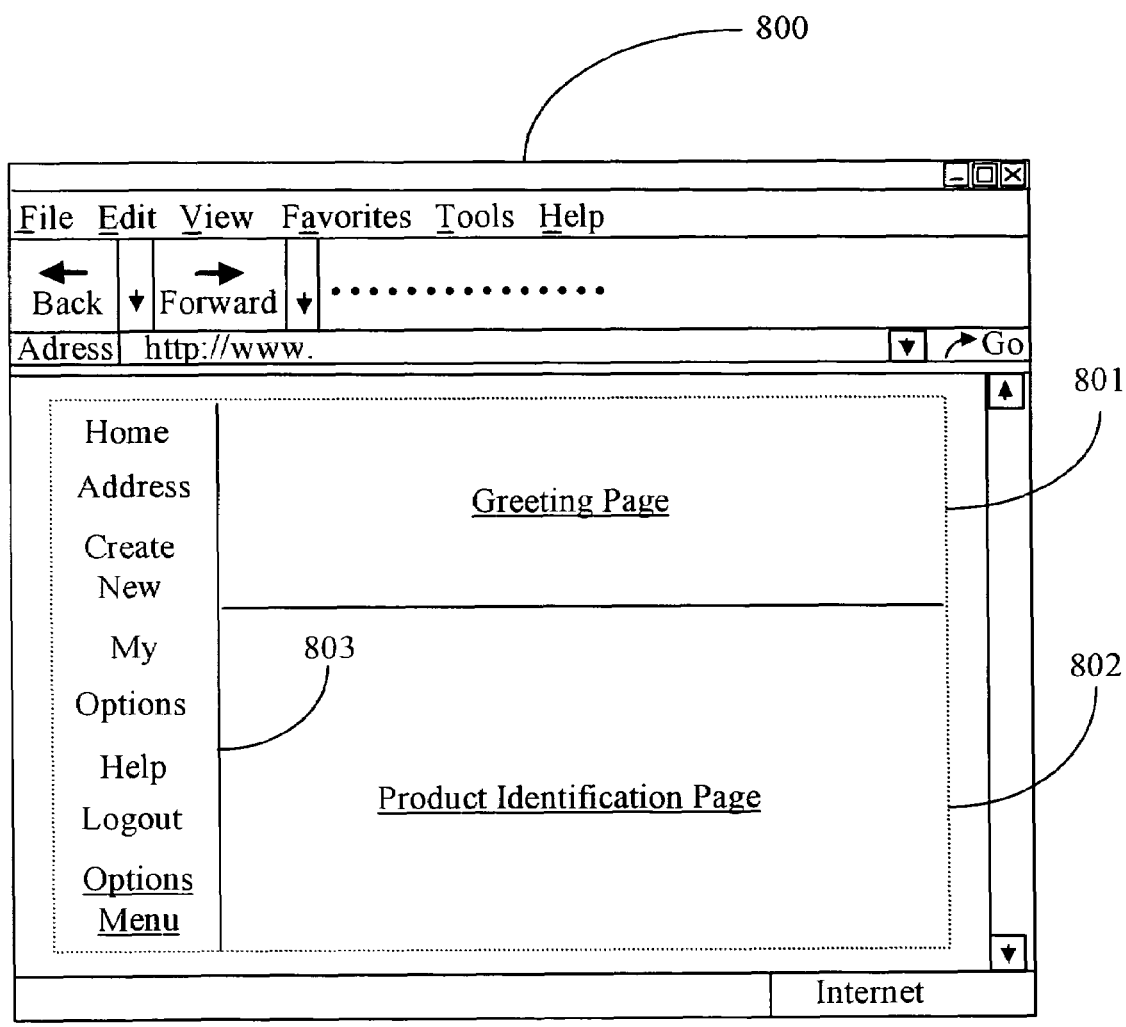
FIG. 8 is a plan view of a developer's frame containing a screen shot of a home page of the developer's platform interface of FIG. 7.

FIG. 8 is a plan view of a developer's frame 800 containing a screen shot of a home page of the developer's platform interface of FIG. 7. Frame 800 contains a sectioned screen comprising a welcome section 801, a product identification section 802 and a navigation section 803 combined to fill the total screen or display area. A commercial name for a voice application developer's platform that is coined by the inventor is the name Fonelet. Navigation section 803 is provided to display on the "home page" and on subsequent frames of the software tool.

Navigation section 803 contains, reading from top to bottom, a plurality of useful links. Starting with a link to home followed by a link to an address book. A link for creating a new Fonelet (voice application) is labeled Create New. A link to "My" Fonelets is provided as well as a link to "Options". A standard Help link is illustrated along with a link to Logout. An additional "Options Menu" is the last illustrated link in section 803. Section 803 may have additional links that are visible by scrolling down with the provided scroll bar traditional to the type of display of this example.

Figure 9:
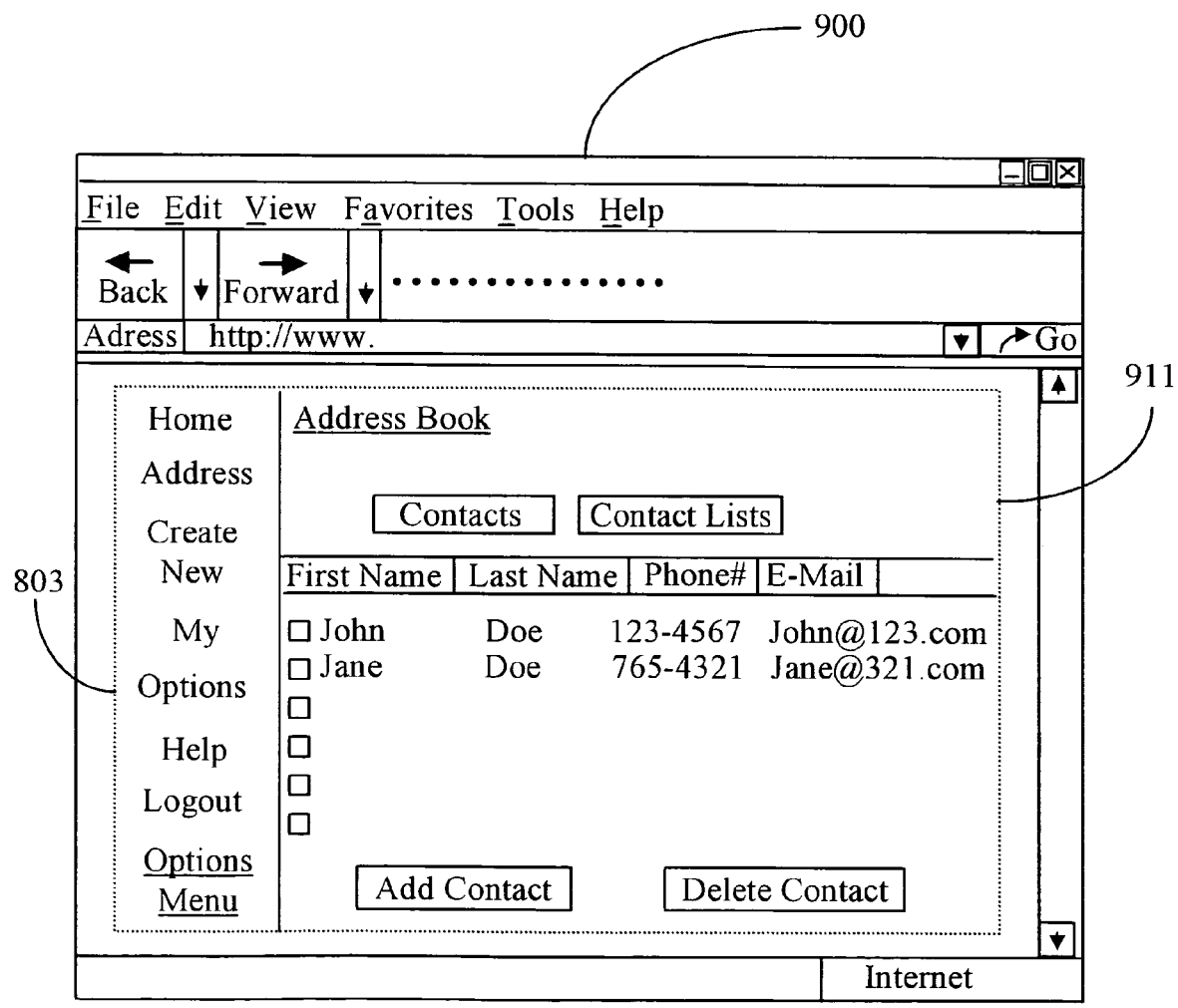
FIG. 9 is a plan view of a developer's frame containing a screen shot of an address book 911 accessible through interaction with the option Address in section 803 of the previous frame of FIG. 8.

FIG. 9 is a plan view of a developer's frame 900 containing a screen shot of an address book 911 accessible through interaction with the option Address in section 803 of the previous frame of FIG. 8. Screen 911 as an interactive option for listing individual contacts and for listing contact lists. A contact list is a list of voice application consumers and a single contact represents one consumer in this example. However, in other embodiments a single contact may mean more than one entity. Navigation screen 803 is displayed on the left of screen 911. In this example, contacts are listed by First Name followed by Last Name, followed by a telephone number and an e-mail address. Other contact parameters may also be included or excluded without departing from the spirit and scope of the invention. For example the Web site of a contact may be listed and may also be the interface for receiving a voice application. To the left of the listed contacts are interactive selection boxes used for selection and configuration purposes. Interactive options are displayed in the form of Web buttons and adapted to enable a developer to add or delete contacts.

Figure 10:
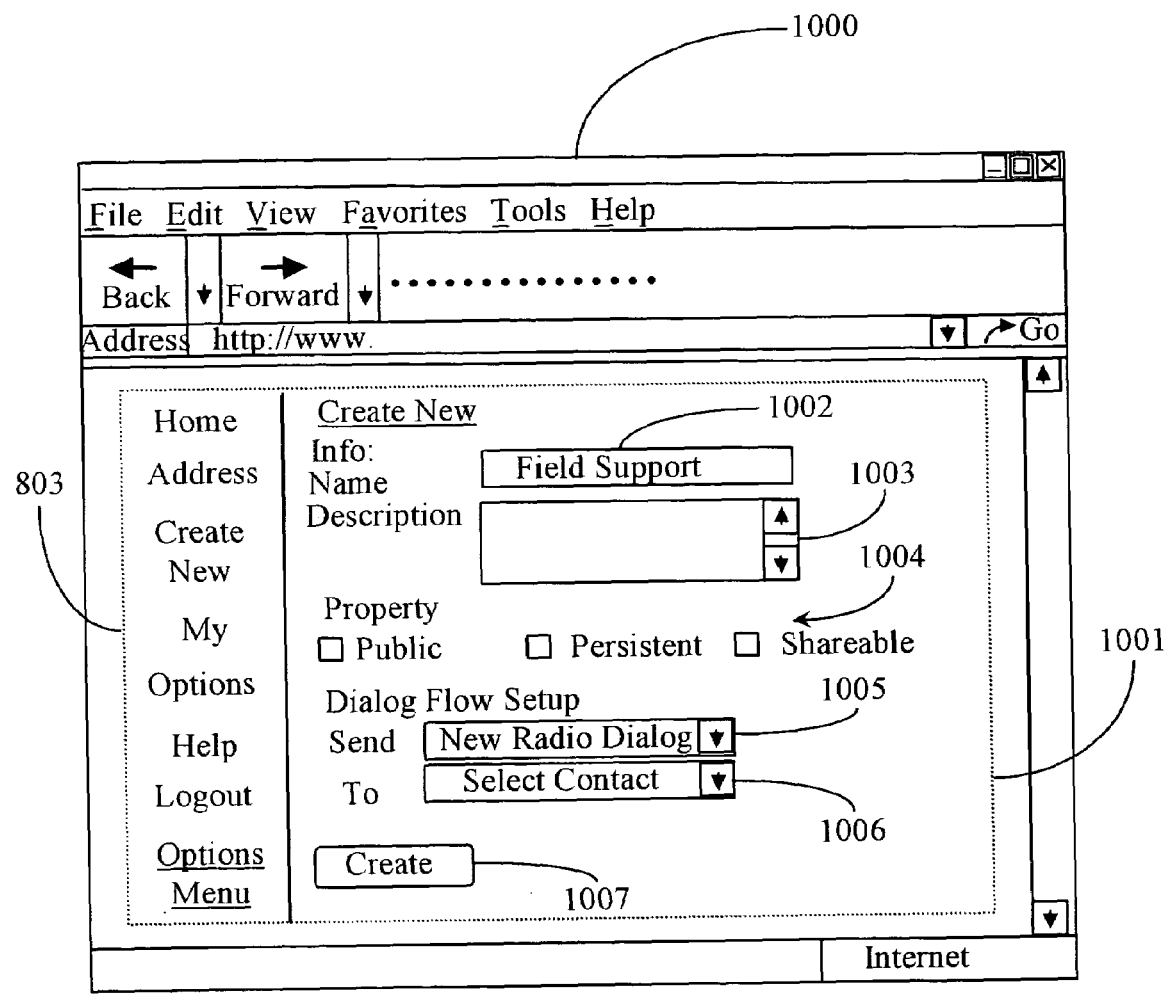
FIG. 10 is a plan view of a developer's frame displaying a screen 1001 for creating a new voice application.

FIG. 10 is a plan view of a developer's frame 1000 displaying a screen 1001 for creating a new voice application. Screen 1001 initiates creation of a new voice application termed a Fonelet by the inventor. A name field 1002 is provided in screen 1001 for inputting a name for the application. A description field 1003 is provided for the purpose of entering the applications description. A property section 1004 is illustrated and adapted to enable a developer to select from available options listed as Public, Persistent, and Shareable by clicking on the appropriate check boxes.

A Dialog Flow Setup section is provided and contains a dialog type section field 1005 and a subsequent field for selecting a contact or contact group 1006. After the required information is correctly populated into the appropriate fields, a developer may "create" the dialog by clicking on an interactive option 1007 labeled Create.

Figure 11:
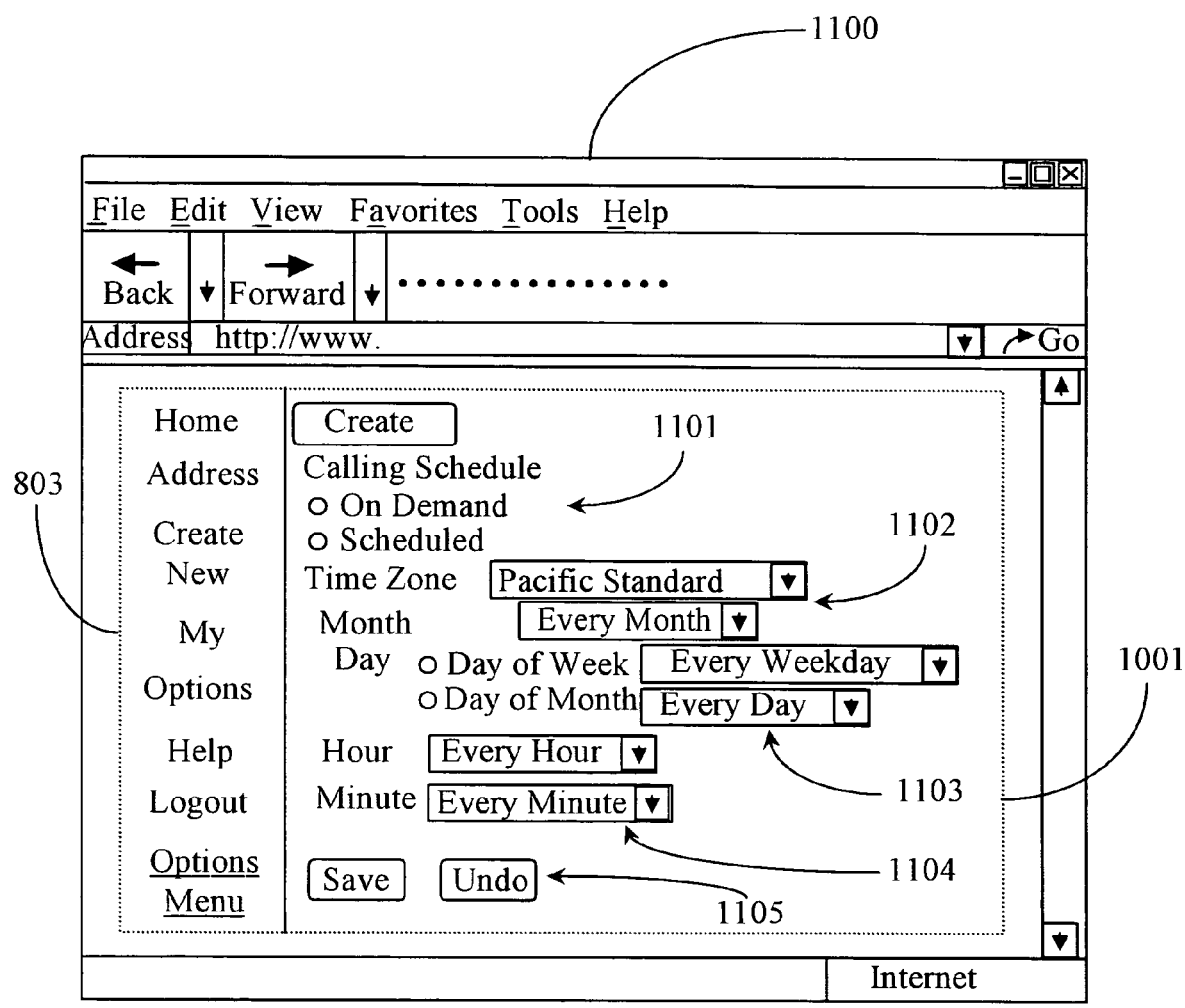
FIG. 11 is a plan view of a developer's frame illustrating screen of FIG. 10 showing further options as a result of scrolling down.

FIG. 11 is a plan view of a developer's frame 1100 illustrating screen 1001 of FIG. 10 showing further options as a result of scrolling down. A calling schedule configuration section 1101 is illustrated and provides the interactive options of On Demand or Scheduled. As was previously described, selecting On Demand enables application deployment at the will of the developer while selecting scheduled initiates configuration for a scheduled deployment according to time/date parameters. A grouping of entry fields 1102 is provided for configuring Time Zone and Month of launch. A subsequent grouping of entry fields 1103 is provided for configuring the Day of Week and the Day of Month for the scheduled launch. A subsequent grouping of entry fields 1104 is provided for configuring the hour and minute of the scheduled launch. It is noted herein that the options enable a repetitive launch of the same application. Once the developer finishes specifying the voice application shell, he or she can click a Create Dialog button labeled Create to spawn an overlying browser window for dialog creation.

Figure 12:
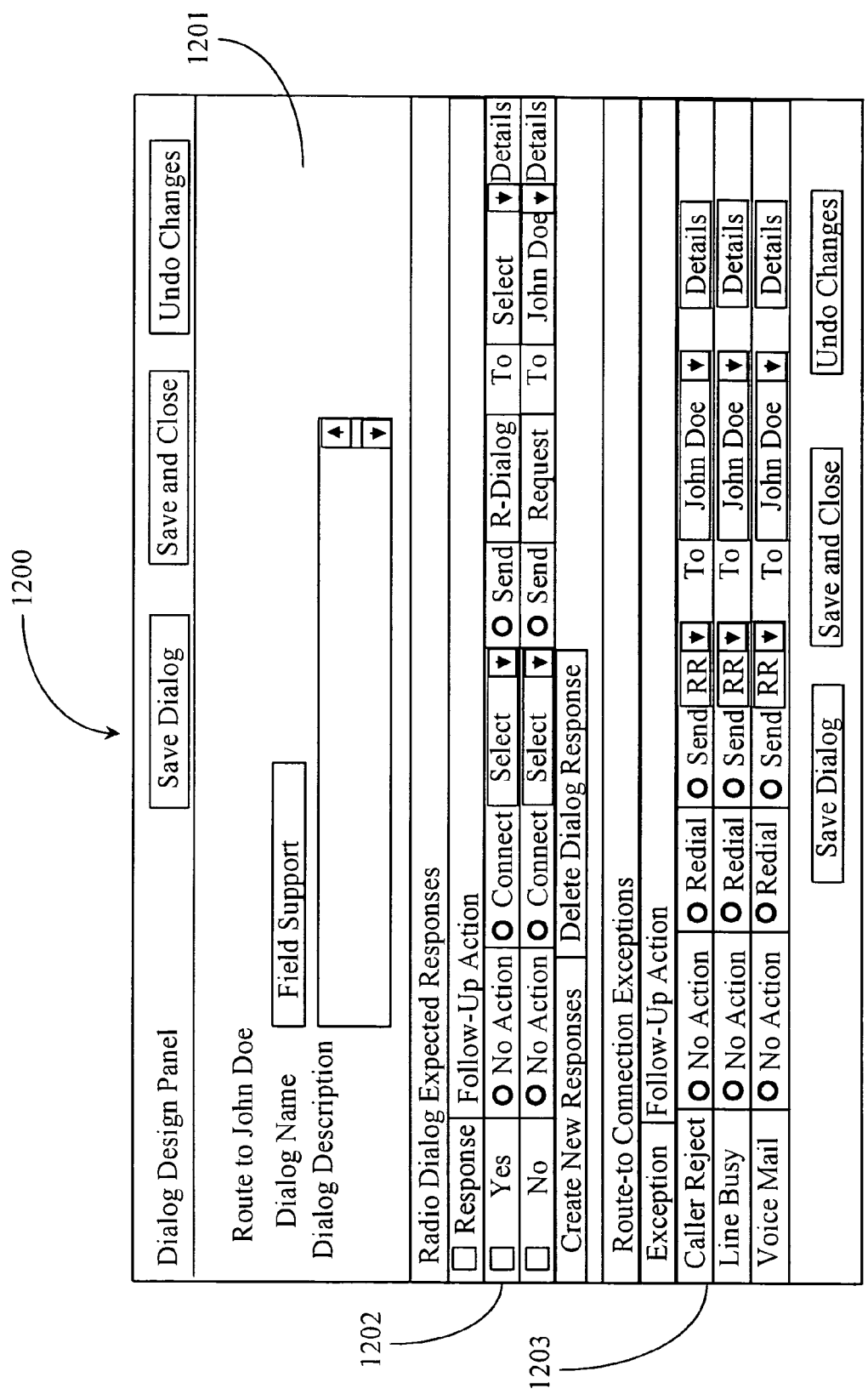
FIG. 12 is a screen shot of a dialog configuration window illustrating a dialog configuration page according to an embodiment of the invention.

FIG. 12 is a screen shot of a dialog configuration window 1200 illustrating a dialog configuration page according to an embodiment of the invention. In this window a developer configures the first dialog that the voice application or Fonelet will link to. A dialog identification section 1201 is provided for the purpose of identifying and describing the dialog to be created. A text entry field for entering a dialog name and a text entry field for entering dialog description are provided. Within the dialog description field, an XML resource tag (not shown) is inserted which for example, may refer to a resource label machine code registered with a resource adapter within the application server analogous to adapter 113 and application server 110 described with reference to FIG. 1B.

A section 1202 is provided within screen 1200 and adapted to enable a developer to configure for expected responses. In this case the type of dialog is a Radio Dialog. Section 1202 serves as the business rule logic control for multiple choice-like dialogs. Section 1202 contains a selection option for Response of Yes or No. It is noted herein that there may be more and different expected responses in addition to a simple yes or no response.

An adjacent section is provided within section 1202 for configuring any Follow-Up Action to occur as the result of an actual response to the dialog. For example, an option of selecting No Action is provided for each expected response of Yes and No. In the case of a follow-up action, an option for Connect is provided for each expected response. Adjacent to each illustrated Connect option, a Select field is provided for selecting a follow-up action, which may include fetching data.

A Send option is provided for enabling Send of the selected follow-up action including any embedded data. A follow-up action may be any type of configured response such as send a new radio dialog, send a machine repair request, and so on. A send to option and an associated select option is provided for identifying a recipient of a follow-up action and enabling automated send of the action to the recipient. For example, if a first dialog is a request for machine repair service sent to a plurality of internal repair technicians, then a follow-up might be to send the same dialog to the next available contact in the event the first contact refused to accept the job or was not available at the time of deployment.

In the above case, the dialog may propagate from contact to contact down a list until one of the contacts is available and chooses to interact with the dialog by accepting the job. A follow-up in this case may be to send a new dialog to the accepting contact detailing the parameters of which machine to repair including the diagnostic data of the problem and when the repair should take place. In this example, an option for showing details is provide for developer review purposes. Also interactive options for creating new or additional responses and for deleting existing responses from the system are provided. It is noted herein that once a dialog and dialog responses are created then they are reusable over the whole of the voice application and in any specified sequence in a voice application.

A section 1203 is provided within screen 1201 and adapted for handling Route-To Connection Exceptions. This section enables a developer to configure what to do in case of possible connection states experience in application deployment. For example, for a Caller Reject, Line Busy, or connection to Voice Mail there are options for No Action and for Redial illustrated. It is noted herein that there may be more Exceptions as well as Follow-up action types than are illustrated in this example without departing from the spirit and scope of the present invention.

A Send option is provided for each type of exception for re-sending the same or any other dialog that may be selected from an adjacent drop down menu. For example if the first dialog is a request for repair services and all of the initial contacts are busy for example, the dialog may be sent back around to all of the contacts until one becomes available by first moving to a next contact for send after each busy signal and then beginning at the top of the list again on re-dial. In this case John Doe represents a next recipient after a previous contact rejects the dialog, is busy, or re-directs to voice mail because of unavailability. Section 1203 is only enabled when the voice application is set to outbound. Once the first dialog is created and enabled by the developer then a second dialog may be created if desired by clicking on one of the available buttons labeled detail. Also provided are interactive buttons for Save Dialog, Save and Close, and Undo Changes.

FIG. 13 is a screen shot 1300 of dialog design panel 1200 of FIG. 12 illustrating progression of dialog state to a subsequent contact. The dialog state configured in the example of FIG. 12 is now transmitted from a contact listed in Route From to a contact listed in Route To in section 1301, which is analogous to section 1201 of FIG. 12. In this case, the contacts involved are John Doe and Jane Doe. In this case, the dialog name and description are the same because the dialog is being re-used. The developer does not have to re-enter any of the dialog context. However, because each dialog has a unique relationship with a recipient the developer must configure the corresponding business rules.

Sections 1302 and 1303 of this example are analogous to sections 1202 and 1203 of the previous example of FIG. 12. In this case if John Doe says no to the request for machine repair then the system carries out a bridge transfer to Jane Doe. In the case of exceptions, shown in Route-To Connection Exceptions region 1303, all the events are directed to a redialing routine. In addition to inserting keywords such as "Yes" or "No" in the response field 1302, the developer can create a custom thesaurus by clicking on a provided thesaurus icon not shown in this example. All the created vocabulary in a thesaurus can later be re-used throughout any voice applications the developer creates.

Figure 14:
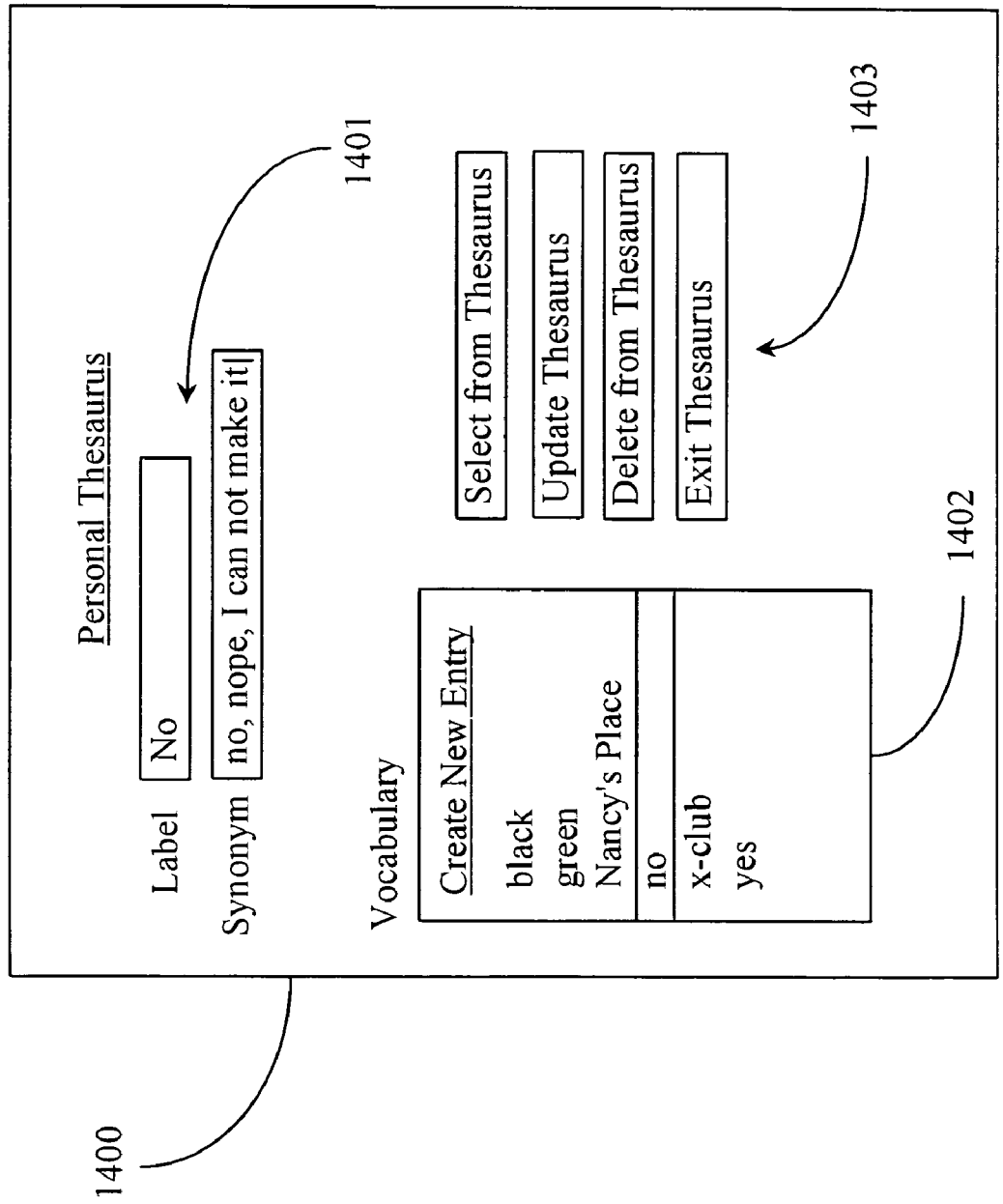
FIG. 14 is a screen shot of a thesaurus configuration window activated from the example of FIG. 13 according to a preferred embodiment.

FIG. 14 is a screen shot of a thesaurus configuration window 1400 activated from the example of FIG. 13 according to a preferred embodiment. Thesaurus window 1400 has a section 1401 containing a field for labeling a vocabulary word and an associated field for listing synonyms for the labeled word. In this example, the word no is associated with probable responses no, nope, and the phrase "I can not make it". In this way voice recognition regimens can be trained in a personalized fashion to accommodate for varieties in a response that might carry a same meaning.

A vocabulary section 1402 is provided and adapted to list all of the created vocabulary words for a voice application and a selection mechanism (a selection bar in this case) for selecting one of the listed words. An option for creating a new word and synonym pair is also provided within section 1402. A control panel section 1403 is provided within window 1400 and adapted with the controls Select From Thesaurus; Update Thesaurus; Delete From Thesaurus; and Exit Thesaurus.

Figure 15:
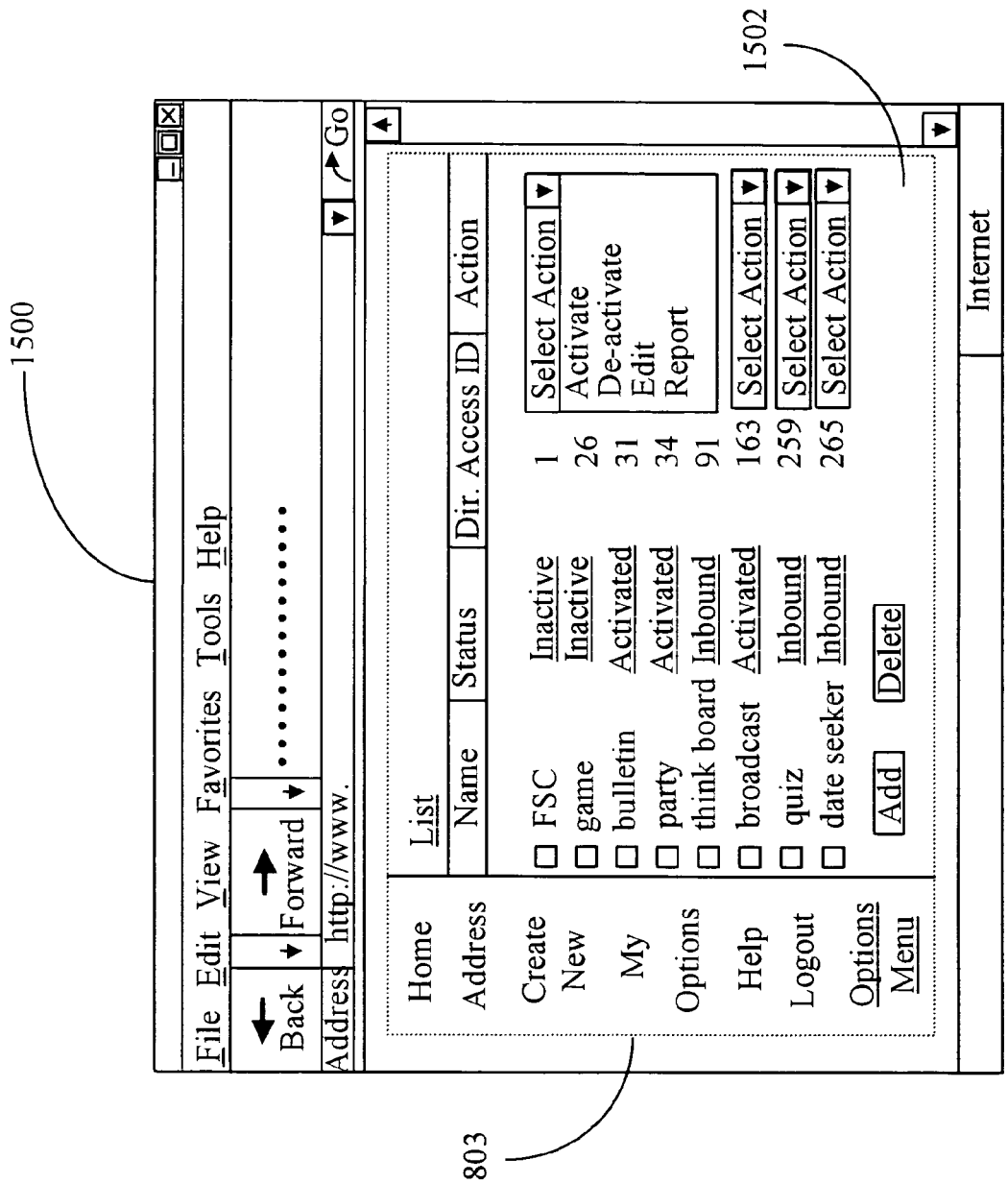
FIG. 15 is a plan view of a developer's frame illustrating a screen for managing created modules according to an embodiment of the present invention.

FIG. 15 is a plan view of a developer's frame 1500 illustrating a screen 1502 for managing created modules according to an embodiment of the present invention.

After closing all dialog windows frame 1500 displays screen or page 1502 for module management options. Menu section 803 is again visible. Screen 1502 displays as a result of clicking on the option "My" or My Fonelet in frame 803. Screen 1502 lists all voice applications that are already created and usable. In the list, each voice application has a check box adjacent thereto, which can be selected to change state of the particular application. A column labeled Status is provided within screen 1502 and located adjacent to the application list applications already created.

The Status column lists the changeable state of each voice application. Available status options include but are not limited to listed states of Inactive, Activated and Inbound. A column labeled Direct Access ID is provided adjacent to the Status column and is adapted to enable the developer to access a voice application directly through a voice interface in a PSTN network or in one embodiment from a DNT voice interface. In a PSTN embodiment, direct access ID capability serves as an extension of a central phone number. A next column labeled Action is provided adjacent to the direct access ID column and is adapted to enable a developer to select and apply a specific action regarding state of a voice application.

For example, assume that a developer has just finished the voice application identified as Field Support Center (FSC) listed at the top of the application identification list. Currently, the listed state of FSC is Inactive. The developer now activates the associated Action drop down menu and selects Activate to launch the application FSC on demand. In the case of a scheduled launch, the voice application is activated automatically according to the settings defined in the voice application shell.

As soon as the Activate command has been issued, the on-demand request is queued for dispatching through the system's outbound application server. For example, John Doe then receives a call originating from the voice application server (110) that asks if John wants to take the call. If John responds "Yes," the voice application is executed. The actual call flow follows:

System: "Hello John, you received a fonelet from Jim Doe, would you like to take this call?"

John: "Yes."

System: "Machine number 008 is broken, are you available to fix it?"

John: "No."

System: "Thanks for using fonelet. Goodbye!"

System: Terminate the connection with John, record the call flow to the data source, and spawn a new call to Jane Doe.

System: "Hello Jane, you received a fonelet from Jim Doe, would you like to take this call?"

Jane: "Yes."

System: "Machine number 008 is broken, are you available to fix it?"

Jane: "I cannot make it."

System: "Please wait while fonelet transfers you to Jeff Doe."

System: Carry out the bridge transfer between Jane Doe and Jeff Doe.

When the conversation is completed, terminate the connection with Jeff and record the call flow to the data source.

The default textual content of the voice application is being generated by the text-to-speech engine hosted on the telephony or DNT server. However, the voice application producer can access the voice portal through the PSTN or DNT server and record his/her voice over any existing prompts in the voice application.

It will be apparent to one with skill in the art the method and apparatus of the present invention may be practiced in conjunction with a CTI-enabled telephony environment wherein developer access to for application development is enabled through a client application running on a computerized station connected to a data network also having connectivity to the server spawning the application and telephony components. The method and apparatus of the invention may also be practiced in a system that is DNT-based wherein the telephony server and application server are both connected to a data network such as the well-known Internet network. There are applications for all mixes of communications environments including any suitable multi-tier system enabled for VXML and or other applicable mark-up languages that may serve similar purpose. It will also be apparent to one with skill in the art that modeling voice applications including individual dialogs and responses enables any developer to create a limitless variety of voice application quickly by reusing existing objects in modular fashion thereby enabling a wide range of useful applications from an existing store of objects.

Auto-Harvesting Web Data

In one embodiment of the present invention one or more Websites can be automatically harvested for data to be rendered by a VXML engine for generating a voice response accessible by users operating through a PSTN-based portal. Such an enhancement is described immediately below.

Figure 16:
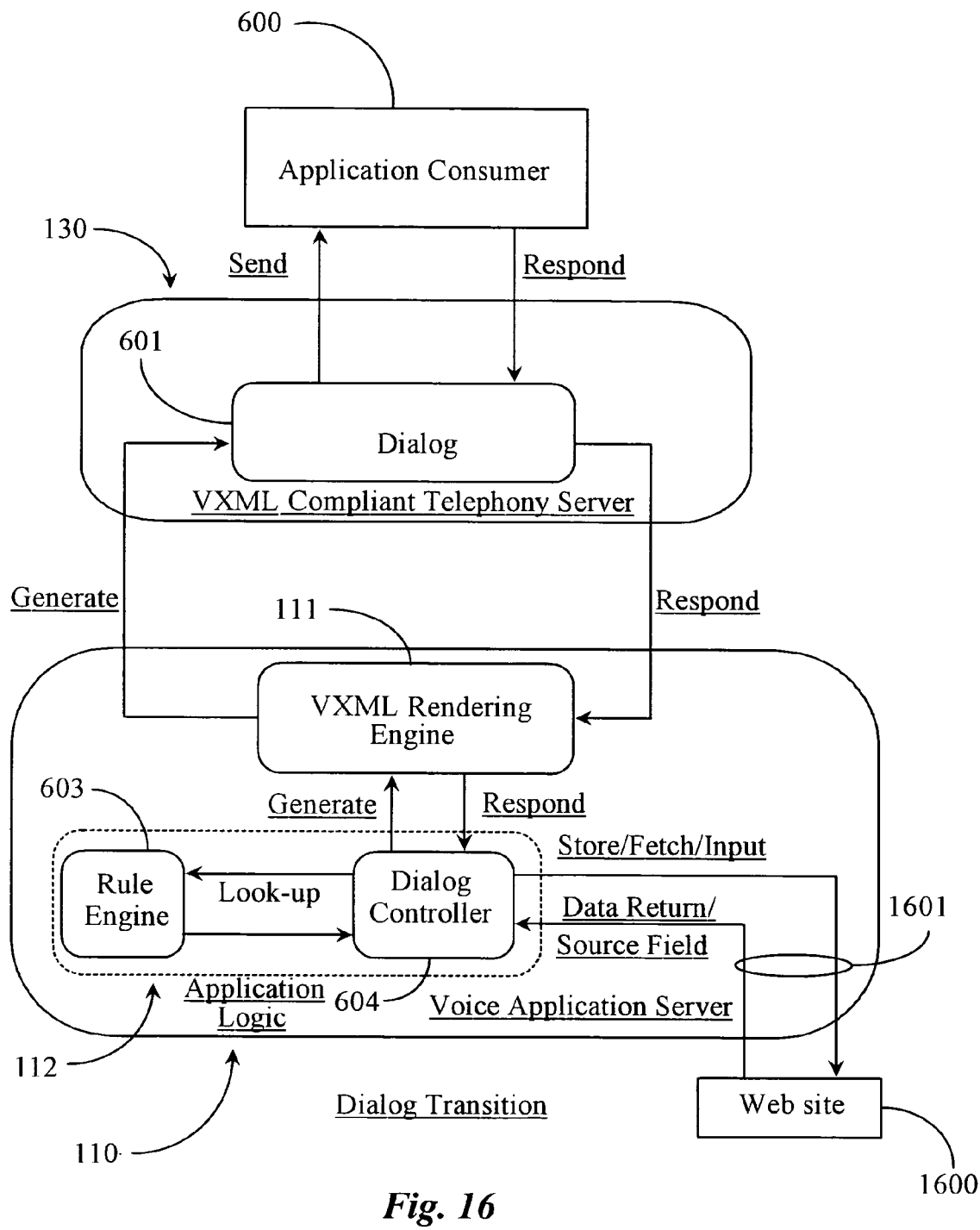
FIG. 16 is a block diagram of the dialog transition flow of FIG. 6 enhanced for Web harvesting according to an embodiment of the present invention.

FIG. 16 is a block diagram illustrating the dialog transition flow of FIG. 6 enhanced for Web harvesting according to an embodiment of the present invention. Dialog controller 604 is enhanced in this embodiment to access and harvest data from an HTML, WML, or other data source such as would be the case of data hosted on a Website. An example scenario for this embodiment is that of a banking institution allowing all of its customers to access their Web site through a voice portal.

A Website 1600 is illustrated in this embodiment and is accessible to dialog controller 604 via a network access line 1601 illustrated herein as two directional lines of communication. The first line is labeled Store/Fetch/Input leading from controller 604 into site 1600. The second (return) line is labeled Data Return/Source Field. The separately illustrated communication lines are intended to be analogous to a bidirectional Internet or other network access line. An internal data source (602) previously described with reference to FIG. 6 above is replaced in FIG. 16 by Website 1600 for explanatory purpose only. It should be noted that multiple data sources both internal to server 110 and external from server 110 could be simultaneously accessible to dialog controller 604.

Website 1600 provides at least one electronic information page (Web page) that is formatted according to the existing rules for the mark-up language that is used for its creation and maintenance. Site 1600 may be one site hosting many information pages, some of which are inter-related and accessible through subsequent navigation actions. Controller 604 in this embodiment is enhanced for Website navigation at the direction of a user's voice inputs enabled by rule accessible by accessing rule engine 603. A data template (not shown) is provided for use by dialog controller 604 to facilitate logical data population from site 1600. Dialog controller 604 analyzes both Website source codes and data fields as return data and uses the information to generate a VXML page for rendering engine 111.

It is noted herein that all of the security and access mechanisms used at the site for normal Internet access are inferred upon the customer so that the customer may be granted access by providing a voice rendering (response) containing the security access information. This enables the customer to keep the same security password and/or personal identification number (PIN) for voice transactions through a portal as well as for normal Web access to site 1600 from a network-connected computer.

Figure 17:
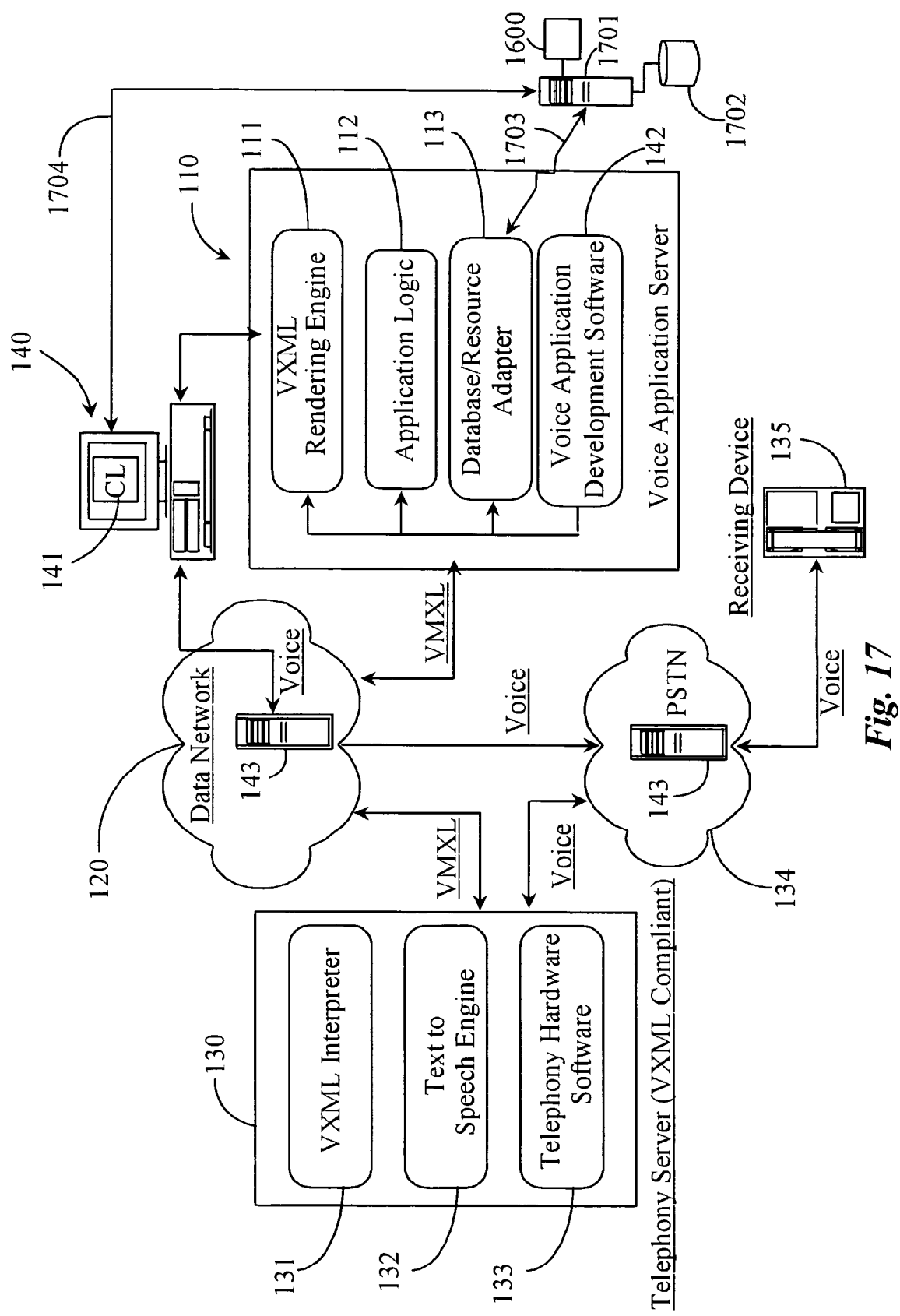
FIG. 17 is a block diagram of the voice application distribution environment of FIG. 1B illustrating added components for automated Web harvesting and data rendering according to an embodiment of the present invention.

FIG. 17 is a block diagram of the voice application distribution environment of FIG. 1B illustrating added components for automated Web harvesting and data rendering according to an embodiment of the present invention. In this example, workstation 140 running client software 141 has direct access to a network server 1701 hosting the target Website 1600. Access is provided by way of an Internet access line 1704.

It is noted herein that there may be many servers 1701 as well as many hosted Websites of one or more pages in this embodiment without departing from the spirit and scope of the present invention. A database store 1702 is provided in this example and illustrated as connected to server 1701 for the purpose of storing data. Data store 1702 may be an optical storage, magnetic storage, a hard disk, or other forms suitable for storing data accessible online. In one embodiment, data store 1702 is a relational database management system (RDBMS) wherein a single access may involve one or more connected sub servers also storing data for access.

The configuration of client application 141, workstation 140, server 1702, Website 1600, and database 1702 connected by network 1704 enables Websites analogous to site 1600 to be culled or harvested. Application 141 can read and retrieve all of the default responses that exist for each HTML script or scripts of another mark-up language. These default responses are embedded into application logic 112 and VXML rendering engine 111. Once the content of a Web page has been culled and used in client 141 to create the rendering, then VXML engine 111 can access the Website successfully in combination with application logic 112 and database/resource adaptor 113 by way of a separate access network 1703. For example, if a user (not shown) accesses Website 1600 through voice portal 143 from receiving device 135 (telephone), then he or she would be voice prompted for a password to gain access to the site. Subsequently, a voice rendering of the data on the site accessed would be recited to him or her over telephone 135.

Generally speaking, the development process for a voice portal would be the same as was described above with references to FIGS. 9-15 above. Some additional scripting or input of dialog is performed using client application 141. Rather that requiring that the application developer populate all of the fields from scratch, or re-apply previously entered options, fields used by the business logic as discussed earlier in FIGS. 9 through 15 may be created from information harvested from site 1600 in this case. For that purpose, a software adapter (not shown) is added to client software 141 that allows it to communicate with Web site 1600 and harvest the information, both from the source code comprising fields and labels, etc. as well as from data parameters and data variables.

It is noted herein that the process for data access, retrieval and voice rendering is essentially the same with respect to the processes of FIGS. 2-5 above except that a Website connection would be established before any other options are selected.

In one embodiment, provision of connection 1703 between server 110 and server 1701 enables the security environment practiced between communicating machines such a secure socket layer (SSL), firewall, etc to be applied in the created voice solution for a customer. On the analog side, the security is no different than that of a call-in line allowing banking services in terms of wiretap possibilities etc.

It will be apparent to one with skill in the art that the method and apparatus of the invention can be practiced in conjunction with the Internet, an Ethernet, or any other suitable networks. Markup languages supported include HTML, SHTML, WML, VHTML, XML, and so on. In one embodiment, the Websites accessed may be accessed automatically wherein the password information for a user is kept at the site itself. There are many possible scenarios.

Prioritizing Web Data for Voice Rendering

According to one aspect of the present invention a method is provided for selecting and prioritizing which Web data offerings from a harvested Web site will be filled into a template for a voice application.

Figure 18:
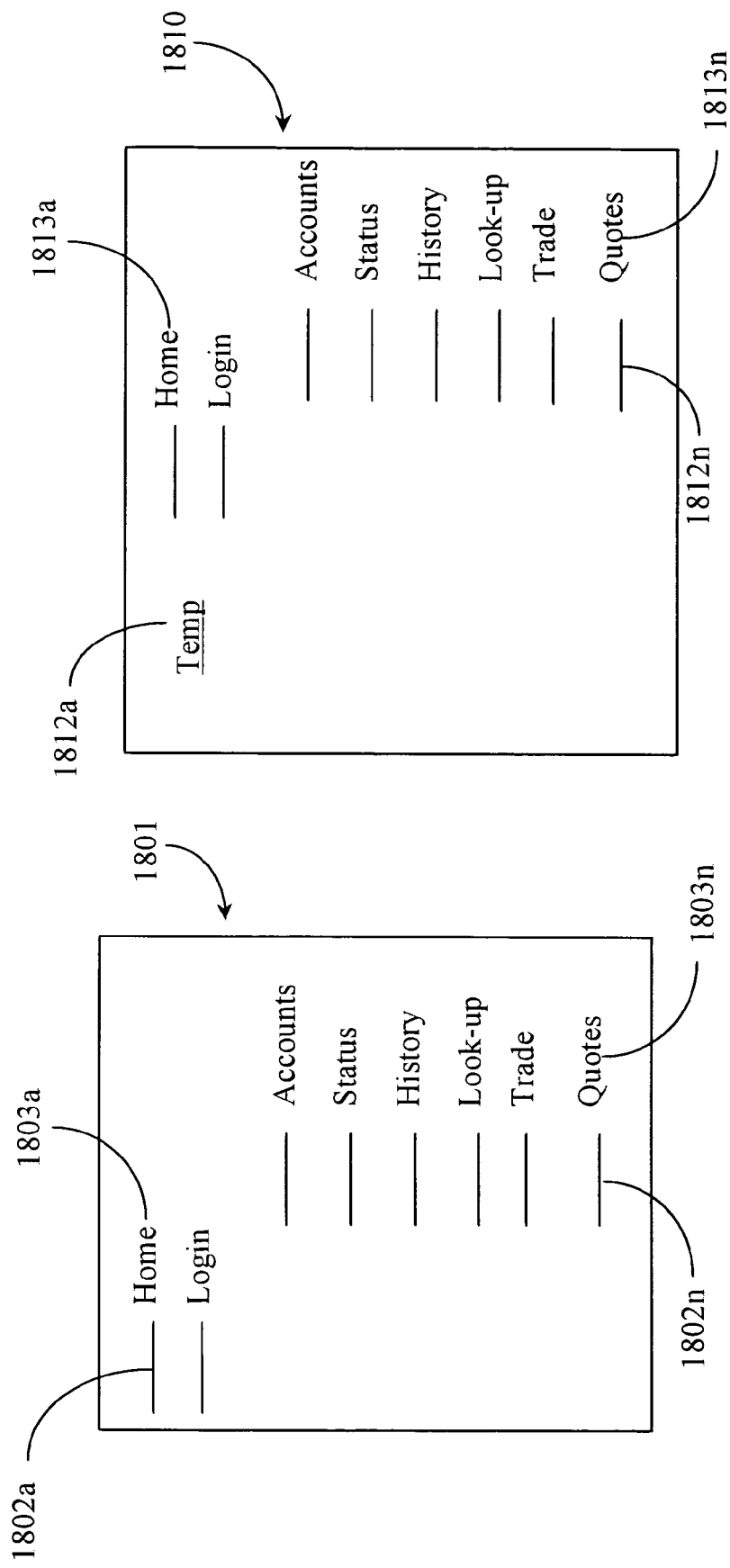
FIG. 18 is a block diagram illustrating a Web-site logical hierarchy harvested and created as an object model.

FIG. 18 is a block diagram illustrating a simple hierarchical structure tree of a Web site 1801 and a harvested version of the site 1810. Screen 1801 illustrates a simple Web site structure tree as might be viewed from a user interface. Selectable icons representing data elements are represented herein as solid lines 1802a through 1802n suggesting that there may be any number of icons provided within any exemplary Web site. For the purpose of this specification, icons 1802a-1802n represent selectable icons, logos, hyperlinks and so on. Classifications of each object 1802a-1802n are illustrated herein as text labels 1803a through 1803n. For example, a selectable icon 1802a is one for navigating to the "home page" of the site as revealed by adjacent classification 1803a. A subsequent icon (1802b) is a login page of the site as revealed by the classification login. In some cases, icons and classifications or labels may be one in the same (visibly not different).

In this example, the hierarchical structure presents a login block, which the user must successfully navigate before other options are presented. The presented options Accounts, Status, History, Look-up, Trade, and Quotes are arranged in a hierarchical structure. For example one must access Accounts first before options for Status (Accounts/Status) or History (Accounts/Status/History) are available to the user. This standard structure may be inconvenient and uneconomical for template filling for the purpose of creating a voice application template for dialog navigation. One reason is that the voice application will be created with an attempt to use all of the data of the Web site, which likely will include graphics, charts and the like that would not be understood by an accessing user if the description is simply translated and recited as a voice dialog over the telephone. Another reason is that the generic hierarchy of Web site structure 1801 may not be of a desired hierarchy for rendering as voice dialog in a request/response format. Typically then, certain data will be valuable, certain data will not be valuable, and the order data is presented at the dialog level will be important to the user as well as to the administrator (service provider).

Screen 1810 represents the same structure of screen 1801 that has been completely harvested wherein all of the icons and elements identified in source code of the site have been obtained for possible template filling. It is noted that the template enables a voice application to operate in the goal of obtaining and rendering updated data according to the constraints established by an administrator. Web site 1810 is pre-prepared for template filling. Icons are labeled 1812a through 1812n and classifications are labeled 1813a through 1813n.

Object 1810 is generated to emulate the generic structure of the Web site including graphics, charts, dialog boxes, text links, data fields, and any other offered feature that is present and enabled in the HTML or other language of the site. Because of the mitigating factors involved with a potentially large number of users accessing a voice portal to receive dialog, much streamlining is desired for user convenience as well as network load stabilization. Therefore, an intermediate step for object modeling elements and reorganizing the tree hierarchy is needed so that a voice application template can be filled according to a desired selection and hierarchy thus facilitating a more economic, optimized construction and execution of a resulting voice application.

The object modeling tools of the invention can be provided as part of client application 141 described with reference to FIG. 1B above. Created objects organized by hierarchy and desired content can be stored in application server 110 described with reference to FIG. 6 above or in a local database accessible to voice application server 110.

Figure 19:
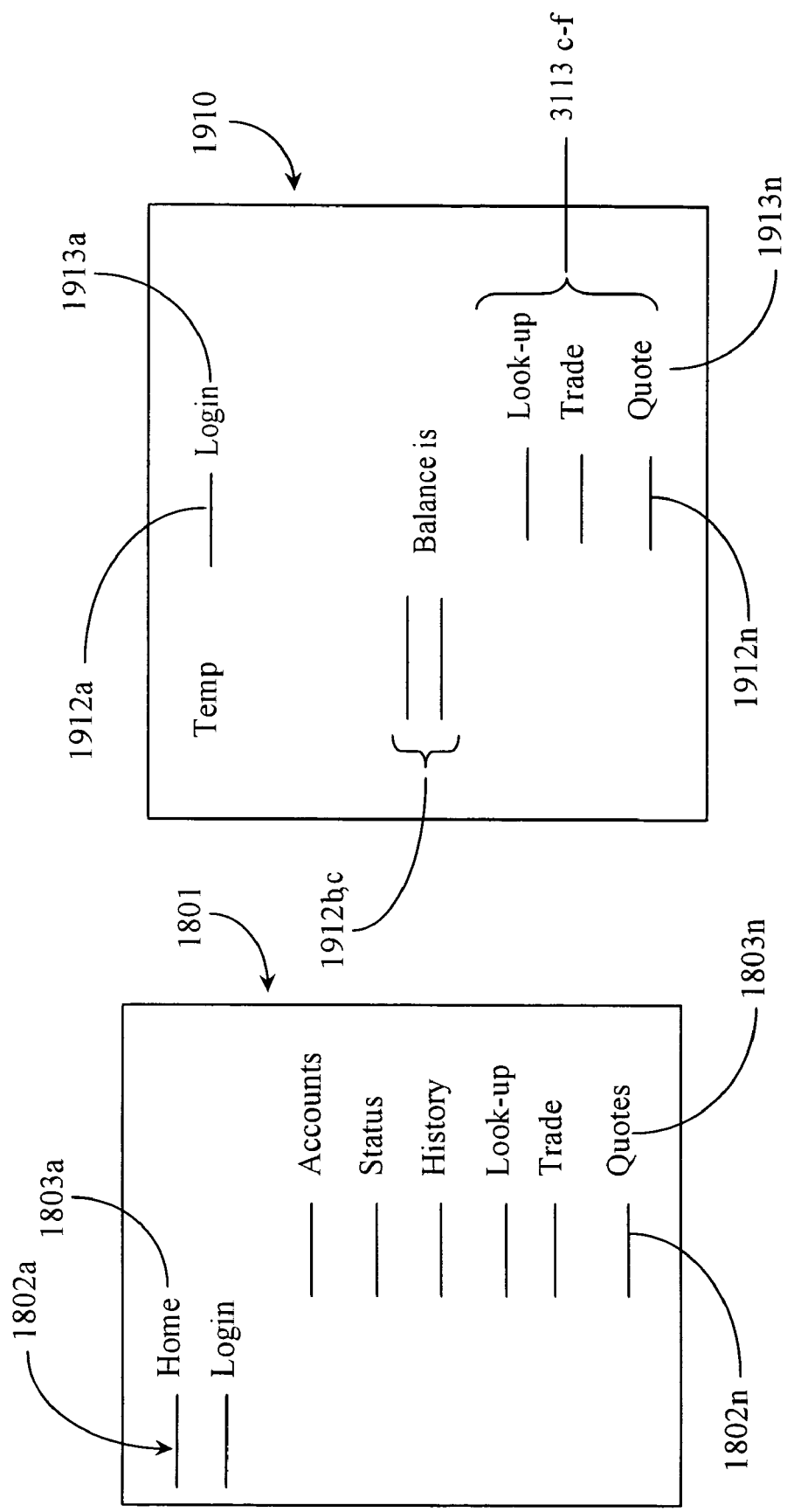
FIG. 19 is a block diagram illustrating the model of FIG. 18 being manipulated to simplify the model for economic rendering.

FIG. 19 is a block diagram illustrating the Web site structure 1801 of FIG. 18 and a Web site object created and edited for template creation. Screen 1801 is analogous to screen 1801 of FIG. 18 both in element and description thereof; therefore none of the elements or description of the elements illustrated with respect to structure 1801 of FIG. 18 shall be reintroduced.

Screen 1910 represents a harvested Web site that started out with structure 1801, but has since been reorganized with element prioritization for the purpose of populating a voice application template in an optimized fashion. It can be seen in this example, that significant editing has been performed to alter the original content and structure of the harvested Web site. Icons 1912a through 1912n illustrated the icons that have been retained after harvesting. 1913a through 1913n represent the classifications of those objects. Firstly, an optimization is noted with respect to icons labeled Home and Login in structure 1801. These items in harvested object 1910 have been optimized through combination into one specified object labeled login and given the element number 1913a. In this case Account Status and History is streamlined to Balance the most valuable piece and the most commonly requested information. Also in this case any charts, graphs or other visuals that may not be understood if rendered as a voice dialog are simply eliminated from the voice application template. The intermediate step for organization before template filling would be inserted in between steps of harvesting the Web site data and populating the voice application header.

After successful login, wherein the user inputs a voice version of the PIN/User Name/Password combination and is granted access to the voice application from a voice portal, the next priority in this example is to enable the user to quickly determine his or her account balance or balances. Element numbers 1912b and 1912c represent 2 balances assuming 2 accounts. There may be more or fewer prioritized icons without departing from the scope of the invention. In this case, the first "voice option" provided through the optimization process is to have account balances recited by telephone to the participating user. The other present and offered options of Look-up, Trade, and Quote, illustrated herein by element numbers 1913c through f are moved into a higher but same level of architecture or structure meaning that they are afforded the same level of importance. All three of these options are related in that a user request or response containing stock symbol information can be used to initiate any of the actions.

Figure 20:
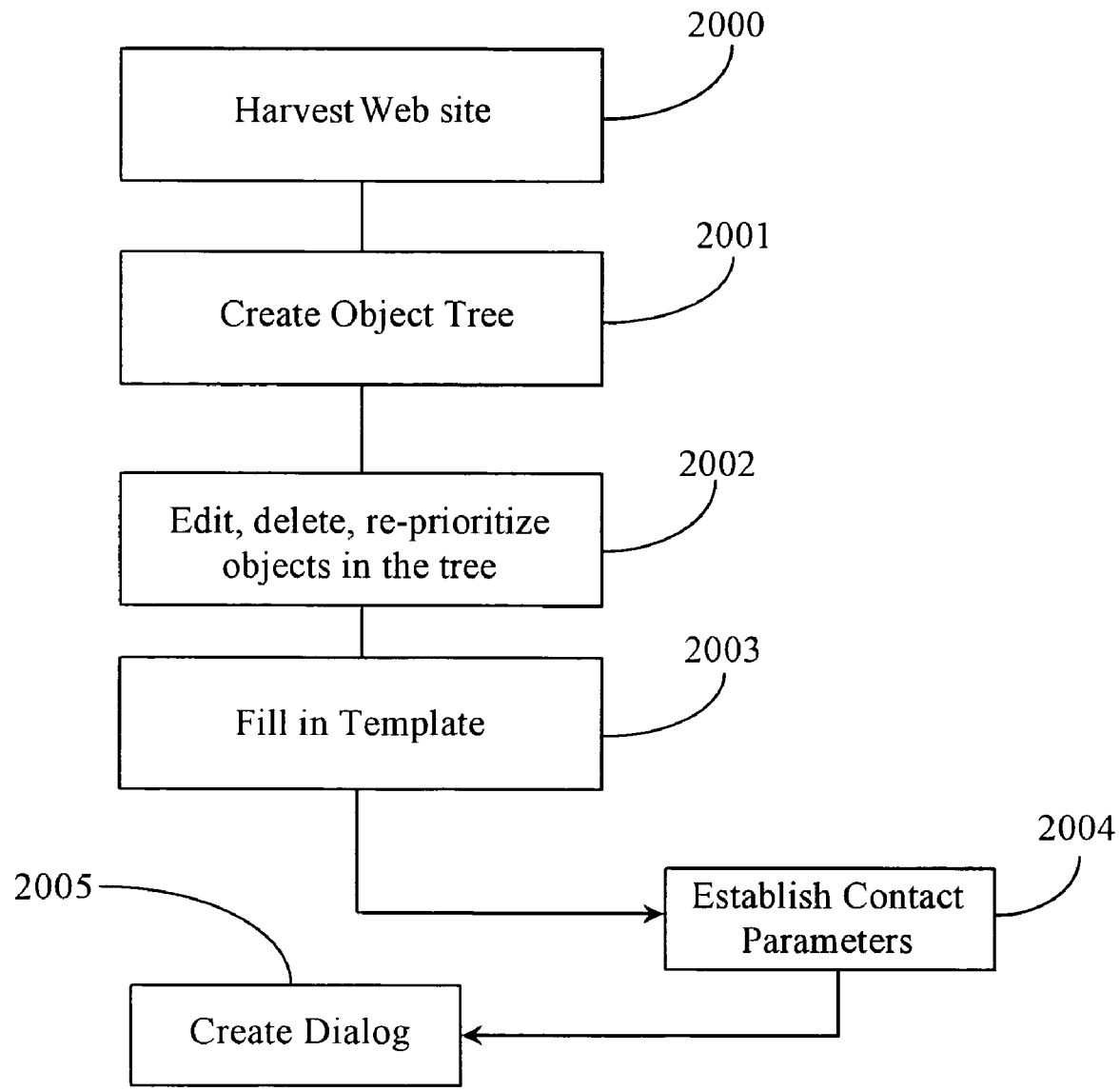
FIG. 20 is a process flow diagram illustrating intermediary steps for reducing complexity of a Web-site logical tree.

FIG. 20 is a process flow diagram illustrating added steps for practicing the invention. At step 2000, an administrator operating client application 141 described with reference to FIG. 17 above harvests the Web-site for source data and data structure. At step 2001, the administrator creates an editable object representing the existing structure hierarchy of the target Web site. The object tree has the icons and associated properties and is executable when complete. In one embodiment, many of the standard icons and properties shared by many Web sites are provided for the administrator so that simple drag and drop operations can be used to create the tree. If a developer has to create a specific object from scratch, the source mark-up language can be used to construct the object from object building blocks representing object components. The new objects can then be saved to storage and re-used.

In one embodiment, rendering the source description as instruction to a modeling engine automatically creates the object tree. In this case, the harvested object is presented to the administrator as harvested and "ready to edit" wherein steps 2000 and 2001 are largely if not completely transparent to the administrator. In another embodiment, the administrator simply drags and drops icons using a mouse provided with the workstation employed to do the modeling.

At step 2002, the administrator may edit some objects to make them fit the constraints of VXML voice rendering more completely. In the same step he or she may delete certain objects from the tree altogether. Still further in the same step the administrator may move and group objects according to priority of rendering. If a Web site contains a login requirement it will, of course, be the highest priority or the first executable dialog of the resulting voice application. Complicated logins may be simplified. Moreover one or more objects can be combined to be rendered in a same dialog. There are many possibilities.

In still another embodiment, an object tree may be flattened to one level or an object tree may be expanded to contain more levels. The administrator may also insert content (rendered to dialog) that was not originally available from the Web site. The new content may be placed anywhere in the object tree and will subsequently take its place of priority in the resulting dialogs of the voice application. Once the voice application is complete, the initiation and execution of the application lends to data access and retrieval of any new data at the site. A standard navigation template is used to access the site and data is retrieved only according to class of data identified in the object tree. In this way unwanted data is not repeatedly accessed multiple times from a same Web site.

In step 2003, the voice application template is populated as described above. At step 2004, the administrator can begin to parameterize the voice application execution including establishment of all of the CTI contact parameters. At step 2005, the administrator can create dialog.

It will be apparent to one with skill in the art that pre-organizing Web harvested content for voice rendering is an extremely useful step for reducing complexity, reducing network and processor load, and for providing only pertinent and useful voice renderings to users accessing or contacted in the sense of outbound dialing from a connected voice portal system.

Enhanced Security

Figure 21:
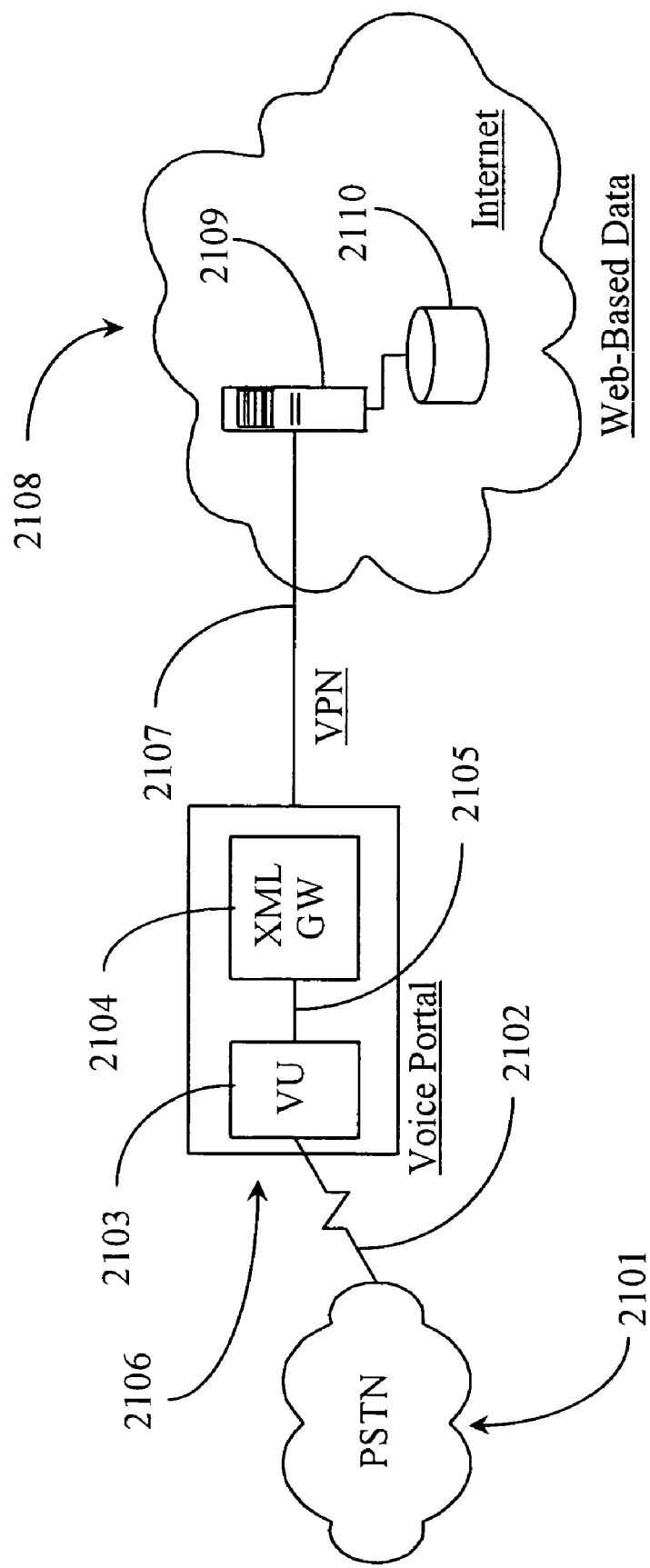
FIG. 21 is a block diagram illustrating a secure connectivity between a Voice Portal and a Web server according to an embodiment of the invention.

FIG. 21 is a block diagram illustrating a secure connectivity between a Voice Portal and a Web server according to an embodiment of the invention.

The connection scheme illustrated in this example connects a user (not shown) accessing a voice portal 2106 wherein portal 2106 has network access to Web-based data illustrated herein within Internet 2108, more particularly from a Web server 2109 connected to a database 2110.

Voice portal 2106 comprises a voice application server (VAS) 2103 connected to an XML gateway 2104 by way of a data link 2105. In this embodiment, data hosted by server 2109 is culled there from and delivered to XML gateway 2104 by way of line 2107. Application server 2103 then generates voice applications and distributes them to users having telephone connection to PSTN 2101. Telephony switches, service control points, routers and CTI-enabled equipment known to telephony networks may be assumed present within PSTN 2101. Similarly, routers servers and other nodes known in the Internet may be assumed present in Internet 2108. The inventor deems the illustrated equipment sufficient for the purpose of explanation of the invention.

Typically, a voice access to voice portal 2103 from anyone within PSTN 2101 may be assumed to be unprotected whether it is an inbound or an outbound call. That is to say that anyone with a telephone line tapping capability can listen in on voice transactions conducted between users phones and the voice application server. Typically, prior art conventions with phone transactions such as IVR entry of social security and PIN identification is sufficient to access account information. However, anyone else with the same information can also access the user's automated account lines to find out balance information and so on.

Server 2109 may be protected with Web certificate service wherein a user (on-line) accessing any data from server 2109 must send proof of acceptance and signature of the online authentication certificate. These regimens are provided as options in a user's Browser application.

One way to extend security to the point of XML gateway 2104 is through a completely private data network. A less expensive option is a VPN network as is illustrated in this example. Another way is through SSL measures such as HTTPS. Any of these methods may be used to extend the security regimens of server 2109 to Voice portal 2106. In this embodiment, gateway 2104 is adapted to operate according to the prevailing security measures. For example, if a user goes online to server 2109 changes his or her password information and signs a Web authentication certificate, the same change information would be recorded at the voice portal.

The only security lapse then is between a user in the PSTN and portal 2106. Information sent as voice to any user and response voice sent from any user can be obtained by tapping into line 2102. One possible solution to protect privacy to some extent would be to use a voice translation mechanism at the voice portal and at the user telephone. In this way, the voice leaving the portal can be translated to an obscure language or even code. At the user end, the device (not shown) translates back to the prevailing language and plays on a delay over the telephone speaker system.

One with skill in the art will recognize that an additional advantage of using the existing security, VPN, SSL, etc. is that the security system has already been tested, and is being constantly improved. One with skill in the art will also recognize that many variations can be provided without departing from the spirit and scope of the invention. For example outsource WEB hosting may be used. Multi site WEB systems can be used for redundancy. Outsourced Voice services or multi service/location voice services may also apply.

Vocabulary Management for Recognition Options

According to yet another aspect of the invention, the inventor provides a vocabulary management system and method that enhances optimization of voice recognition software. The method and apparatus is described in the enabling disclosure below.

Figure 22:
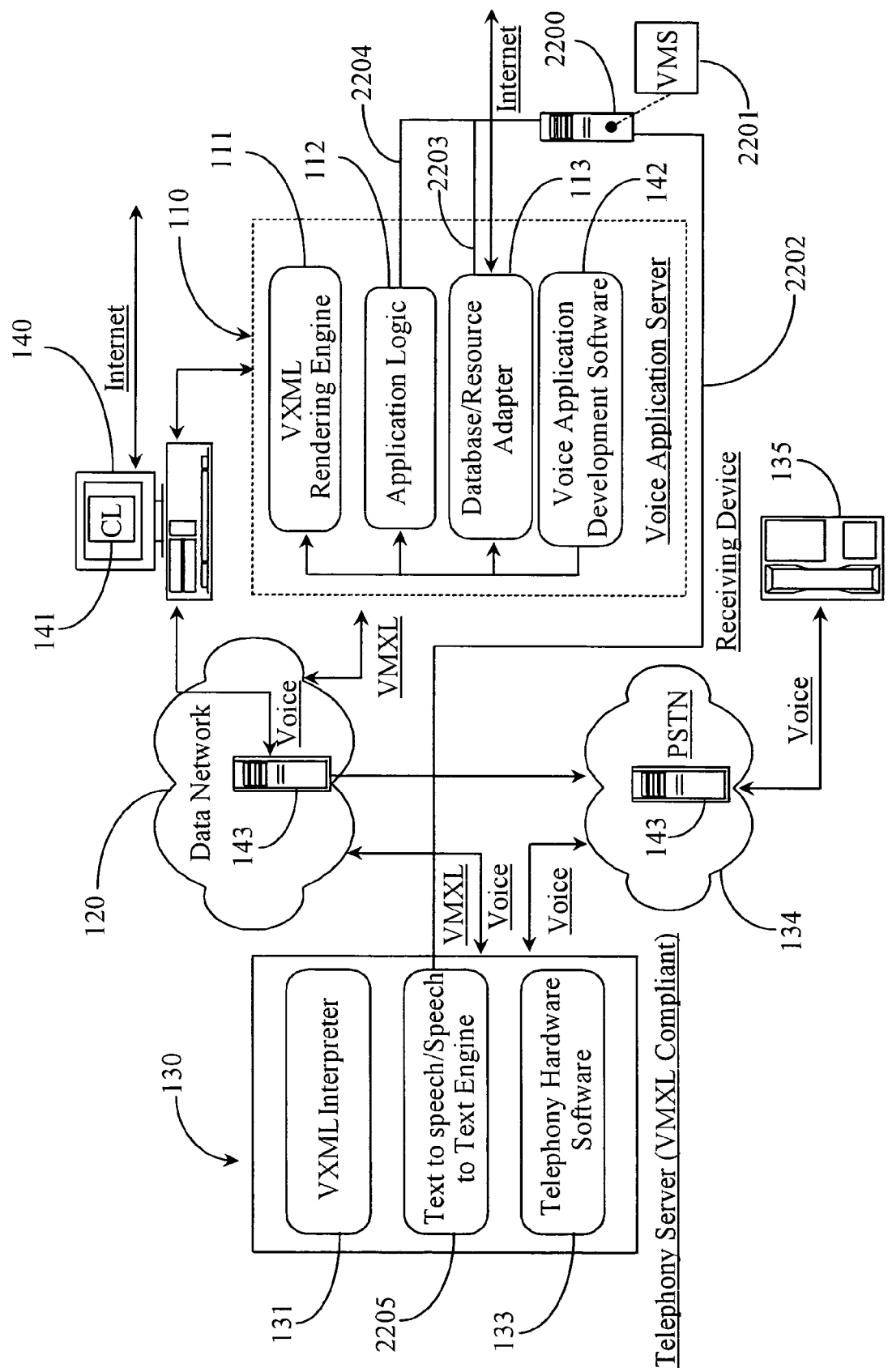
FIG. 22 is a block diagram illustrating the architecture of FIG. 1B enhanced with a vocabulary management server and software according to an embodiment of the present invention.

FIG. 22 is a block diagram illustrating the architecture of FIG. 1B enhanced with a vocabulary management server 2200 and software 2201 according to an embodiment of the present invention.

The system architecture of this embodiment is largely analogous to the architecture discussed with reference to FIG. 1B above. Therefore, elements present in both examples FIG. 1B and FIG. 22 shall not be reintroduced unless modified to practice the present invention.

Vocabulary management server 2200 is adapted with an instance of vocabulary management software (VMS) 2201 for the purpose of tailoring voice recognition template options to just the required vocabulary to fully enable the instant voice application.

Server 2200 may be presumed to have a data storage facility connected thereto or held internally therein adapted for the purpose of warehousing and organizing data. With regard to harvesting Web data and using the harvested Web data as source data for voice dialog as described further above with reference to the example of FIG. 17, the Web-based components are represented in this embodiment by Internet access lines, one connected from workstation 140 giving it Web access and another connecting voice application server 110 giving it access through database/resource adapter 113. In this way, Web-access to any targeted Web-based data for auto harvesting, interpretation, and translation to voice dialog is assumed.

Server 2200 can be accessed from workstation 140 running client application 141 through voice application server 2202 or more particularly through database resource adapter 113 over a data link 2203. In this way, an administrator can set-up and manipulate vocabulary options attributed to specific on-line or off-line (internal) data sources.

VMS software 2201 is adapted to enable separate and segregated sets of vocabulary specific to certain target data accessed and function allowed in conjunction with the target data. In one embodiment, additional subsets of vocabulary of a same target data source can be provided that are further tailored to specific clients who access the data through interaction from portal 143 over PSTN 134. Rule sets specific to the created vocabulary sets are created and tagged to the specific vocabulary sets and provided to application logic 112.

VXML compliant telephony server 130 has a text-to-speech and a speech-to-text capable engine 2205 provided therein as an enhanced engine replacing engine 132 described with reference to FIG. 1B. In one embodiment the separate functions may be enabled by separate components. The inventor illustrates a single engine with dual capabilities for illustrative purpose only. Engine 2205 has access to vocabulary management server 2200 through a data link 2202.

Server 2200 is accessible from application logic 112 of voice application server 110 by way of a data link 2204 and from database resource adapter 113 by way of a data link 2203. In one embodiment, a single data link is sufficient to enable communication between the just-mentioned components in voice application server 100 and server 2200.

In practice of the invention, assuming a Web-based data source is accessed, the voice recognition operates in a different way from previously described embodiments. For example, assume a client is accessing voice portal 143 in PSTN 134 from telephone 135 to interact with his or her personal investment Web page that contains option for account balance rendering and for stock trading. A specific vocabulary for the target Web site is available in server 2200 managed by VMS 2201. Perhaps a sub-set of the vocabulary particular to the client also exists and is organized under the parent vocabulary set.

Telephony server 130 recognizes the accessing user and an existing voice application is triggered. Voice application server 2202 connects to the Web site on behalf of the user through database resource adapter 113 and the Internet access line. Following the constraints of the voice application template, the database resource adapter provides the user login and password information after the user communicates these in the first or opening dialog and then gets the account data and any other updated data that the user is entitled to. The first dialog response rendered to the user from the voice application may contain only the stock values pertinent to the user account and the existing monetary balances associated with the specific symbols. While there may be more information available to the user, some of the available information may not be pertinent to or useful to the user. Therefore, before each dialog rendering, VMS 2201 provides the appropriate vocabulary and rule set for the particular dialog function, in some cases particular as well to the accessing user. Therefore, voice recognition software is not required to search a large vocabulary to intemperate the rendered VXML page. In this case, the VXML page itself is limited by the vocabulary management function before it is delivered to telephony server 130.

In another embodiment, intervention from VMS 2201 may occur after the standard VXML page is rendered but before voice recognition begins in server 130. In this case, engine 2205 consults server 2200 to obtain the appropriate vocabulary constraints. In this example data not recognized from VXML is simply dumped. There are many differing points along the dialog process where VMS 2201 may be employed to streamline the voice recognition function. For example, in the first dialog response described further above, the user may be prompted to initiate any desired trading activity. If the user elects to do some trading then the speech to text portion of engine 2205 may consult VMS 2201 for a limited trading vocabulary that is tailored to that client. Such a vocabulary may be expanded for a different client that is, for example, a VIP and has, perhaps more allowable options. Voice renderings from the client that do not match the provided vocabulary and/or do not conform to the rules are ignored.

In addition to personalizing and streamlining vocabulary options for voice recognition, an administrator can use VMS to create new vocabulary and/or to create a plurality of synonyms that are recognized as a same vocabulary word. For example, an administrator may configure stock, share, and security as synonyms to describe paper. Sell, short, and dump may all be understood as synonyms for selling paper. There are many variant possibilities. In general, VMS 2201 can be applied in one communication direction (from service to user) as a management tool for limiting data on a VXML page for rendering, or for limiting voice recognition of the VXML page and dumping the unrecognized portion. VMS 2201 can be applied in dialog steps in the opposite direction (from user to service) to tailor voice recognition options allowed for a user or a user group according to service policy and constraint.

In an embodiment where VMS 2201 works only with the VXML stream, it may be located within application server 110 or within telephony server 130. It is conceivable that different dialogs (both initial and response dialogs) of a same voice application for a same client accessing a single data source can be constrained using different vocabulary sets using VMS 2201. Therefore the optimum level of management capability is at the level of action/response. By limiting the work of voice recognition processing at every available step during interaction, much processing power and bandwidth can be reserved for other uses.

Local Cache Optimization (Static, Dynamic)

In yet another aspect of the present invention a method and apparatus for reducing data traffic is provided that uses local cache optimization in a VXML distribution environment.

Figure 23:
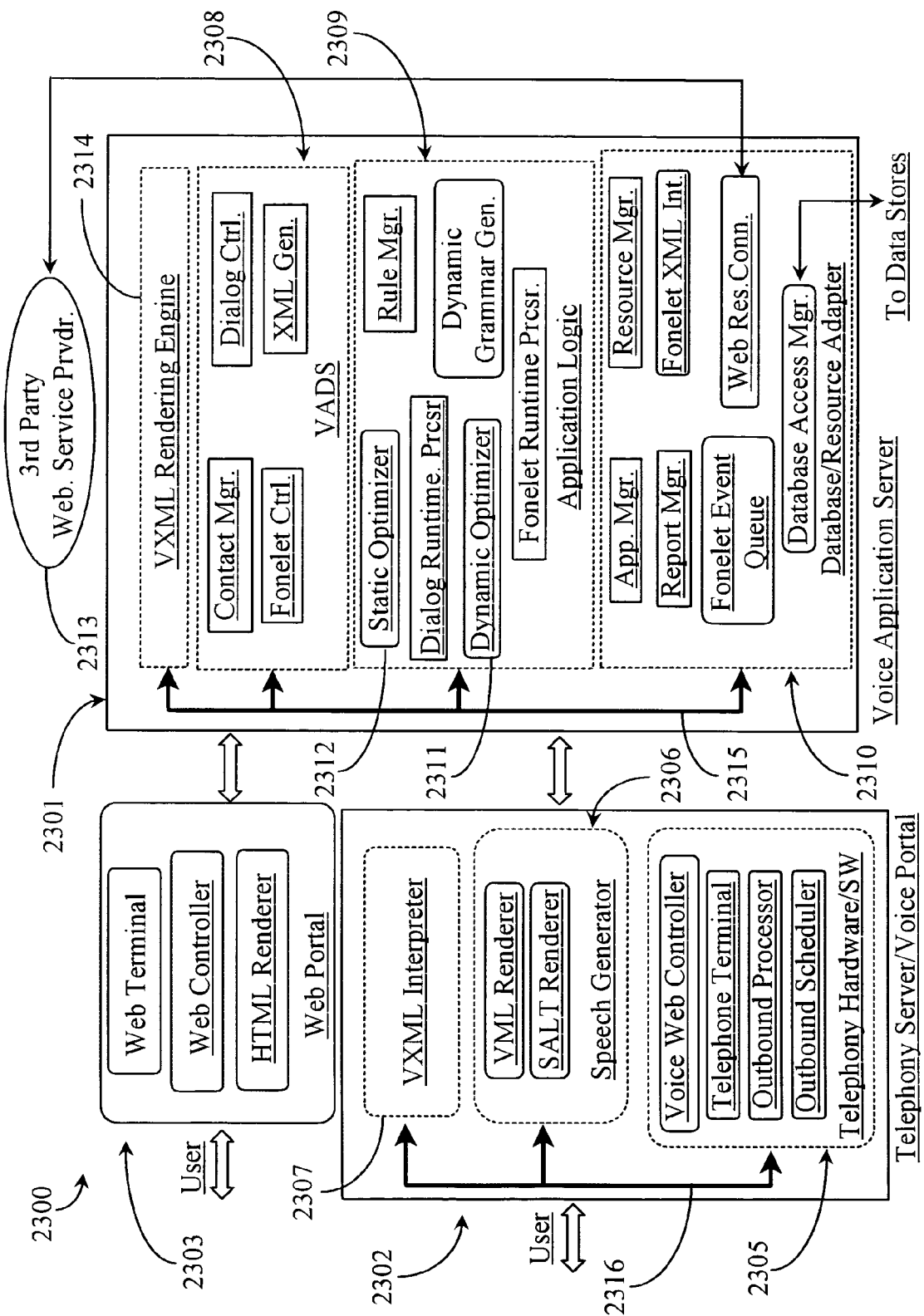
FIG. 23 is a block diagram illustrating various functional components of a VXML application architecture including cache optimization components according to an embodiment of the present invention.

FIG. 23 is a block diagram illustrating various functional components of a VXML application architecture 2300 including cache optimization components according to an embodiment of the present invention. FIG. 23 is quite similar to FIG. 1, except that it is updated and shows additional detail.

Architecture 2300 comprises basically a voice application server 2301, and a telephony server/voice portal 2302 as main components. Portal 2302 comprises a speech generator 2306 and a telephony hardware/software interface 2305. Portal 2302 is VXML compliant by way of inclusion of a VXML interpreter 2307 for interpreting VXML data sent thereto from application server 2301. Voice portal 2302 is maintained as an access point within a telephony network such as the well-known PSTN network. However, portal 2302 may also be maintained on a wireless telephony network.

A Web interface 2303 is illustrated in this example and serves as an access point from the well-known Internet or other applicable DPN. Voice portal 2302 may represent a CTI-enhanced IVR system, customer service point, or any other automated voice portal system. In the case of a Web-based portal, component 2303 may be a Web server, a computer connected to the Internet, or any other type of node that provides a user interface.

Voice application server 2301 is similar in many respects to voice application 2202 described with reference to FIG. 22. In this regard, voice application server has voice application development software (VADS) 2308 installed and executable thereon. VADS 2308 illustrated within the domain of voice application server 2301 has certain modules that shall herein be described using labels and shall not have element numbers assigned to them because of limited drawing space. Modules illustrated in VADS 2308 include a contact manager (Contact Mgr.) instance adapted as a developers tool for managing the parameters of dialog recipients. A dialog controller (Dialog Ctrl.) is provided as a developer tool for creating and managing voice application dialogs and for initiating interface operations to rules sources and internal/external data sources. A Fonelet controller (Fonelet Ctrl.) is provided within VADS 2308 and adapted to control the distribution of subsequent dialogs of a voice application. An XML generator (XML Gen.) is provided within VADS 2308 and adapted to generate XML for VXML pages.

Voice application server 2301 has application logic 2309 provided therein and adapted to control various aspects of application delivery, creation, and management. Application logic 2309 includes a rule manager (Rule Mgr.) for providing the enterprise rules for application creation and deployment via the contact manager and dialog controller referenced above, and rules for ongoing user and system interactions with running applications. A dialog runtime processor (Dialog Run T. Prcsr.) is provided and adapted to control the way a completed dialog of a voice application is launched and formatted. A Fonelet runtime processor (Fonelet Runtime Prscsr.) is provided within application logic 2309 and controls various and sundry aspects of how voice applications (Fonelets) are executed and choreographed in real time. A dynamic grammar generator (Dynamic Grammar Gen.) is provided within application logic 2309 and is adapted to generate grammar keywords in association with non-recurring dialog content wherein the user, to retrieve instant results in a dynamic fashion, can speak the generated keywords.

New components not before introduced within the application logic in server 2301 are a static optimizer 2312, and a dynamic optimizer 2311. The goal of the present invention is to optimize reduction of data traffic between portals 2302 and 2303 (if Web enabled) and voice application server 2301. Accomplishing a reduction in data traffic between the voice application server and voice portals is especially important where the components are remote from one another and connected through relatively narrow data pipelines. Such pipelines can become bottled up with data at peak performance periods during operation causing a notable delay in response time at the voice portals. More detail about optimizers 2312 and 2311 and their relationship to the dialog runtime processor will be provided later in this specification.

Server 2301 has a data/resource adapter block 2310 that contains all of the required modules for interfacing to external and to internal data sources. For example, an application manager (App. Mgr.) is provided within adapter 2310 and is adapted as a main interface module to user-end systems such as portals 2302 and 2303. The application manager provides the appropriate data delivery of dialogs in order of occurrence, and in a preferred embodiment of the invention delivers static and dynamic dialog pieces (determined through optimization) for storage to one or more cache systems local to the user's end system. More about the role of the application manager will be provided further below.

A report manager (Report Mgr.) is within adapter 2310 and is adapted to work with the application manager to provide reportable statistics regarding operation of voice application interactions. Report manager tracks a Fonelet (voice application) until it is completed or terminated. Background statistics can be used in the method of the present invention to help determine what dynamic (non recurring) dialog pieces of a voice application should be cached locally on the user-end.

A third-party Web-service provider 2313 is illustrated in this example as external to server 2301 but linked thereto for communication. Third-party service 2313 represents any third-party service provider including software that can be used to tap into the voice application development and deployment services hosted within server 2301. Thin software clients licensed by users fall under third-party applications as do Web-based services accessible to users through traditional Web sites. To facilitate third-party connection capability, server 2301 has a Web resource connector (Web. Res. Conn.) that is adapted as a server interface to third-party functions. A Fonelet event queue (Fonelet Event Queue) is provided within adapter 2310 and is adapted to queue incoming and outgoing Fonelet (voice application) events between the server and third-party-provided resources. A Fonelet XML interpreter (Fonelet XML Int.) is provided within adapter 2310 and adapted to interpret XML documents incoming to or outgoing from the Fonelet event queue.

A resource manager (Resource Mgr.) is provided within adapter 2310 and is adapted to manage access to all accessible resources both external and internal. It is noted that internal resources may be maintained within the server itself, or within a domain of the server, the domain including other systems that may be considered within the domain such as internal data systems within a contact center hosting the voice application server, for example. A database access manager (Database Access Mgr.) is provided within adapter 2310 and is adapted to facilitate data retrieval from persistent data storage provided and associated with data stores located internally to the domain of server 2301.

A VXML rendering engine 2314 is provided within application server 2301 and is adapted to render VXML pages in conjunction with the dialog controller in VADS 2308. Rendering engine 2314 is analogous to engine 111 described with reference to FIG. 22 and FIG. 6 above.

Server blocks 2310, 2309, 2308, and engine 2314 communicate and cooperate with one another. Communication and cooperation capability is illustrated in this example by a logical sever bus structure 2315 connecting the blocks for communication. A similar logical bus structure 2316 is illustrated within portal 2302 and connects the internal components for communication.

As previously described above, a voice application, once launched comprises a series of interactive dialog pieces that produce both static and dynamic results. For example, a company greeting that is played to every caller is considered a static greeting because there are no dynamic changes in the dialog from caller to caller. However, a dialog response to a user-request for a stock quote is considered dynamic because it can vary from caller to caller depending on the request. Similarly, data results pulled from a database or other external data source that are embedded into response dialogs cause the dialogs themselves to be considered dynamic because, although the basic template is static the embedded results can vary between callers.

Static optimizer 2312 and dynamic optimizer 2311 are provided to work in cooperation with the dialog runtime processor to identify pieces of dialog that should be distributed to end system cache storage facilities for local access during interaction with an associated voice application. Optimizers 2312 and 2311 are software modules that monitor and read dialog files during their initial execution or when the associated voice application is modified. Static optimizer 2312 cooperates with the rule manager and tags, according to business rule, certain files that can be labeled static or recurring files that do not change from caller to caller. Dynamic optimizer 2311 cooperates with the rule manager and tags, according to business rule, certain files that are non-recurring from caller to caller, but are repeated often enough to warrant distributed caching to a cache local to an end system through which the associated voice application is accessed.

In one embodiment, optimizers 2312 and 2311 are embedded modules running within the dialog runtime processor. In another embodiment, the optimizers are separate modules that are activated by the runtime processor when it processes dialogs of a particular voice application.

When an administrator changes a voice application, or when a brand new voice application is created, then optimization processes of optimizers 2311 and 2312 are invoked to determine which data out of the application flow needs to be cached. Tagging can take the form of various file identification regimens known in the art. In a preferred embodiment, standard HTTP1.1 tagging is used. The optimizing components 2312 and 2311 can either add tags to untagged files, or, in some cases remove tags from already tagged files. This automated process allows an administrator to create dialogs without worrying about distribution issues that are associated with data traffic between servers.

For static files, optimizer 2312 identifies which files to cache at an end system, tags them appropriately and prepares the tagged files for distribution to identified end-system cache. In the case of portal 2302 being the end system, the static files of a voice application would be stored locally in block 2305 in server cache. In one embodiment, the distributed static files are cached at a first deployment of a recently modified or brand new voice application. The first consumer to access the application will not experience any optimum performance due to the fact that the static files are cached during the first interaction. However, a subsequent consumer accessing the application from portal 2302, or a first caller that repeats the static portion of the application will experience a performance increase because the telephony server will access and serve the static portion of the application from local cache instead of retrieving the dialogs from application server 2301 every time they are requested. It is noted herein that caching static and dynamic content is temporary in a preferred embodiment. That is to say that when a voice application is no longer used by the enterprise, or is replaced by a new application, the unnecessary files are deleted from the cache systems.

Once static dialogs from voice applications are distributed to and cached within the telephony server portion of portal 2302, they can remain in cache for subsequent retrieval during subsequent interaction with associated voice applications. However, if a voice application is subsequently modified by an administrator and different dialogs are now identified as static cacheable dialogs, then those dialogs already cached will be replaced with the newer updated static dialogs. Any common form of identification and revision strategy can be used to synchronize the appropriate static files. Some dialogs may simply be dropped from an application being modified while other static dialogs may be newly added. In these instances of subsequent application modification concerning the presence of new, deleted or modified files that are deemed static, the synchronization of these files with those already stored can take place before an application is scheduled to be deployed to the end system, or during runtime of the application.

In a preferred embodiment of the invention caching of dynamic files is performed in the voice Web controller module within telephony software/hardware block 2305 of portal 2302. Dynamic files are different than static files as dynamic files do not have to be retrieved during every execution and interaction with a voice application. Therefore, dynamic retrieval occurs only after user interaction with a voice application has begun. Statistical analysis can be used at voice application server 2301 to determine over several voice application deployments, which files make sense to continue to distribute to end-system cache facilities and, in some cases which files already cached for dynamic optimization should be deleted and subsequently removed from end-system local access.

Figure 24:
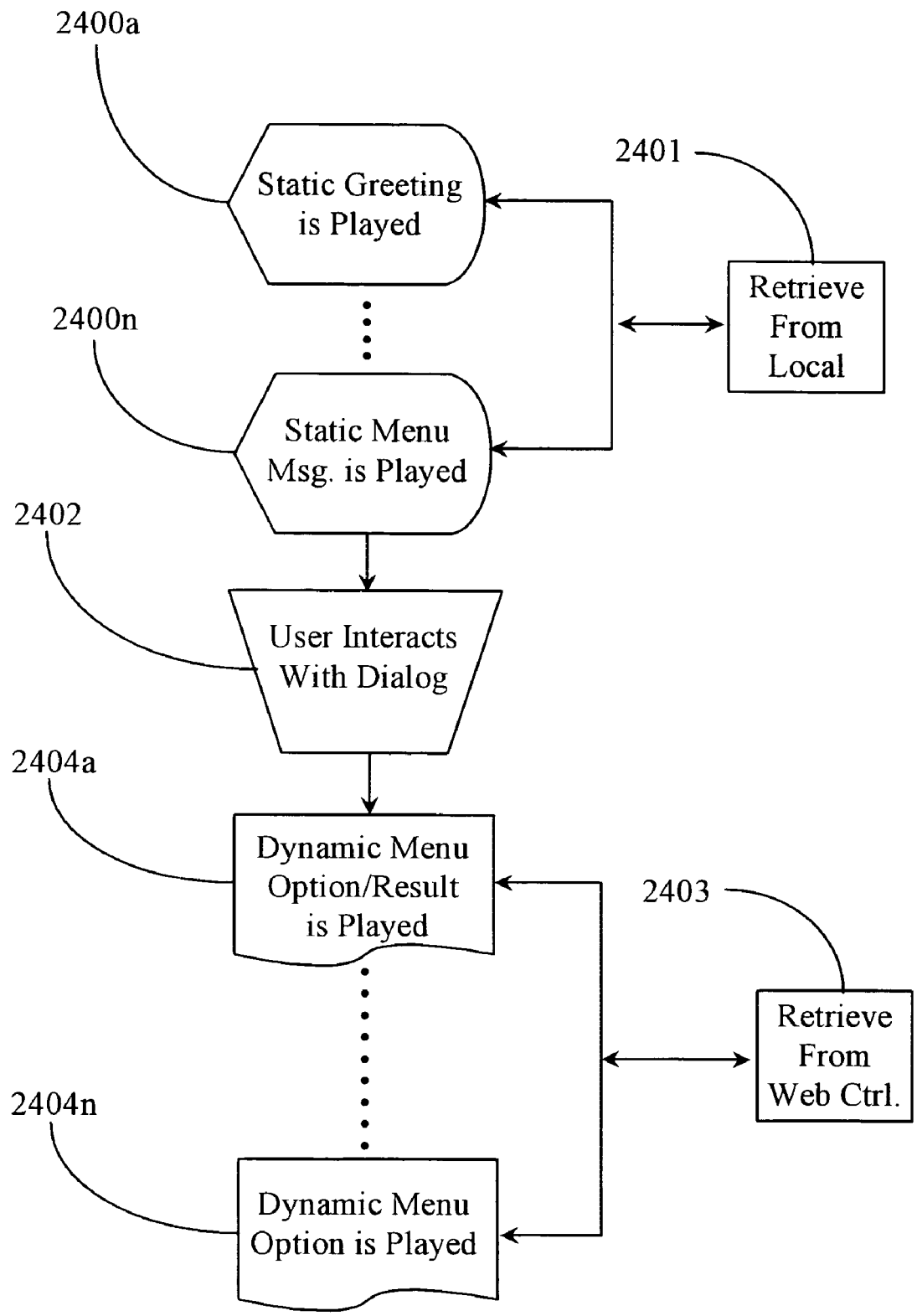
FIG. 24 is a process flow diagram illustrating steps for practice of the present invention.

FIG. 24 is a process flow diagram illustrating steps for practice of the present invention. At step 2400$a$, a static greeting message is played such as "thank you for calling XYZ corporation". Once a voice application containing this dialog has been accessed from an end system, the particular dialog is stored locally if it is identified as a static dialog. Each time a subsequent access is made to the same voice application, greeting 2400$a$ is pulled from local cache in step 2401 when ordered.

At step 2400$n$ a last static message is played, which in this embodiment represents a menu message. It will be appreciated that there may be multiple static dialogs in a voice application as indicated in this example by the element assignment of 2400$a$-$n$ in this example. Each time any static message 2400$a$-$n$ is required in the voice application execution, it is pulled from local cache in step 2401. The message played at step 2400$n$ is a precursor to interaction such as "We have changed our menu. Please listen carefully. Your phone call may be recorded for training purposes."

Because messages 2400$a$-$n$ are played at the beginning part of, for example, an IVR interaction regardless of who the caller is, they can be statically cached within the telephony server representing the accessed end system or application consumer. As previously described above, HTTP1.1 standard tags may be used to indicate which material to cache. The local server keeps the static files in store and uses them according to the appropriate application flow whenever a call comes in to the number or extension of that particular voice application. In some cases voice applications will be numerous at a single contact number with extensions separating them for access by callers.

Without local caching of the static content, then the telephony server would typically make a request to the Web controller, which would then send a request to the runtime processor and fetch the message from the dialog runtime processor. The sound file would be sent from the processor back over the same network connection to the telephony server for instant play. It will be appreciated that local caching of dialog portions of a dynamic interactive voice application save significant bandwidth between the portal and the application server. Examples of other types of static dialogs that may be cached locally to an end-system include hours of operation, location or driving instructions, billing address, and so on which, in essence, never change dynamically.

At step 2402, a user interacts with the voice application by initiating a selection resulting from the menu option dialog of step 2400n. At step 2403a a dynamic menu option or result is played. The option or result is retrieved as a result of the user-initiated selection or interaction to a previous static dialog. Therefore the next dialog the user hears is considered non-recurring or dynamic. This means that the result or menu option can vary in content from call to call, the variance ordered by the first user interaction with the voice application.

The rules that will govern whether or not to distribute a dialog to the local cache of an end-system through which a particular voice application is accessed can vary according to content, number of possible options or results, and in some cases statistical probability. For example, if a voice application is created for a banking institution wherein a dynamic menu has options for being transferred to a loan officer, a standard teller, or an automated account attendant, and statistically, 90% of all callers choose the transfer to the automated attendant, then the subsequent beginning dialog of the voice application associated with automated banking can be cached locally. In this case, the first 2 options request a live connection thereby terminating the voice application. The $3^{rd}$ option links to another dialog of the same application or to another application entirely. It will follow then that the next dialog may be static because it merely asks the caller to enter identification criteria. It is the same dialog for all callers who select "automated attendant".

It is noted that criteria for dynamic optimization may vary widely. For example, personal information results embedded into a standard dialog template must be retrieved from the data sources of the institution and cannot be locally cached. However, the standard menu soliciting the interaction resulting in data fetch of personal information can be cached locally.

Dialogs that are assigned to dynamic caching are retrieved from a Web controller in step 2403 each time they are selected. Moreover, step 2402 may occur repeatedly between dynamically cached dialogs. At step 2403n, a last dynamic menu option is played in a voice application sequence. It may be that statistically only a few users navigate to the end of the voice application or last menu. Therefore it may not be considered for local caching. However, many standard dynamic options and results can be dynamically cached in the event that probability is high that a large number of callers are going to request the option or result.

Results that typically are not fluid such as, perhaps the desired model and make of a product are dynamic results because there are other results available for return through interaction with the interactive menu. The most popular results can be dynamically cached as dialogs that can be retrieved locally even though every caller will not interact with the same result. Optimizers share database accessibility with all of the other modules described with respect to the application server of FIG. 23. Therefore, results that are commonly requested, although not completely static can be embedded into the dialog template and saved locally as a voice application dialog linked through to a certain selection made as a response to a previous dialog of the same application.

In some cases of dynamic caching, the standard dialog is there without the embedded results, which are dynamic. In this case, a client application can be provided that retrieves the requested data using the voice application server as a proxy and embeds the data into the template locally to the user wherein after the user has accessed the data and moved on in the application, the embedded data is then deleted from the template until the next invocation. There are many possibilities.

It will be apparent to one with skill in the art that the method and apparatus of the invention can be applied to access of both internal data sources as well as external data sources wherein some of the external data sources are network-based data sources analogous to Web-hosted data and data available over other types of digital data networks.

Text to Speech Preprocessing

In one aspect of the invention, a text-to-speech preprocessor is provided as an enhancement to the voice application system of the invention. The method and apparatus of the invention is described in detail below.

Figure 25:
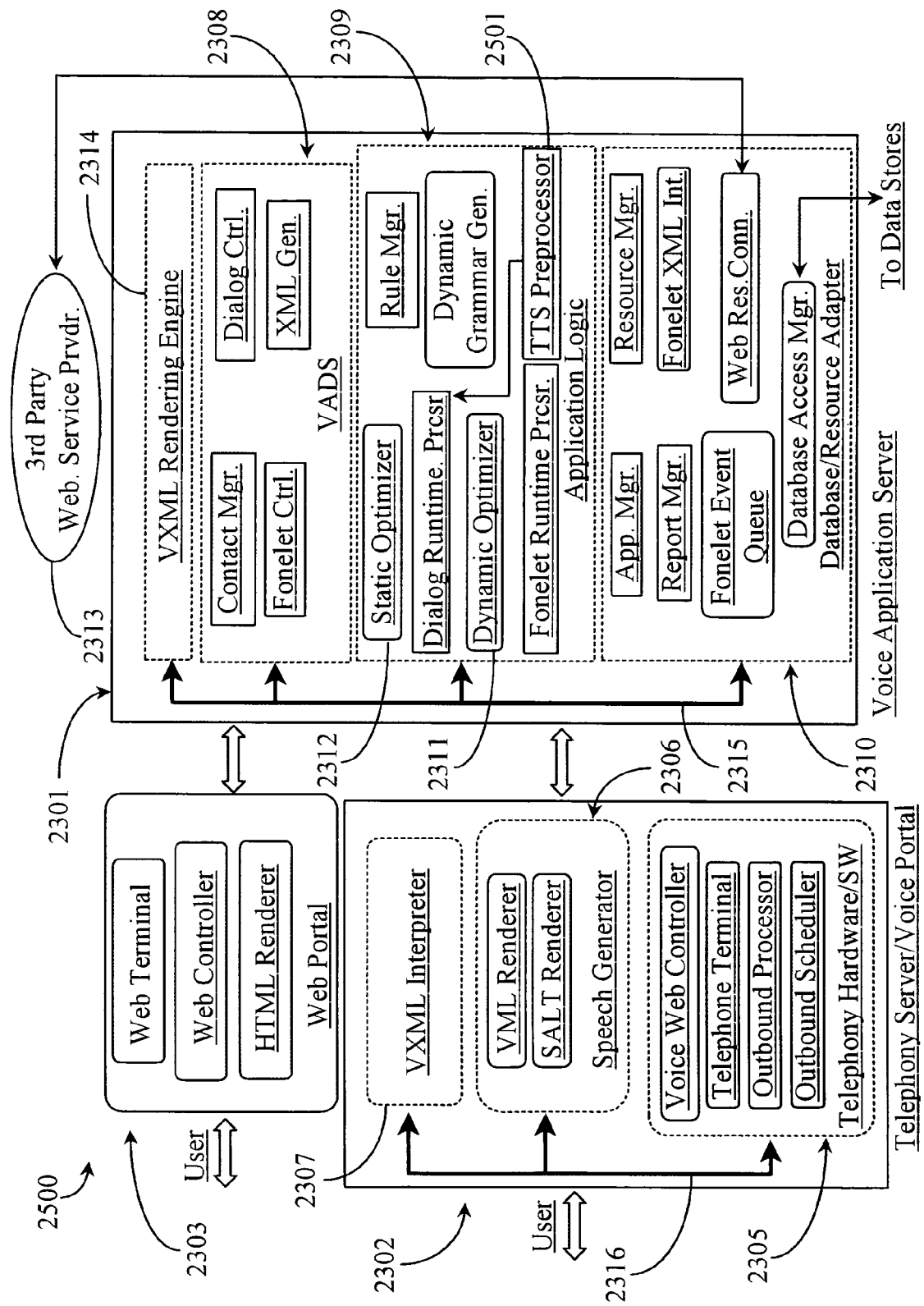
FIG. 25 is a block diagram of the VXML architecture of FIG. 23 enhanced with a text-to-speech-preprocessor according to an embodiment of the present invention.

FIG. 25 is a block diagram of the VXML architecture of FIG. 23 enhanced with a text-to-speech-preprocessor 2501 according to an embodiment of the present invention. A VXML architecture 2500 is illustrated in this example and is analogous to VXML architecture 2300 described with reference to FIG. 23 above. VXML architecture 2500 is enhanced in this example with a capability of rendering specialized voice pronunciations of phrases and terms according to rules based on socioeconomic demographics, industry specific terms, and regional demographics.

All of the components illustrated in FIG. 23 above are also illustrated in this example. Therefore, formerly introduced components that are not modified as a result of the present invention shall retain the same element numbers. Voice application server 2301 has software functional blocks 2314, 2308, 2309, and 2310 providing server functionality as was described with reference to FIG. 23.

As previously described, VXML pages are generated and incorporated into a voice application that is dynamic in the sense that individual VXML pages may contain dynamic content and are generated on the fly during caller interaction. Voice application development software enables an administrator from a remote station to create voice applications using templates and schedule them for deployment. In some cases, consumers in a pull fashion access the applications. In other instances, the voice applications are deployed as outbound applications that are pushed. Distribution of voice applications created in server 2301 may include unicast, multicast and broadcast methods.

Voice application dialogs are in a preferred embodiment transmitted to portals such as telephony/voice portal 2302 and or Web portal 2303 in the form of VXML pages. In server

2302, VXML interpreter 2307 renders VXML to synthesized voice, which is then spoken to a caller, in this case through telephony hardware block 2305. Similarly, responses from the caller are captured and rendered as XML for interpretation at the application server, which according to the interpreted response content, generates a new VXML page sent as a next dialog for the caller. Any data fetches performed result in the fetched data being included into the next VXML rendering or dialog.

A text-to-speech (TTS) preprocessor 2501 is provided within block 2309 of application server 2301. TTS 2501 is adapted to preprocess text streams of dialogs with special instruction sets dealing with which of optional text renderings will be selected for inclusion into a VXML page or dialog. TTS preprocessor 2501 is connected to the runtime dialog processor as shown by a directional arrow. Before the dialog runtime processor processes a text dialog for normal VXML rendering according to enterprise rules, TTS preprocessor 2501 annotates the text dialog according to information known about the voice application consumer, which typically is a caller interacting with the voice application. Known information can be information that is pre-known about a caller including location, region, preferences, education level, and so on. Known information can also be information that is gleaned from the caller at the time of interaction through caller line identity (CLID) and other connection identification mechanisms and through direct interaction with the caller by analyzing caller responses during interaction.

TTS preprocessor 2501 has access to a dynamic hit list embodied as a table (not shown) that has options of different text renderings, each rendering is associated with and, in fact may be created according to one or more conditions that can be associated with the caller, the caller's region, demographic information and/or type of transaction or scenario. TTS preprocessor 2501 matches information gleaned from and/or pre-known about the caller to one or more of the rules or rule sets and then annotates the XML response stream accordingly. Annotation in this embodiment means selecting a specific text portion of a response from a variety of text options presented in the table. The subsequent VXML page rendered instructs speech generation at the callers end according to the annotated XML instructions. Therefore, the actual synthesized speech that the caller hears is dynamic in that it can vary between callers using the same voice application.

TTS preprocessor 2501 has access to the Rule Mgr, which serves the "hit list" associated with a specific transaction occurring as a voice interaction between the caller and the enterprise. For example, if a caller is located in a specific county in Florida and want directions to a specific State highway wherein the highway name is essentially used in more than one location covered by the service, then TTS preprocessor 2501 would annotate a text response for VXML rendering that would take into account the caller's specific location. The rule then, would constrain the response to the specific highway name used locally from the viewpoint of the caller. Perhaps in northern counties of Florida the highway name is "State Route 25", whereas in southern counties of Florida route 25 is more predominantly known as "Bean Memorial Freeway". Assuming the location of the caller to be in a southern county, the generated response interpreted at VXML interpreter 2307 would contain instructions for vocalizing "Bean Memorial Freeway" instead of "State Route 25".

A wide variety of text variances related to industry specific terms, proper names of locations, names of roadways, and so on can be collected by a service-hosting enterprise and aggregated into application-dependant response options that are tabled as described above and then selected dynamically according to match of information-to-rule set for each session of voice interaction with a caller. A same voice application can therefore deliver dynamic responses tailored to a specific caller using the application.

Figure 26:
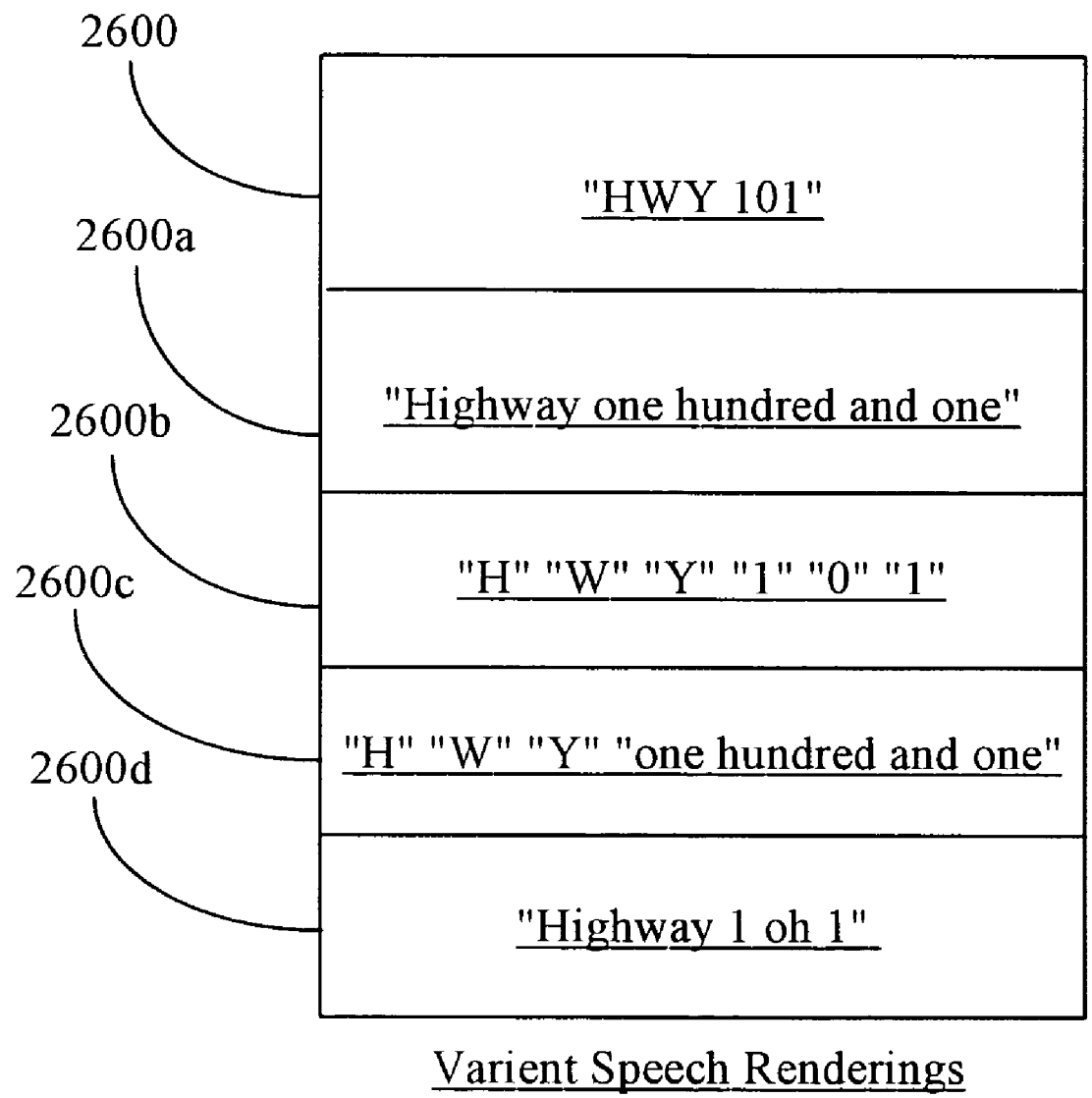
FIG. 26 is a block diagram illustration possible variances of speech renderings of a text string.

FIG. 26 is a block diagram illustration possible variances of speech renderings of a text string. In this example, variant possibilities of text to speech renderings are illustrated for a standard freeway entity "HWY 101" illustrated as a standard text block 2600. A text-to-speech option 2600*a* instructs a speech generator to vocalize the rendering phonically as it is read, "Highway one hundred and one". A text-to-speech option 2600*b* instructs the speech generator to enunciate each character in quotation marks, "H" "W" "Y" "1" "0" "1", which phonetically may sound like "aich doubleu why one zero one".

A text-to-speech rendering 2600*c* instructs a speech generator to enunciate "H" "W" "Y" as described above for rendering 2600*b*, but with the variant enunciation of "one hundred and one" instead of "one zero one". A text-to-speech rendering 2600*d* instruct a speech generator to enunciate "Highway" as does rendering 2600*a*, but with the variance "1 oh 1", which may phonetically sound like "one oh one". The variances illustrated herein reflect just one example of how a standard entity "Hwy 101" may be textually varied to produce different voice dialogs that sound different from one another to a caller. The selection of which rendering to apply will depend on information about the caller that is pre-known or, in some instances, gleaned from the caller in real time.

In one embodiment of the present invention, a first voice initiation as a response to a dialog option may be analyzed for enunciation or "drawl" tendencies. For example, if a caller as a thick accent that is categorical in nature, the dialog response to the caller may be synthesized as to mimic the caller's accent or dialect. The benefit of mimicking a dialect during interaction is to make a caller feel more at ease with using the system. For example, in some areas of New York City, locals use certain slang terminology for regionally known landmarks. If the slang term is pre-known by the enterprise, then it can be used in a dialog response to a caller exhibiting the slang terminology. Furthermore, certain industry specific terms may have different meanings for different industries. If the caller is identified as an industry specific caller in a service that offers dialog related to more than one industry, then the correct term can be dynamically applied in a response to the caller.

Figure 27:
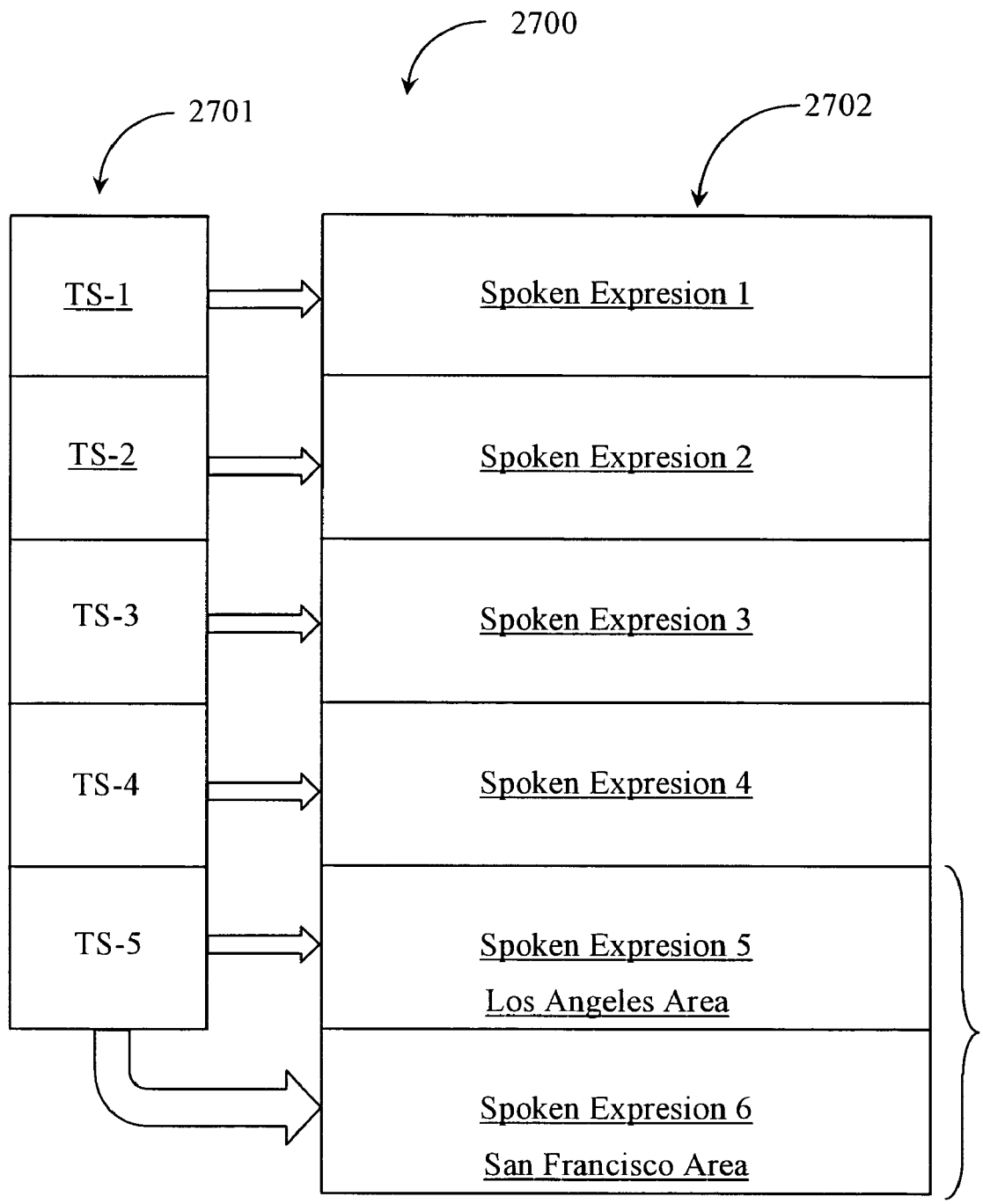
FIG. 27 is a block diagram illustrating an organized mapping table according to an embodiment of the present invention.

FIG. 27 is a block diagram illustrating an organized mapping table 2700 according to an embodiment of the present invention. Table 2700 represents a software table provided within the TTS processor of FIG. 23 or within an external data store that is accessible to the processor. Table 2700 is a hit list containing text to speech renderings and links to generated speech files associated with them.

Table 2700 has a column 2701 that contains a selection of text-to-speech entities TS-1 through TS-5. Text entities TS-1 through TS-5 are structurally analogous to entity 2600 described with reference to FIG. 26 above. That is to say that TS entities correspond to basic identifiable terms including industry terms, place names, highways, state roads, landmarks, and so on. Table 2702 has a column listing spoken expressions or text-to-speech renderings 1-6. Spoken expressions 1-6 are pre-prepared text renderings that correspond to the items (TS-1 through 5) contained in column 2701. HTTP 1.1 or other type of reference links (arrows), the plurality of which is represented herein by element number 2703 link each item in column 2701 to at least one item in column 2702.

In this example, only one of the TS entities in table 2700 is linked to more than one variant text-to-speech rendering.

TS-5, which may be "HWY 101", for example, is linked to spoken expression 5 and to spoken expression 6. Spoken expression 5 instructs the proper enunciation of "HWY 101" used in the area of Los Angeles, Calif. whereas spoken expression 6 instructs the proper enunciation of "HWY 101" as used in the San Francisco Bay Area. Of course it is assumed that the entity HWY 101 is spoken differently depending on region. Expressions 5 and 6 are analogous to text renderings 2600a-d of FIG. 26. Therefore, the expressions 5 and 6 are XML text renderings that are selectable options based upon the rule of geographic origin of the application consumer or caller.

It is presumed in this example that actual voice synthesis (generating an audible voice dialog response) is performed at the caller's end (voice portal) based on the instructions provided by a VXML page containing one of the expressions 5 or 6. In one embodiment, the voice files are pre-prepared by an administrator and distributed to end systems as part of the application deployment scheme. In this case, a pre-recorded voice file is selected based on interpretation of a received expression, in this case 5 or 6.

Table 2700 may be a dynamic table in the sense that it may be constructed as a generic template and, depending upon the voice application being run, accessed and populated with the appropriate entities and text expression options used by the application at the time of application deployment. When a user interacts with the voice application, then TTS preprocessor 2501 accesses the populated table and determines which TTS expressions to select based on information either preknown about or provided by the instant caller interacting with the application.

In one embodiment of the present invention, if interaction with one voice application triggers deployment of another voice application having unrelated content, then information about the caller, in some cases gleaned from interaction with the first application is automatically passed to the domain of the second application for use in generation of a second table related to the new content options. It is noted herein that content specific tables associated with a single voice application can be generated on the fly from a master table of data stored in a system database accessible to processing components.

The ability to personalize automated voice responses sent from an enterprise to callers using voice applications developed by the enterprise provides an interaction experience for the caller that is enhanced from traditional monotone and user-same computerized responses. Such enhancement provides not only useful and pragmatic "translations" that are more understandable to the caller, but also entertainment value prompting more frequent use of such voice application distribution systems.

Behavior-State Adaptation

Figure 28:
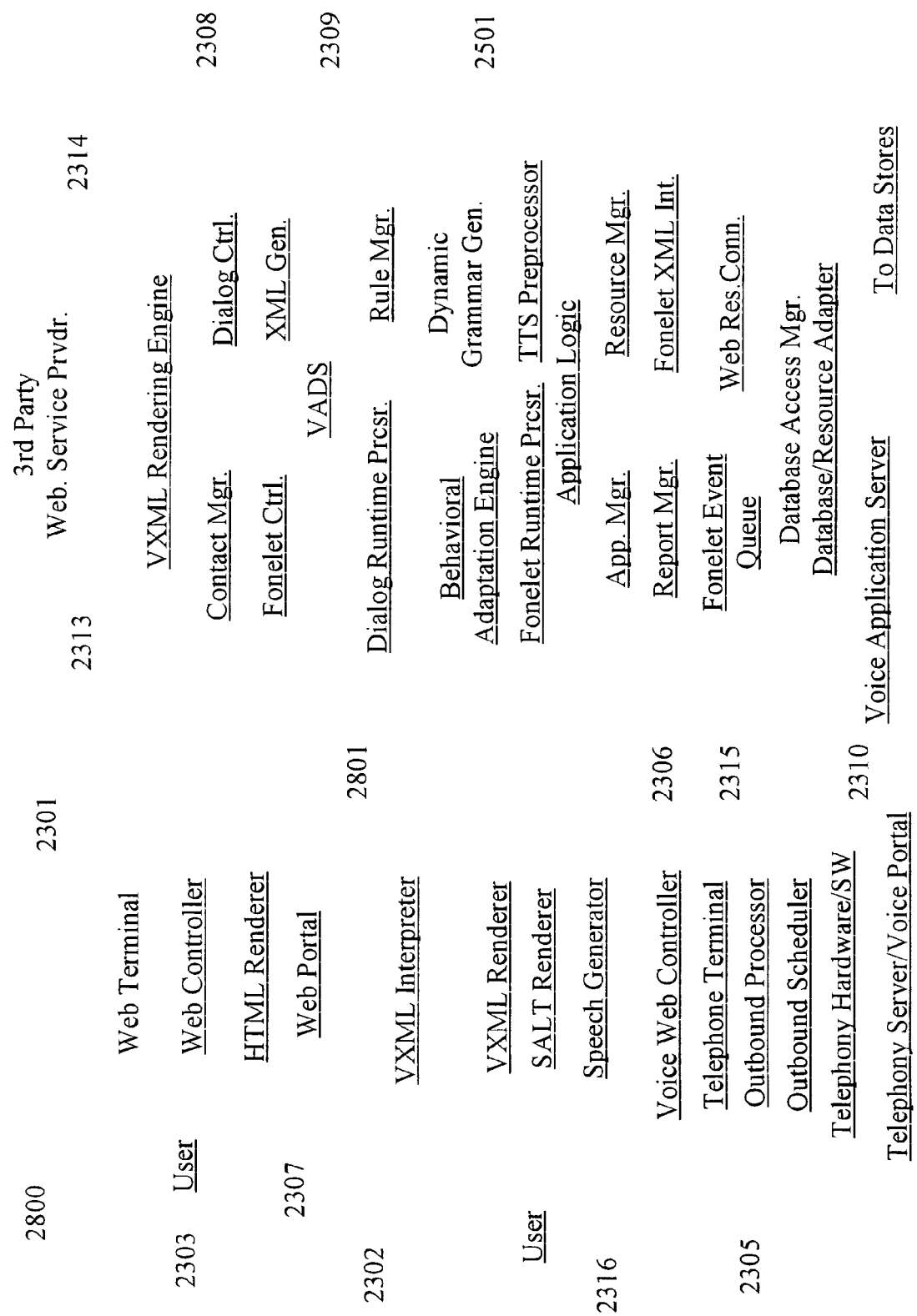
FIG. 28 is a block diagram of the VXML architecture of FIG. 23 enhanced with a behavioral adaptation engine according to an embodiment of the present invention.

FIG. 28 is a block diagram of the VXML architecture of FIG. 25 enhanced with a behavioral adaptation engine according to an embodiment of the present invention. A VXML application deployment architecture 2800 is illustrated in this example and is analogous to VXML architecture 2500 described with reference to the description of FIG. 25 above. Previously described components retain their original element numbers introduced in description of FIGS. 23 and 25 above. Architecture 2800 comprises application server 2301, telephony server/voice portal 2302, and Web portal 2303.

Voice application server 2301 is enhanced with a behavioral adaptation engine 2801. Behavioral adaptation engine 2801 is adapted to discern user behavioral states and in some cases, emotional states during interaction with a voice application dialog. Engine 2801 is part of application logic block 2309, which includes the previously described text-to-speech preprocessor 2501. Static Optimizer 2312 and dynamic optimizer 2311, which were described with reference to the description of FIG. 23 above are not illustrated in this example for reasons of preserving drawing space, but may be assumed to be present.

Adaptation engine 2801 has direct access to a dialog runtime processor (Dialog Runtime Prcsr.) as illustrated herein by a double arrow. Adaptation engine 2801 also has communication access through logical bus structure 2315 to VXML rendering engine 2314, voice application development software (VADS) block 2308, and database/resource adapter block 2310.

As interaction takes place between a caller and an enterprise using the voice application software of the present invention, responses to menu options and the like vocalized by the caller at the caller's end are rendered in a preferred embodiment as XML-based text and are interpreted at voice application server 2301 for determination of a subsequent response to be delivered to the caller. The response from the enterprise may vary, in this case, from caller to caller and is rendered as VXML (VXML page) for voice synthesis at the portal used by the caller, in this case portal 2302 or Web portal 2303.

Adaptation engine 2801 is adapted to intercept VXML responses from a caller during interaction and to analyze the response according to a set of behavioral constraints that are linked to response options, which are selected and then embedded into a VXML response that is played as a synthesized voice to the caller.

The variety of behavioral constraints that may exist for determination of a proper and correct VXML page response is not limited. For example, a user may be very familiar with a particular set of voice application menus through repetitive use. During menu rendering, the just-mentioned user may be predisposed to selection a particular option further down in the menu tree before the option is reached in the menu. The behavior, then, of that particular user, is that the user vocalizes the sub-option nearly every time the service is accessed. In this case, adaptation engine 2801 recognizes the selection before the offering and determines that this particular user is very familiar with the service and menu tree. The next time the same user calls the service, the correct result can be delivered to the user immediately, skipping menu navigation. The kind of behavior covered above is menu navigational behavior.

Another type of behavior that can be determined on a case-by-case basis is the degree of caller stress. Engine 2801 can determine a stress level for a particular caller by analyzing response content. There are two forms of response content that can be analyzed by engine 2801 in a preferred embodiment. These are VXML text-based content and voice samplings attached to the VXML documents as an attachment. For example, certain expletives or other "negative" words or phrases can be recognized and rendered if a caller verbalizes them while interacting with a voice application. Adaptation engine has access to external resources such as Rule Mgr. and external data stores through adapter block 2310.

In one embodiment, adaptation engine 2801 can analyze short Wav files or other digitized voice files that can be sent along with XML-based text files. In this way stress levels of a caller can be determined and response selections then based on the determined levels. For example, if a caller vocalizes at a decibel rate above a pre-set threshold, he or she may be determined to be shouting. The decibel rate can be analyzed from a short one or two-second audio file recorded at the start of an interaction segment and then sent as an attachment along with the text rendering of the caller's response.

Speed of menu navigation can be determined by engine 2801 to roughly determine the level of experience the caller has with the particular system of the enterprise. Subsequent menus and sub-options may be annotated, dropped or added based on results of an "experience level" determination of a particular caller. There are many behavioral considerations that may be taken into account.

Adaptation engine 2801 may be provided as a logic that cooperates with TTS processor 2501 and with the previously mentioned optimizers to fine tune menu and option selections for subsequent rendering as VXML pages to the caller during interaction. In some embodiments, engine 2801 can override other dialog enhancement tools if constraints allow. For example, if a caller is extremely upset, a subsequent voice application dialog may provide a live connection option to a live agent for immediate redress of the caller's concerns.

Figure 29:
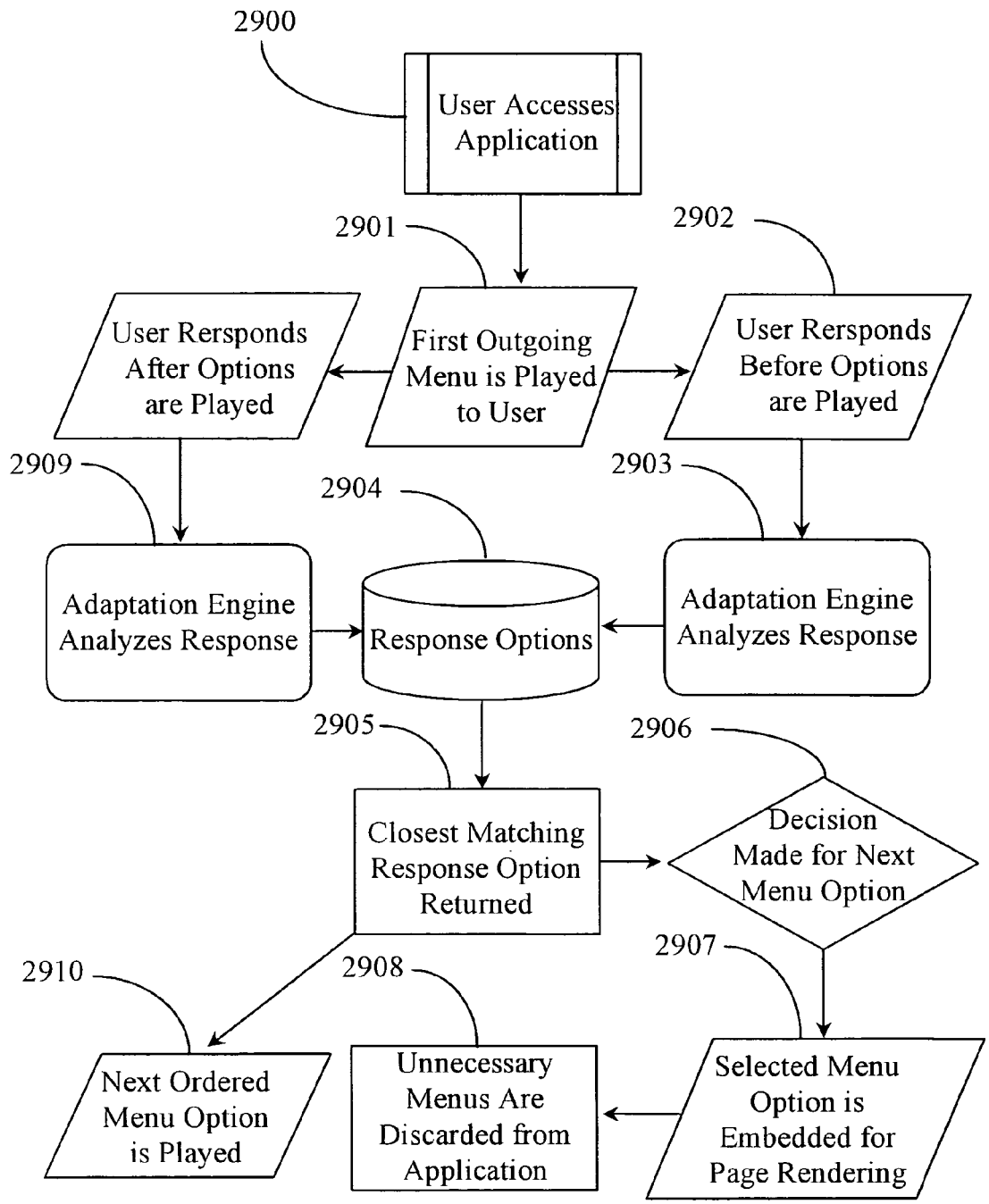
FIG. 29 is a process flow diagram illustrating user interaction with the system of FIG. 28 according to one embodiment of the invention.

FIG. 29 is a process flow diagram illustrating user interaction with the system of FIG. 28 according to one embodiment of the invention. At step 2900 a user accesses a voice application. A voice application can be accessed through any voice-enabled portal. In some cases a user calls the voice application. In other embodiment, the voice application calls the user and the user simply picks up the call. In still other applications depending, in part on media support, the voice application may be broadcast or multicast to users. At step 2900, a greeting and a user identification regimen or menu may be executed. Identification may comprise a biometric function like voice imprint identification, or password/pin option.

At step 2901, a first outgoing menu is played to the user. The menu is the first interactive menu of the dynamic voice application delivered to the user. If the application is executed on an interactive voice response (IVR) system, a combination of voice and touch-tone responses may be accepted as user responses, however the focus of this example is on voice response. In this example process it is assumed that a constraint exists related to the navigation behavior of the user while navigating the menu delivered in step 2901. If for example, a user responds by vocalizing a menu or sub-menu option at step 2902 before the menu of step 2901 concludes, then at step 2903 an adaptation engine analogous to engine 2801 described with reference to FIG. 28 analyzes the response.

Response interception in step 2903 may be triggered or it may be continuous during an application. In the case of a user response before the menu has finished, the fact that a response came in before the time allotted for the menu expired could be a triggering factor for interception by the adaptation engine. Analyzing a response at step 2903 may include matching the response with an appropriate response option or result at step 2904. The adaptation engine may form and store a record that reflects the user's selection of a specific sub-option well before the sub-option was available through menu navigation. In this case the engine may label the particular caller as "experienced" with the system meaning that he has memorized a particular sub-option to expedite a returned result.

At step 2905, the closest matching response option selected as a response to the analyzed caller's menu response is returned and a decision is made regarding the next menu option to play if any at step 2906. If the selected response from the enterprise comprises a dialog containing an embedded result requested by the user, there may be no further menu activity or interaction. If the caller request of step 2902 contains a request for a specific menu, then at step 2907 the selected menu option is embedded for VXML page rendering. In the mean time at step 2908, any unnecessary menus that would normally have been part of the voice application are discarded and not sent to the user.

In the case of a non-experienced user, it is probable that step 2901 will play out completely before the user at step 2909 makes a selection. At step 2910, the adaptation engine may store a record that the user is "new". In any event, the engine will intercept and analyze the user response (if configured to do so) and compare the user response with enterprise response options according to existing enterprise rules as described in step 2904. Also as described above, at step 2905 the closest matching option for enterprise response is returned. At step 2911 the next ordered menu option is played if one exists, or a fetched result embedded into the enterprise response dialog may be played at step 2911.

In the process outlined above, the behavioral constraint dictates that in the case of a user navigating ahead of offered menus and sub-options, to drop the unnecessary options in-between. Statistical probability can be used to further enhance response by the system, for example, by causing a particular menu option or option result to be played to a caller according to determination of probability that that is the correct response based on recording a number of the same transactions from the same caller.

One with skill in the art of voice application creation and deployment will appreciate that the steps illustrated above may include sub-processes without departing from the spirit and scope of the invention. For example, there may be sub processes after step 2906 for text-to-speech preprocessing and static or dynamic optimization before a final VXML page is rendered as a response from the enterprise to the user. In some cases, actions resulting from adaptation engine analysis can be configured to override certain other processes. It will also be apparent to one with skill in the art that the goal and order of the illustrated interaction process steps may change according to the nature of constraints that will affect the process.

Figure 30:
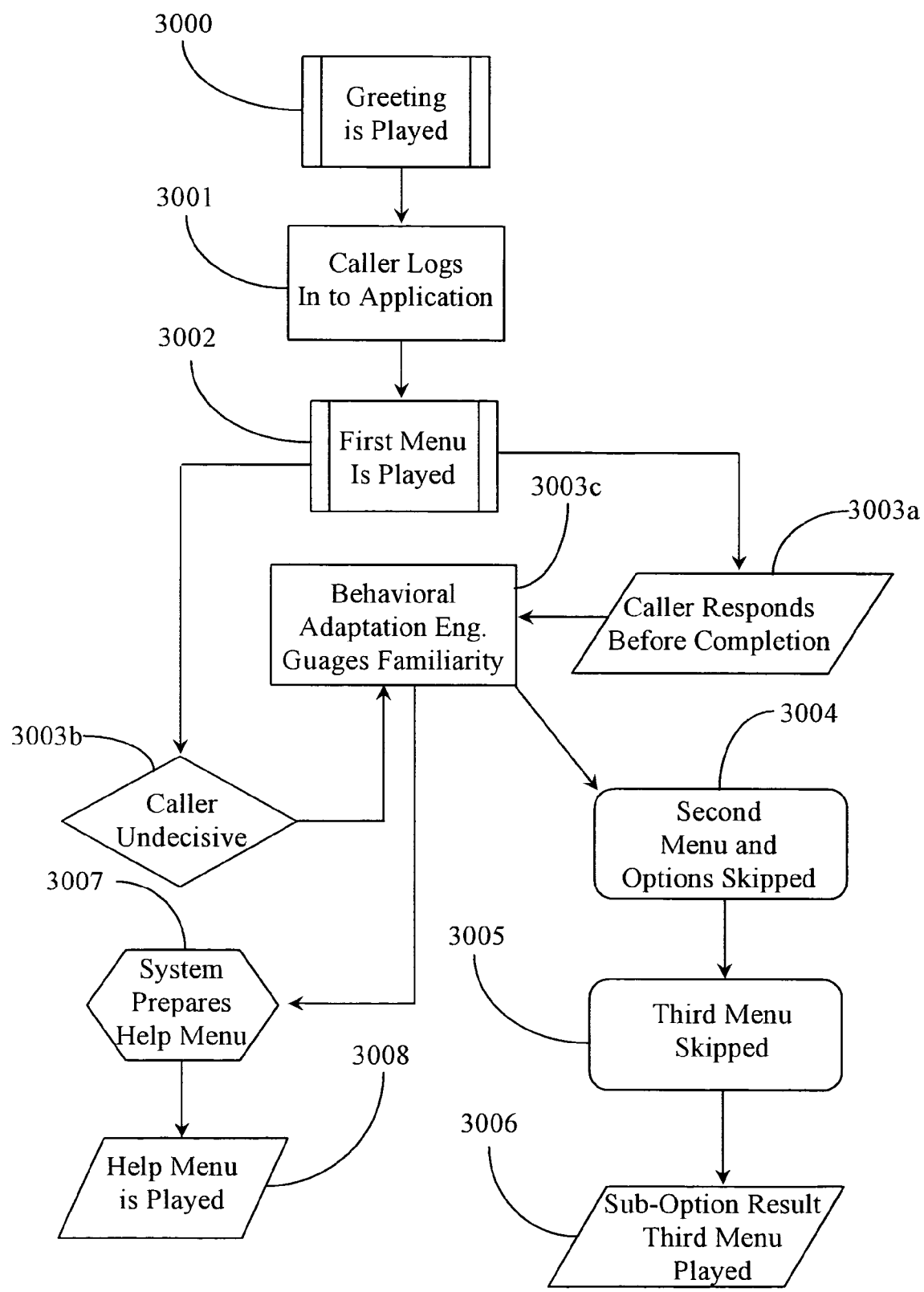
FIG. 30 is a process flow diagram illustrating user interaction with the system of FIG. 28 according to another embodiment of the invention.

FIG. 30 is a process flow diagram illustrating user interaction with the system of FIG. 28 according to another embodiment of the invention. At step 3000 a greeting is played to a caller accessing the voice application. The greeting can be personalized to individual callers based on caller ID, automated number identification (ANI), or other identification methods.

At step 3001, the caller logs into the voice application. This step is optional in some cases. Login may include a biometric voice print identification, which can be verified at the enterprise by analyzing a short audio voice sample of the caller that is recorded and sent along with XML-based data as an attached audio file.

Assuming security approval of the caller of step 3001, a first menu of the voice application is played to the caller at step 3002. If the caller is familiar with the system as was described above regarding the process illustrated with respect to FIG. 29, he or she may respond before completion of the initial menu at step 3003a. At step 3003c, the adaptation engine gauges the familiarity level that the caller has with the system based on response analyzing. For example, if the caller vocalizes a recognized menu sub-option of a menu much further down a menu tree, then the caller may be labeled "system friendly" and the appropriate streamlining of the voice application ensues.

In this exemplary interaction then, the second offered menu and associated options are skipped in step 3004 assuming the vocalization of step 3003a is determined not to be the second menu or related options. At step 3005, the third offered menu is also skipped, however in step 3006 a sub-option result, which could be a fetched result equating to one of the sub-options of the third menu is played because it is the recognized result value that "answers" the vocalization of the caller in step 3003*a*. The exact nature of the dialog played at step 3006 will directly depend on the content of the caller's vocal response at step 3003*a*. If the caller requests a specific menu instead of a specific "tuple", then the appropriate menu is played.

The constraint associated with the just-mentioned order of steps is very similar to the one described above with respect to the description of FIG. 29. That is, that if the caller already knows the options and sub-options, the system may skip all unnecessary dialog of the voice application.

An additional constraint is included in the exemplary process illustrated. For example, if the caller is indecisive in his or her response to the first menu of step 3002, as is illustrated at step 3003*b*, then at step 3003*c* the adaptation engine may label the caller as "system novice". Such labeling triggers the system to prepare a dynamic help menu at step 3007, the menu containing options closely related to the nature of the caller's indecisiveness. At step 3008 the interactive help menu is played to the caller.

The help menu can be dynamically constructed as dialog objects belonging to a "whole help menu". The dynamic option would include only the interactive options that most closely relate to the caller's current problem as detected by the adaptation engine. For example, if the caller vocalizes "option A or option B" because he is not sure which one to go with, then the adaptation engine can trigger preparation of the appropriate factoids etc, that enable the caller to make a more informed decision. The dynamic help menu can link back to the original menu when complete allowing the caller to repeat after getting the required assistance. This can be accomplished without the caller having to hang-up and redial.

Using the example above, different individuals can be serviced by the system according to their needs. The faster more experienced individuals have their voice applications streamlined for faster service whereas the slower individuals have their voice applications extended according to their specific needs.

Figure 31:
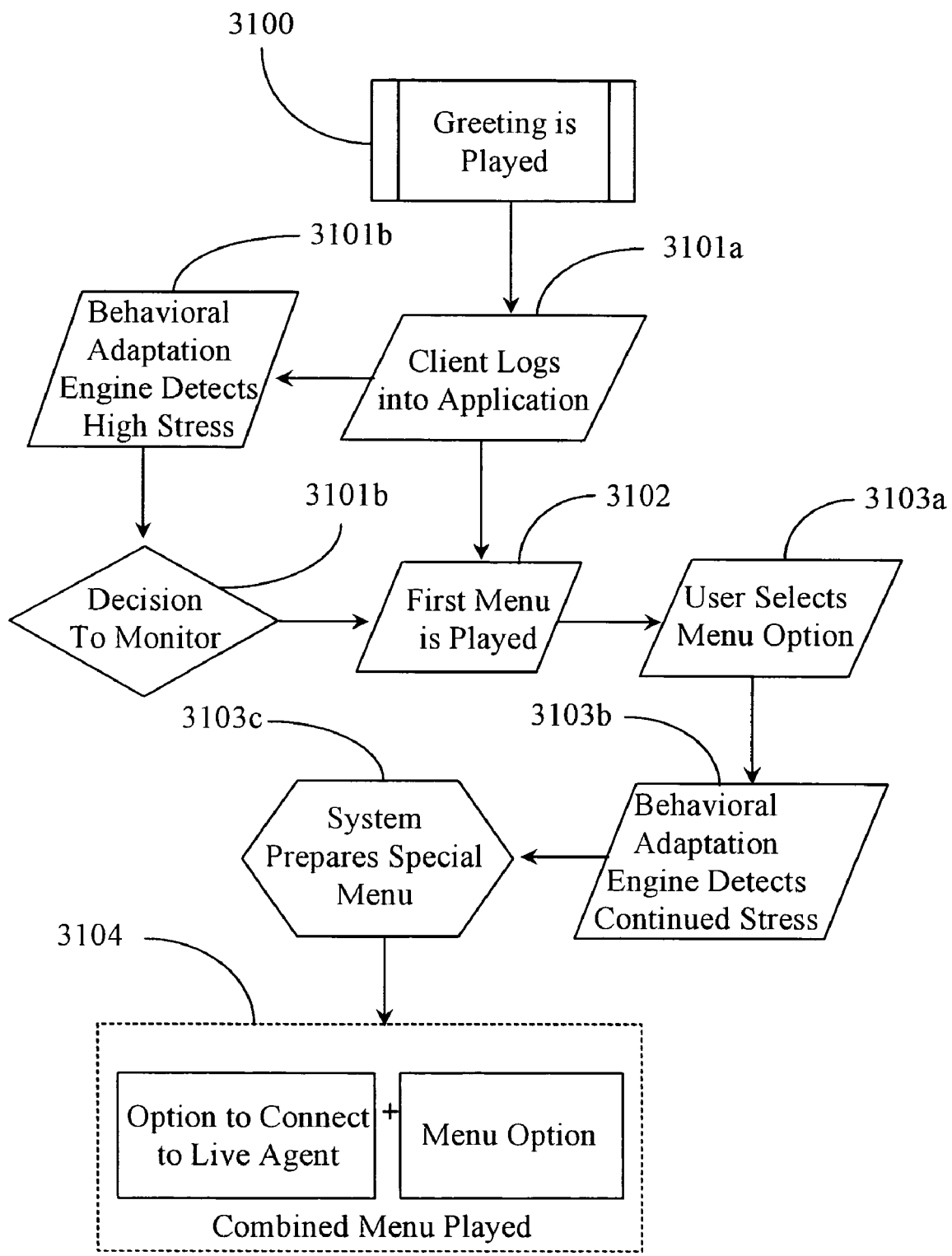
FIG. 31 is a process flow diagram illustrating user interaction with the system of FIG. 8 according to yet another embodiment.

FIG. 31 is a process flow diagram illustrating user interaction with the system of FIG. 8 according to yet another embodiment. At step 3100 a greeting is played assuming caller access to a voice application as described further above. At step 3101*a*, the client logs into the voice application, including password, pin, or perhaps voiceprint identification as previously described. During step 3101*a*, the behavioral adaptation engine samples the voiceprint or other vocalization of the client and detects a high stress level in the caller's voice. The vocalization can be recorded and sent along with the XML-bases data as a digital audio file. Constraints geared to stress detection may include decibel output thresholds. Decibel comparisons can be made with previous results sampled during previous transactions by the same client to gauge average decibel output of the client's voice for the purpose of setting a particular decibel threshold for that client. If the latest sampling is higher than the average range then it may be determined that the client is experiencing stress.

In another embodiment, any uttered expletives, or inflection characteristics may also indicate that the client is under stress. The adaptation engine can recognize these general voice characteristics through sampling a short audio rendering taken at the first interaction as previously described. Expletives, negative phrases, and inflection patterns may be stored and standardized for the client over multiple transactions enabling the system to detect if the client is in a different than average mood for example. Moreover, lack of certain phrases usually vocalized by the client may be an indication of a higher than normal stress level. For example, if the client always says "may I have my balance please" and a latest sampling is determined to lack the word please, then the system may decide that the client has a higher level of stress than normal. There are many differing methods for configuring the constraints for stress detection.

Detecting a high stress level in the client triggers, in this exemplary interaction, a decision to monitor the interaction at step 310*c*. Monitoring may range from periodic voice sampling by the adaptation engine during client interaction with the voice application to continued monitoring by a live agent or supervisor. Steps 301*b* and 3101*c* can occur before the first menu is played at step 3102. At step 3103*a* the client vocalizes an option from the previous menu. It is noted that the client is being monitored during his response.

Assuming that the behavioral adaptation engine through voice sampling and analyzing conducts the monitoring, then at step 3103*b* in this exemplary process the adaptation engine detects a continuance of high stress in the client. As part of a monitoring constraint, at step 3103*c* the engine triggers the system to prepare a special menu. The exact rule may require 2 or more samplings wherein the stress is high at each sampling before triggering preparation of a special menu. In other cases, one sampling may be enough. It is also possible that live monitoring would be the triggered result of a first sampling detecting stress in which case the process would be different than is illustrated herein.

In this exemplary process a special menu is prepared at step 3103*c* and then delivered to and rendered to the client at step 3104 as an interactive voice menu. In this case, the menu offers at least one automated menu option and includes an option to connect to a live agent, perhaps ahead of other callers waiting for an agent because of the detected stress level. Other factors may also be used to make a decision to intervene with a live agent, or at least offer the option in a combined menu. These factors could include payment history, client standing with the enterprise, the monetary value of a client's order placed with the enterprise, and so on.

In one embodiment of the invention the behavioral adaptation engine can be configured to intercept every interaction with a particular application. The engine can be adapted for multiple simultaneous interceptions and computations in a multitasking environment. In another embodiment, the engine can spawn separate and functional instances wherein each spawned instance is dedicated to a particular client interacting with a particular application. The engine can utilize data queues, external resources, and other computation modules in function. For example, the engine may intercept a client response and make a constraint-based determination including selection of a set of possible dialog responses, which may then be narrowed to an optimum response through text-to-speech preprocessing based on another set of un-related constraints before static or dynamic caching is determined through constraint-based optimization.

In other embodiments, the engine may be configured to execute according to trigger constraint wherein if the constraint is valid for a particular user the engine intercepts the next client response. Voice applications are dynamically annotated according to values generated from analytic results that can be optimized through statistical analysis to provide personalized service for repeat clients using the same application over and over. A client control could be provided and made available during interaction to enable the voice application user to override certain enterprise responses that were developed and served with the help of statistical development and analysis. For example, if a client has repeatedly asked for a specific result provided by the service to which the result is invariably embedded into a first greeting every time the client accesses the system, a "return to original menu option" could be provided with the result so that if the client was not seeking the result in the current transaction the original voice application menus could be ordered.

Figure 32:
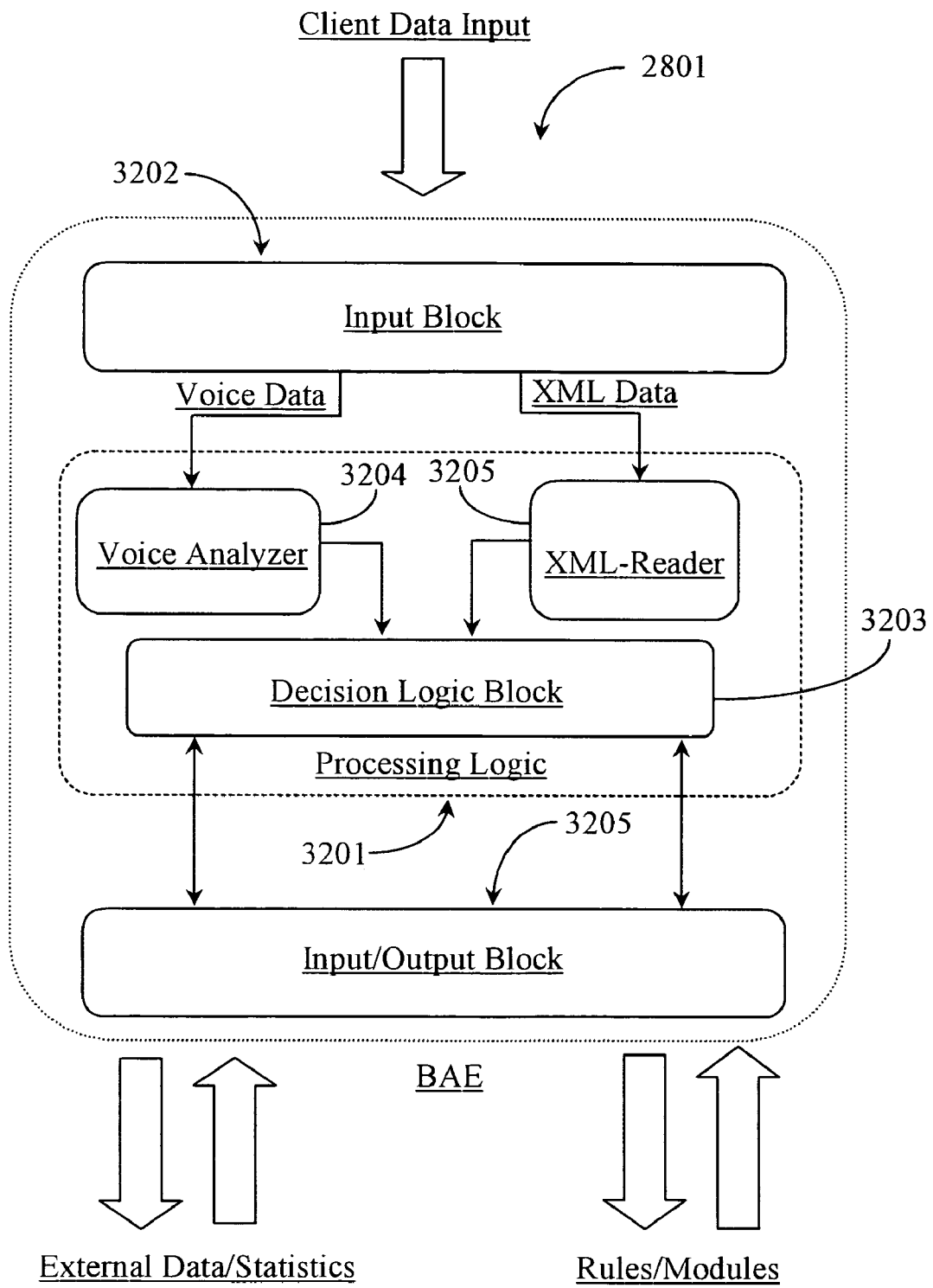
FIG. 32 is a block diagram illustrating basic components of behavioral adaptation engine of FIG. 28 according to an embodiment of the present invention.

FIG. 32 is a block diagram illustrating basic components of behavioral adaptation engine 2801 of FIG. 28 according to an embodiment of the present invention. Behavioral adaptation engine (BAE) 2801 is provided, in this example as a self-contained module that can communicate with other modules as well as with external resources. Engine 2801 has an input block 3202 adapted to receive client data input resulting from client interaction with a voice application. In one embodiment, the client data input is delivered to BAE 2801 over the logical communication bus structure 2315 of voice application server 2301 described with reference to FIG. 28 above.

Client data includes dialog response data, client history and/or status data, and client voice samplings sent along with the client data as digital audio file attachments. In a preferred embodiment, the client data other than voice files is XML-based data rendered at the client portal from client voice responses.

Input bloc 3202 may comprise multiple input ports, input data queues and processing logic as would be the case of a standard port. In one embodiment, input block 3202 may be a bi-directional port although it is a unidirectional port in this example. Error communications and dialog responses sent back to interacting clients are delivered through ports of the voice application server.

BAE 2801 has a processing logic block 3201 provided therein and adapted for processing XML-based data and if present, voice files attached to the XML packages. Processing logic has a voice analyzer 3204 that is capable of receiving short audio files and analyzing them for decibel characteristics, voice inflection characteristics, and inclusion of certain terms or lack thereof. Analyzer 3204 contains a voice file player (not shown) for executing the voice files for analyzing.

Processing logic 3201 has an XML reader 3205 provided therein and adapted for discerning XML-based data rendered thereto from the voice response of the client. XML reader also receives and interprets other client input data such as manual selections made by the client and identification data as well as any other data that may be provided about the client along with the client interaction data.

BAE 2801 has an input/output block 3205 provided therein and adapted to communicate bi-directionally with external data sources including statistical and rules databases as well as with internal system modules. In one embodiment, external data communication between block 3205 and other systems and modules is facilitated by the logical bus structure of the voice application server described further above. Direct access to external sources is achieved through the resource adapter block 2310 described with reference to FIG. 28 above. However, engine 2801 may in some embodiments, be adapted to access external resources directly and independently of normal server communication. In this case, the engine would have dedicated server ports provided thereto and adapted for communication over remote data lines.

I/O block 3205 may contain multiple input and output data queues as well as port processing logic as is generally known to exist in data port architecture. At the heart of BAE 2801 is a decision logic block 3203 that is adapted to make a decision as to which available enterprise dialog response or set of responses will be identified as candidates for a response that is embedded into or linked to a dialog rendered as a VXML page and sent back to a client interacting with the voice application.

Decision block 3203 processes the combined results of voice analyzer 3204 and XML reader 3205 according to one or more enterprise rules and if applicable, external data and statistics values and formulates a value that identifies one or a set of candidate enterprise dialog responses that are submitted for VXML page rendering. The decision values may equate to, for example, one or more optional menus or menu options, links for establishing live communication interventions, and links to other voice applications or menus or options contained therein including any fetched results.

In this example, BAE 2801 is illustrated as a self-contained module. How ever, in other embodiments the functions and capabilities of BAE 2801 may be provided as a plurality of interoperating modules that are distributed within the voice application server domain such that they may interact with each other to accomplish the goals of the invention. There are many possibilities.

Universal Application Language Adapter and Multi-Slot Optimization

According to one aspect of the present invention, a universal application language adapter is provided to bridge a universal source language to a variety of proprietary and semi-standard languages for third party flexibility in providing application creation and interpretation services. The universal application language is capable of multi-slot interpretation of a caller response to a generalized question. The method and apparatus of the present invention will be described in enabling detail below.

Figure 33:
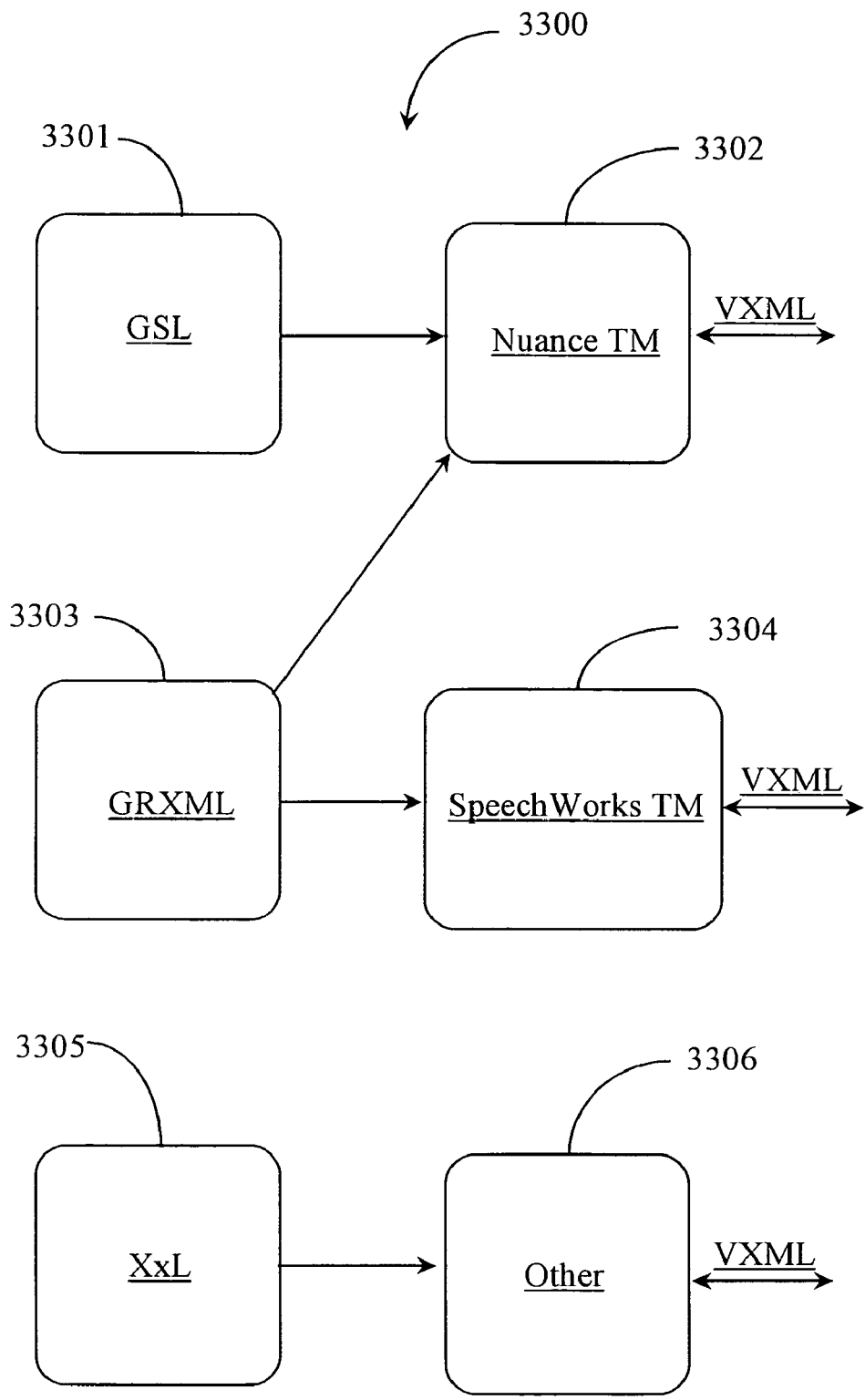
FIG. 33 illustrates an overview of prior-art relationship between various script languages input into different core VMXL rendering engines.

FIG. 33 is a block diagram illustrating a relationship between various script languages and VXML renderers according to prior-art interoperability. As described above with reference to the background section of this specification, GSL, GRXML, and other similar script languages (XxL) may be used with certain proprietary speech synthesis engines like engines 3302-3306. However, no single script language can be easily converted to operate with any offered speech synthesis engine. In this case, an enterprise does not have the flexibility of using multiple providers for launching voice applications. Rather, separate voice applications have to be provided using the scripting languages that are supported by a specific speech synthesis engine that is used to interact with the customers.

Figure 34:
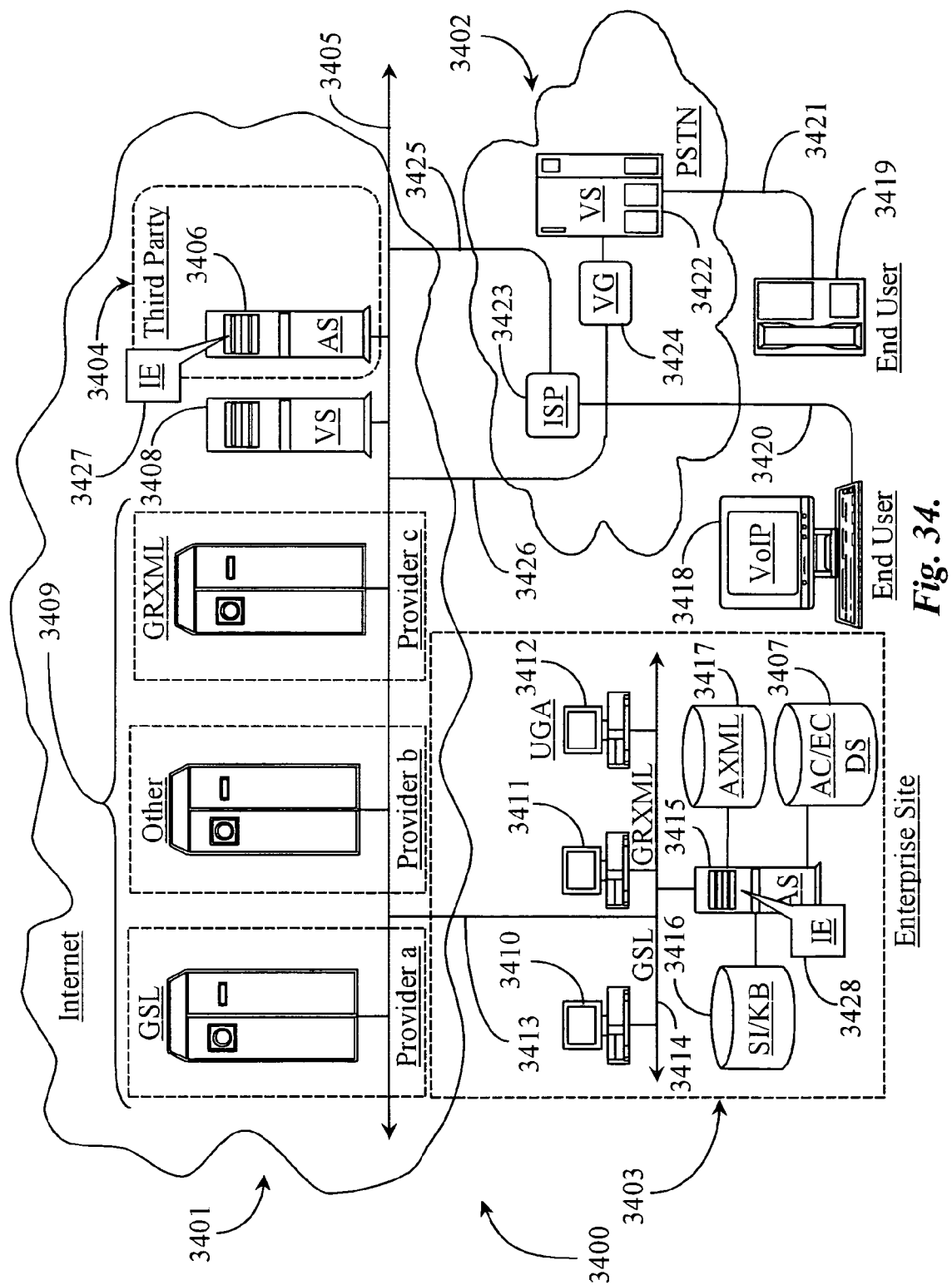
FIG. 34 is an exemplary architectural overview of a communications network practicing objective inference in client interaction and employing a universal grammar for multi slot and multi modal dialog scripting according to an embodiment of the present invention.

FIG. 34 is an exemplary architectural overview of a communications network 3400 practicing objective inference in client interaction and employing a universal grammar for multi slot and multi modal dialog scripting according to an embodiment of the present invention.

Communications network 3400 includes a data-packet-network (DPN) 3401, which in this example is the well-known Internet network. Network 3401 may be referred to herein after as Internet network 3401, or simply as Internet 3401.

A public-switched-telephony-network (PSTN) 3402 is part of communications network 3400 and provides communication connectivity for traditional plane old telephony services (POTS) interaction between clients and services.

There are several interaction providers illustrated in this exemplary communications architecture. An enterprise 3403 is illustrated in this example and represents a company that provides the interaction capability of the present invention including universal scripting capabilities and client interaction inference capability according to an embodiment of the present invention.

Also represented in this example are service providers 3409, which may provide voice application interaction services to clients on behalf of enterprise 3403 as a service procured by the enterprise. Providers 3409 include in this example, a provider a that supports GSL, a provider c that supports the W3C standard GRXML, and a provider b that may support other proprietary scripting languages used to create voice applications.

Internet 3401 may be assumed to contain all of the network equipment, connection points, and lines making up the Internet network as a whole. A network backbone 3405 represents all equipment, access points, and lines, including sub-networks that define the Internet thereby not limiting the geographic reach of the present invention.

Internet 3401 may be another type of DPN instead of the Internet like an Intranet, an Ethernet, or some other publicly accessible or private wide-area-network (WAN) without departing from the spirit and scope of the present invention. One with skill in the art will appreciate that physical boundaries separating Internet from Ethernet or other types of sub-networks are domain specific and logically vague and therefore do not reflect on the scope of the present invention as practiced in any way. In this regard any sub-network connected to Internet 3401 for interaction may be assumed to be part of that network.

PSTN 3402 may be another type of telephony network either private or public without departing from the spirit and scope of the present invention including wireless local loop (WLL) type telephony systems and other sub-systems that may have connection with a broader carrier network. One with skill in the art of network integration for communication will recognize as well the feasibility of bridging communications between networks through communication gateways such as SS-7 and the like that are known in the art.

Enterprise 3403 represents any company that interacts with clients using voice applications through a client interfacing system that uses a speech synthesis technology in interaction. Enterprise 3403 may also, in one embodiment, represent any company that provides voice application services to any other company, not necessarily interacting directly with clients of the company. In still anther embodiment enterprise 3403 may author applications, or perhaps dialogs used in voice application but may lease voice application deployment services from any or a combination of front-end providers represented herein by providers 3409.

In this example, enterprise 3403 includes a plurality of computing stations illustrated, in this example, as a computing station 3410, a computing station 3411, and a computing station 3412. All of the just-mentioned computing stations are, in this example, connected to a local area network (LAN) 3414 provided for and hosted by the enterprise. Operators using stations 3410-3412 may create voice applications including dialogs for deployment in client/enterprise voice driven transactions.

To illustrate an embodiment using providers 3409, an operator at station 3410, for example, is equipped to author voice scripts using GSL, but must use provider a to deploy those scripts because provider a supports GSL. Likewise, an operator at station 3411, for example, is equipped to author voice scripts using GRXML, but must use the appropriate deployment provider, provider c in this example to deploy the scripts because provider c supports GRXML. Both stations 3410 and 3411 are limited in their choice of providers by the specific type of language supported.

Computing station 3412, unlike the stations described immediately above, is equipped with a universal grammar adapter (UGA) that is adapted to receive XML-based input from a general set of constructs that are disassociated from any specific grammar language dialect and to convert the input into a universal grammar script (UGS) that can be applied, according to adaptation ordered, to any of the languages supported by providers 3409 through a language transformation method. In this way, the language available to create scripts does not limit a user operating station 3412.

An application server (AS) is provided within enterprise 3403 and is connected to LAN 3415. Application server 3415 is adapted to serve or to deploy voice applications and to manage interaction states associated with users connecting through VS 3408, for example. Application 3417 has a data repository 3417 accessible thereto that is adapted to store the constructs required to express a script in the form of a universally recognized markup language labeled by the inventor extensible Markup Language (AXML). AXML is a markup language that is broad enough that it may be input into a UGA program (written as an XSLT program) to generate universal grammar scripts that can be readily transformed into specific scripts compatible to specific speech engines.

A third party provider 3404 is illustrated within the domain of Internet 3401 and represents, more specifically, an enterprise that may provide generic interaction services that may be enhanced through methods and apparatus of the present invention. Provider 3404 includes an application server (AS) 3406 that is adapted to provide dynamically deployable voice applications. A voice system (VS) 3408 is illustrated within the domain of Internet 3401 and may represent any system hosted by third party 3404, by enterprise 3403, or by any one of providers 3409. VS 3408 is somewhat similar to a voice driven, client-interfacing server such as telephony server/voice portal 2302 described with reference to FIG. 28 above. In this example, VS 3408 may provide interfacing services to clients illustrated in this example, as an end user 3418 and as an end user 3419.

User 3418 may be an Internet-connected computer running a Voice over Internet Protocol (VoIP) application to communicate with VS 3408, for example in a voice driven interactive session. An end user 3419 is illustrated in this example, and represents a user connecting to services using a standard telephone. A voice portal system (VS) 3422 is illustrated within PSTN network 3402 and is adapted as a client accessible server for voice interaction. The differences between servers 3408 and 3422 are apparent by adaptation to the respective hosting network. For example, VS 3422 is adapted for telephony voice interaction with clients such as an interactive voice response (IVR) system. A client may reach VS 3422 by calling a telephone number. VS 3408 is a data network telephony (DNT) equivalent of server 3422.

A user may call or navigate to server 3408 for interaction. A user such as telephone user 3419 may access VS 3422 through a telephone line 3421. A voice gateway 3424 is provided within the domain of PSTN 3402 and is adapted to bridge communication between the PSTN network and the Internet network using an Internet access line 3426. End user 3419 may access either VS 3422 in a telephony environment, or VS 3408 maintained within the Internet domain. If desired, station 3418 may be used to access VS 3422 instead of VS 3408. User 3418 may gain access to voice portal 3408 via a dial-up or other type of Internet access line 3420 through an Internet service provider (ISP) 3423, an Internet access line 3426, backbone 3405. End user 3419 represents any of multiple users accessing a voice portal system (VS) through the PSTN or other connected telephony network. End user 3418 represents any of multiple users who may access voice portal system using network access technologies such as Internet access methods including but not limited to access via a desktop computer system, an Internet protocol telephone, an Internet capable cellular phone, or any network-capable computer peripheral or appliance.

Application servers 3406 and 3428 represent any hosted servers adapted to allow creation, configuration, and deployment of voice applications designed for client/system interaction for the purposes of affecting and completing real time transactions representing business between a client and a product/service provider. Each application server is provided with an instance of inference engine (IE) 3427 executable on server 3406, and IE 3428 executable on server 3415. IE 3427 and IE 3428 may be assumed to be identical pieces of software. Instance of IE (3427, 3428) are adapted to monitor voice sessions and to infer what clients want by statistical analysis of real-time data collected at the time of the session, and/or historical activity related to clients. Inference engine instances are provided to voice application servers in this embodiment, but may be distributed in one embodiment to client-facing voice portals like VS 3422 or VS 3408 without departing from the spirit and scope of the present invention.

Instances of IE 3427 and 3428 may be triggered by the presence of real-time data and or historical activity data in sufficient quantity to warrant an inference, which is conducted according to enterprise rules and in association with available dialog options for any given voice application. IE instances 3427 and 3428 are adapted to access and evaluate real time and historical data related to clients engaging in voice interaction with the system. Data accessed is in a preferred embodiment evaluated against a data model including a rules base or knowledge base. The voice application being run is adapted with pre and post transaction trigger points where an inference, if one is to be made by the system, is inserted into the dialog flow of a given session. The presence of an executing inference may cause execution of special system responses comprising system voice-synthesized dialogs that are played to the caller based on the results of inference analyses.

Application server 3415 has accessibility to a repository 3416 adapted to store a semantic index for voice recognition terms and a knowledge base comprising system and enterprise knowledge including enterprise rules and client historical data and statistics related to data groups. Also included in repository 3416 is an ontology, not illustrated, that provides a formal description of the discourse offered by the enterprise. For the purpose of this specification an ontology includes description of class, properties of each class, sometimes referred to as slots, and restrictions on the use or selection of attributes, sometimes referred to as role restrictions.

Application server 3428 also has access to a repository 3407 adapted to contain voice application context (AC) and external context (EC) data sources. Such sources may include Web-based data sources that are refreshed from time to time. Context from such sources may include such data as bank balances, interest rates, account status information and other types of information.

Using a universal grammar adapter (UGA) in accordance with an inference engine can drastically reduce the amount of interaction that would otherwise have to take place between a client and system to complete a successful transaction. To illustrate, assume that user 3419 accesses VS 3422 over line 3421 for the purpose of placing a simple order for a music CD, for example. If at the time of the call it is determined that the client has a history with the system, then an inference engine would intervene during voice interaction and make an inference. An inference may be that the client has a preference for a particular group of performing artists deduced through past purchases of CDs. It may also be known that the client only calls in to buy.

Using a multi-slot dialog approach and inference data collected, a dialog group may be created or selected from a pool of dialogs that better facilitates the perceived desires of the user. A prior art system would simply play out all of the menu selections and would wait for input from the client every time, even if the input is the same every time. The method of the present invention enables abandonment of unnecessary call flow thereby hastening the transaction process. Inference practiced on multiple callers comprising a call load on the system acts to lessen the call load and processing required of the system.

IE instances 3427 and 3428 may be called or triggered multiple times during one call flow between a client and the voice application system. Inference may be decided before a first message is played to a caller. An inference may also be triggered after a transaction is embarked upon. For example, history data may indicate that a particular client always pays with a certain credit card. An inference then may call a dialog after an order has been submitted by a client wherein the dialog simply asking for a confirmation that the certain card will be used as payment instead of a static dialog offering 3 or 4 selections of credit card types that are accepted by the merchant followed by re-entering of dates and numbers. More detail describing inference during active voice sessions will be provided later in this specification.

Third party domain 3404 as described further above may be provided with the methods and apparatus of the invention as a co-branded service. Application server 3406 in such an instance may be assumed to have access to all of the same data repositories and contained data as was described with reference to application server 3415.

One with skill in the art will recognize that enterprise 3403 may deploy or distribute one or more application servers as may be desired and may host application services for other parties such as party 3404 without departing from the spirit and scope of the present invention. Likewise, enterprise site 3403 may construct voice applications using AXML and may through a UGA and a transformation language utility like extensible style sheet language transformation (XSLT) convert the text markup into specific XML-based form required by a particular services provider that may employ it's own application server and speech recognition engine. There are many possibilities.

FIG. 35 is an example of a universal grammar script written in XML format. An application or universal grammar script (UGS) is constructed from AXML library of constructs and is produced as output by a universal grammar adapter. One with skill in the art of XML will appreciate the universal form that would be used as input into an XSLT program adapted to convert the UGS into a specific form or style of XML used in a speech engine on the application side such as GRXML.

In a preferred embodiment a set of constructs is made available in a repository for defining all of the semantics and characters that might be required in some form in a specific voice application script input into a speech engine to be synthesized as voice output to a caller. In our example, the inventor as was described further above refers to the set of constructs as AXML. The universal grammar script represents an equating of individual ones of the first constructs to individual ones of a set of intermediate constructs defining a universal scripting language that can be input into a language transformation utility like XSLT.

FIG. 36 is an example of the UGS of FIG. 35 translated into a GRXML language using an XSLT program according to an embodiment of the present invention. A GRXML script as illustrated by this example is of a form acceptable for input into at least two of the more popular speech engines like Nuance™ and Speech Works™. The GRXML format presented in this example should be recognized by one with skill in the art of markup language as holding to the form, tags, and content that would be part of the W3C standard script in actual practice.

FIG. 37A is a dialog flow diagram 3700 of a voice system/client interaction according to prior art. Flow diagram 3700 represents a typical voice application that is static and relies on a single slot prompt and response format in order to successfully disseminate the information, in this case location information, required before a transaction can be completed.

At step 3701 the voice script asks the call for a city by prompting a phrase like "What city please?". At step 3702, the caller responds with the spoken name of the city in question, in this case the city of Palo Cedro. A single slot application cannot associate the city with any other parameter so it must prompt at step 3703 for the state associated with the city Palo Cedro with a phrase like "What state please?". At step 3704, the caller responds by vocalizing the state, in this case "California". Now the application must find the Country associated with the last two parameters collected. At step 3705 the system asks something like "What Country please?". At step 3706, the caller responds by vocalizing "United States".

In the above example, it takes 6 actions, 3 by the system and 3 by the caller before the required 3 parameters are collected successfully by the system. In this single slot approach, voice recognition is not robust and only recognizes the exact parameter vocalizations, which are requested. Using a multi-slot approach can cut the number of actions, in this case, 6 down to two actions as is shown below.

FIG. 37B is a dialog flow diagram 3707 of the same content as the flow of FIG. 37A enhanced by multi-slot language transformation according to an embodiment of the present invention. Flow 3707 represents a flow of an application assisted by a UGS script that can also collect a response from a caller that contains all of the required parameters for the caller's location. The required parameters are still Palo Cedro, Calif., and United States, however the grammar script has the capability of breaking down the complex answer into the three required components. For example, instead of operating in a single slot mode, the script can prompt for all three parameters at once by prompting the caller with a question like "Where are you calling from?" at step 3708. The system can recognize the caller's response as long as the three parameters are included in the response. In this case, the caller replies at step 3709 Palo Cedro, Calif., USA. It is noted herein that the response is in an order complying with the single slot prompt of FIG. 37A. However, the caller is not required to provide the parameters in any specific order for the system to recognize them. In fact the prompt 3708 is not based on any specific order.

When the caller responds at step 3709, a grammar script in operation collects the response and then breaks it down into the multi-slot answer by working with the semantic index described with reference to FIG. 34 above. In this case only two actions are required in order for the system to successfully disseminate the callers location so that a pending transaction process may move forward. Employing the multi-slot modality saves a significant amount of time.

FIG. 38A is a text block 3800 logically representing a static system prompt according to prior art. Prompt 3800 represents a typical voice application dialog sent from a typical system in response to the closing of a typical transaction. The exemplary prompt of this example reads "Thank you for choosing ABC books. Your transaction is complete. This is a static menu choice that is played every time the associated transaction has been completed regardless of the caller or how many times a caller has placed orders with ABC books.

By compiling historical activity data on callers and making this data available to a voice application system, it is possible using the inference engine described above to generate dynamic dialogs that are content intelligent as is described further below.

FIG. 38B is a system prompt 3801 generated and/or selected through inference according to an embodiment of the present invention. Prompt 3801 is an inference dialog selected or generated based on knowledge of a particular callers activity. For example, at the end of the callers transaction, instead of sending the static prompt the system decides that there is enough evidence or client activity history to run an inference to attempt to determine, in this case, what other services that might be offered to the client with a likelihood of the client accepting those services. In this case, the system has found that the client almost exclusively purchases books about nature.

It may be that 8 of the last 10 purchases were related to nature periodicals or other publications. In this case of inference, a two-part prompt is sent to the caller at the end of the transaction or post transaction inference point. The content intelligent prompt 3801 reads "You seem to prefer books on nature". The second part asks "Would you like to subscribe to our monthly wildlife news service?". It may be that the first part of dialog 3801 is generated on the fly based on the knowledge of the client's activity and the association made between the nature of the activity and the available service. The second part of prompt 3801 may be selected from options connected to the dialog groups associated with the service.

Execution of the replacement prompt constitutes an inference by the system that based on the clients activity, he or she would be a good candidate for the monthly subscription. Once the dialog is executed the system may loop right in to the standard dialogs describing the transaction process for the offered subscription. In this way, the client may offer additional items or services intelligently and with a stronger likelihood of acceptance and success.

Figure 39A:
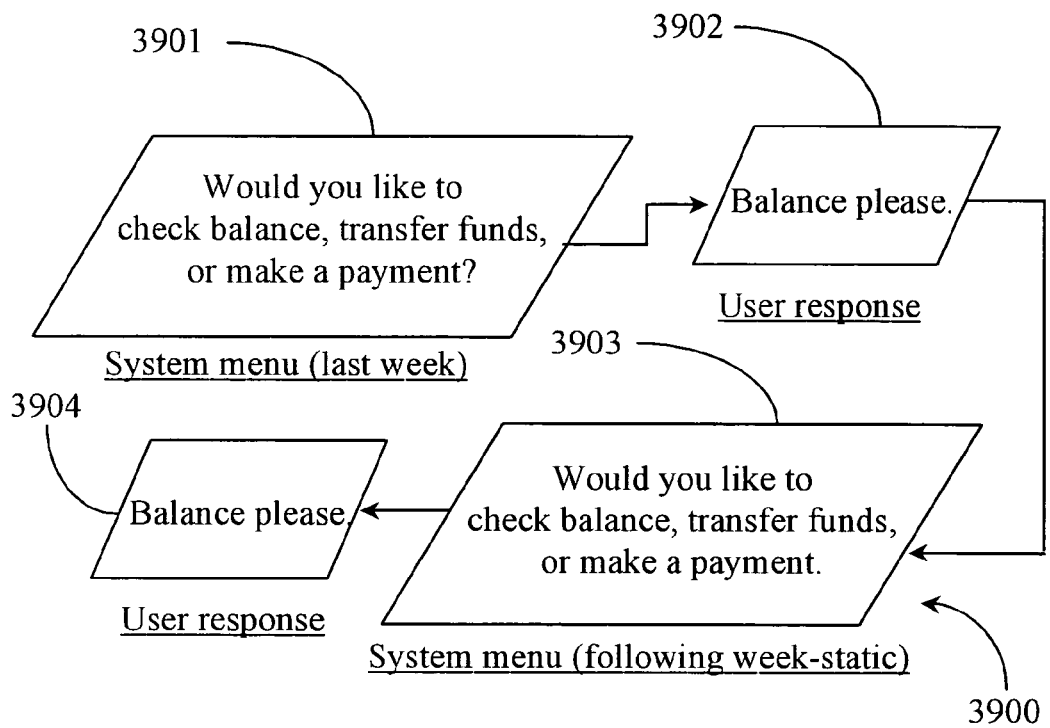
FIG. 39A is a flow diagram illustrating a static system prompt repeated during subsequent client access according to prior art.

FIG. 39A is a flow diagram 3900 illustrating a static system prompt repeated during subsequent client access according to prior art. Flow diagram 3900 illustrates the repetitive and static nature of prior-art system prompts that may be experienced by a same caller time after time during the business relationship between the client and the hosting enterprise.

In this example the content or discourse of the enterprise is banking. At step 3901, assuming the caller has begun interaction, the system prompts "Would you like to check balance, transfer funds, or make a payment?". The prompt contains 3 parameters, one of which is required in a response for successful execution. At step 3902 the caller responds "Balance please". It is assumed that the caller or user in this case receives the balance information and closes the session. At a different session between the same caller and same system transpiring at a later date, the system at step 3903 repeats the same exact static prompt after the user has accessed the system. The user again responds balance please. In this case the user typically waits for the prompt to completely execute even though balance will likely be his or her response most of the time.

Figure 39B:
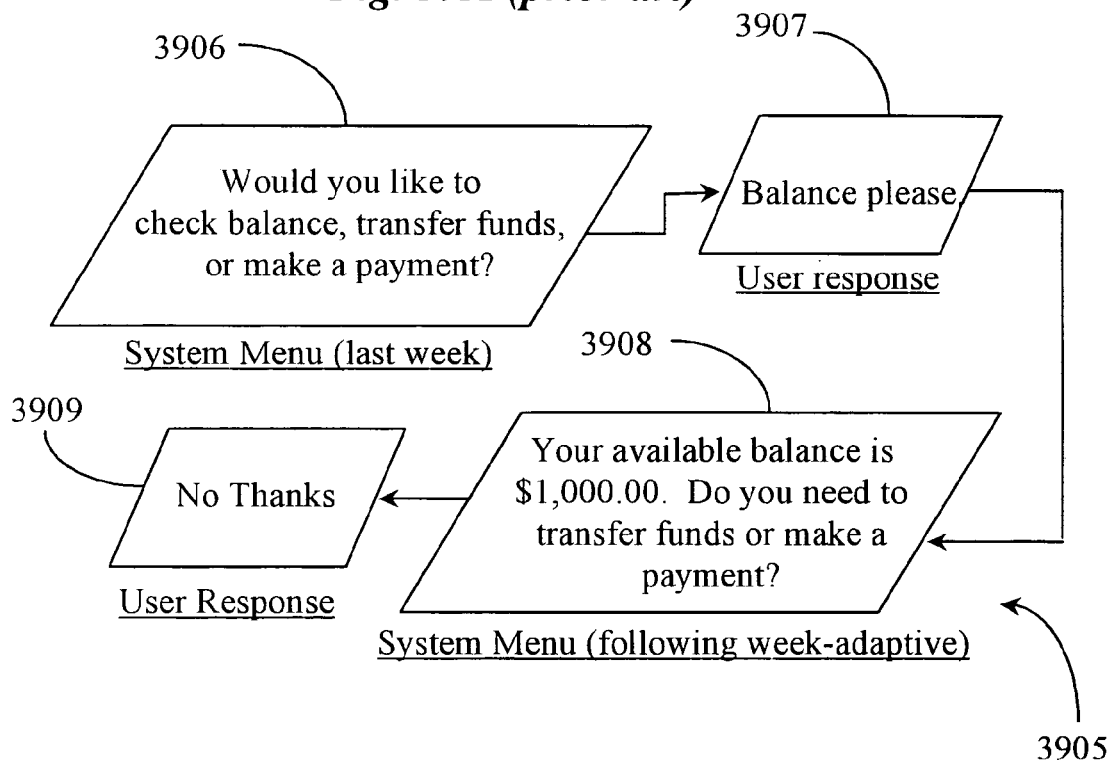
FIG. 39B is a flow diagram illustrating a dynamic system prompt selected or generated for the client based on inference of past client activity according to an embodiment of the present invention.

FIG. 39B is a flow diagram 3905 illustrating a dynamic system prompt selected or generated for the client based on inference of past client activity according to an embodiment of the present invention. Flow 3905 is another variant example of how inference might be run in a voice application.

At step 3906 a prompt is sent to the caller. The prompt of step 3906 is identical to the prompt of step 3901 above. This fact lends to an assumption that at the time of step 3906 there was not enough information available to the system to trigger an inference action. At step 3907, the caller responds by stating "Balance please".

However, after a few of these sequence wherein the caller repeatedly asks for balance instead of other offered options, the system learns the callers preference for the parameter balance. Now when the caller access the system, a dynamic inference is triggered by a fact that the caller has requested balance information more than any other available selection. The inference is triggered and executed before step 3906. At step 3906 an inference dialog is presented instead of the standard dialog. At step 3906 the system gives the client a non-solicited result (account balance information) based on the prediction that the client was statistically disposed to ask for the balance based on the historical record.

Therefore, step 3908 reads, "Your available balance is $1,000.00." "Do you need to transfer funds or make a payment?". Here the system has adapted to the clients needs. At step 3909, the client ends the transaction by responding "No thanks". In this example an inference is made before any transaction is completed. The inference in this example can be made because there is sufficient historical data available to the system that would suggest that the client has a high statistical probability of asking for his or her balance before he or she would select any other options.

Figure 40A:
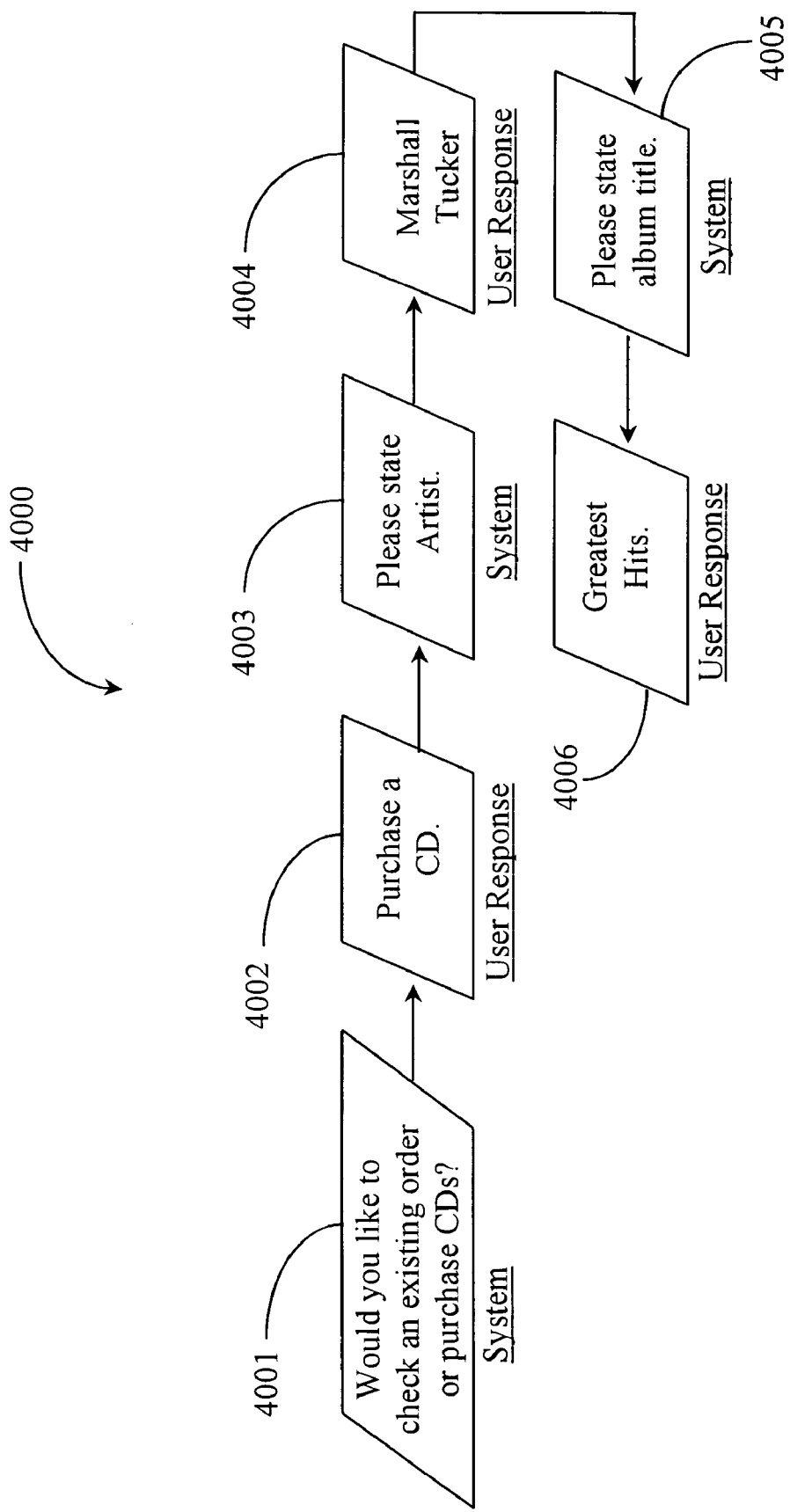
FIG. 40A is a flow diagram 4000 illustrating a system/client interaction dialog according to prior art.

FIG. 40A is a flow diagram 4000 illustrating a system/client interaction dialog 4000 according to prior art. Interaction dialog 4000 represents a typical static interaction undertaken when clients access a voice application presented, in this case by an enterprise that sells CDs. Like the prior-art example of FIG. 37A above, the system prompts are static and require single slot responses in order to successfully enable a transaction.

At step 4001 the system prompts the client with something like "Would you like to check an order or purchase CDs?". The voice prompt requires either an answer of check order, or an answer of purchase CDs. At step 4002 the caller selects the purchase option by responding "Purchase a CD". At step 4003, the system requests the name of the artist. At step 4004, the caller responds with "Marshall Tucker". At step 4005, the system requests the album title. At step 4006, the caller responds with "Greatest Hits". This example requires 3 request/response interactions before an order can be successfully created. The system and client still have to work out the particulars of the transaction in still more steps before the CD can be shipped.

By providing multi-slot capability and a rich semantic base for voice recognition much more work can be accomplished using less request/response interaction.

FIG. 40B is a flow diagram 4007 illustrating a system/client interaction dialog using natural language recognition according to an embodiment of the present invention. At step 4008, the system prompts with a generic request of "What would you like to do today?". Unlike the static prompt of step 4001 of FIG. 40A, the system does not need to specify the actions for the client. Nor does the system specifically rely on a response that contains the attributes "check order" or "purchase CDs". For example, at step 4009 the client, instead of responding to the system prompt, replies with a prompt directed to the system; "Do you have Marshall Tucker's Greatest Hits?. The natural language prompt of step 4009 contains two parameters considered critical, the artist name and the title of the CD. The voice application can recognize the parameters and also recognizes the fact that the critical parameters are presented in a question related to product availability, which can be considered an attribute in ontology.

At step 4010, the system responds with a dynamic dialog stating that the requested CD is in stock and can ship the same day. The user then asks in step 4011 "Do you have any similar music?". The system recognizes the prompt of 4011 even though it does not have anything to do with the response of step 4010. The system saves the information on the first request and performs a lookup for the highest-ranking artist that plays similar music, again attributes of a class or genre of music.

At step 4012, the system makes a suggestion to the client to the effect of "May we suggest Greg Allman Live Unplugged?" In this case both critical parameters of the second CD are provided by the system as a suggestion to the client. At step 4013 the client responds by asking the company to send one each of both CDs, and asks about the return policy in the same dialog. The system has both CDs in stock and considers both of them shippable products now requested by the client via interpretation of the first part of the response of step 4013. The order preparation can take place in the background while the system addresses the second part of the response "What is your return policy?".

The system runs an inference before step 4014 because there is evidence to suggest that the client always pays with his or her visa card. Therefore a two part dynamic response is presented at step 4104, reading "Full refund if returned unopened". And "Can we charge your visa?". The dynamic response can be assembled from two separate response dialogs each separately addressing the subject matters of step 4013. The ability of combining dialogs to build complex natural language prompts or responses is enabled partly by providing rich semantics and partly by inferring client preference through analyzing historical data, in this case the payment method used in the past. At step 4015, the caller responds by saying, "Yes", and "Thank You".

One with skill in the art will appreciate that this example of intelligent natural language dialog coupled with inference of client preference works to eliminate time to handle the transaction and work for both the client and the system. An inference may be triggered at any inference point placed in a voice application dialog.

Figure 41:
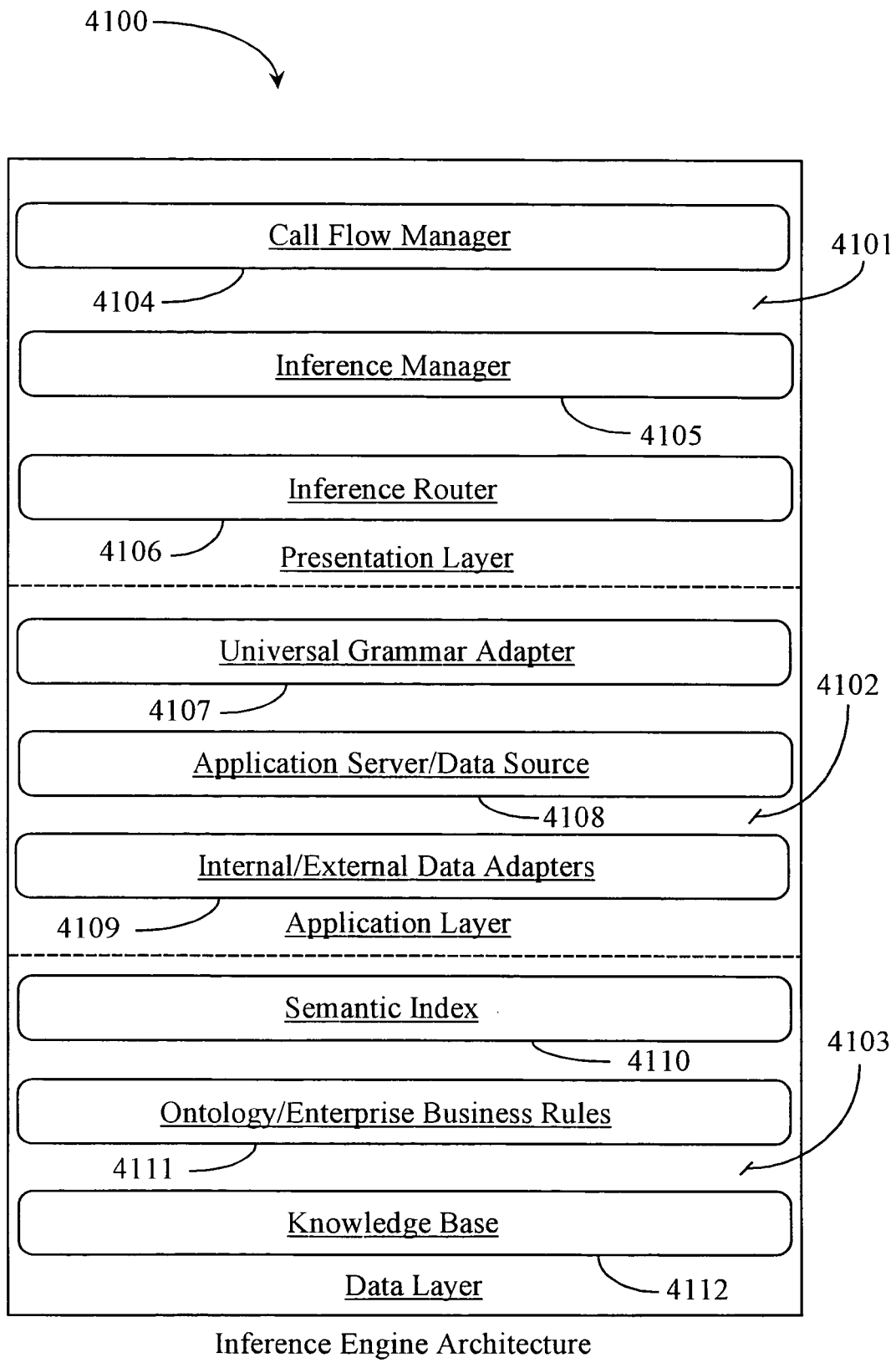
FIG. 41 is a block diagram illustrating components of an inference engine according to an embodiment of the present invention.

FIG. 41 is a block diagram 4100 illustrating components of an inference engine according to an embodiment of the present invention. Block diagram 4100 represents a logical view of several components, some of which may be distributed to machine other than a host machine in a networked environment. The inventor illustrates the components associated with software layers as a single architecture for illustrative purposes only. Architecture 4100 is analogous to IE 3427 and 3428 of FIG. 34 above with the understanding that in actual deployment several machines may be utilized to host different components without departing from the spirit and scope of the present invention.

Architecture 4100 has a presentation layer 4101, an application layer 4102, and a data layer 4103. Presentation layer 4101 is adapted to control delivery of dialog, and to manage and route inference states. A call flow manager 4104 is provided within layer 4101 and is adapted to manage call flow during a live session including delivery of inference dialog in place of normal voice application dialog when an inference is successfully executed during the course of a call. In case of an inference, call flow manager 4104 introduces any inference computation into a call flow.

An inference manager 4105 is provided within presentation layer 4101 and is adapted to manage inference targets in a call flow, more specifically pre and post transaction inference points or trigger points. At each trigger point, the inference engine is called and a computation is performed to decide whether there is enough information available at that time in the call flow to make an inference. The computation compares statistical results taken from raw historical and/or real time session data about a caller's activity or current state and compares those statistics against a packaged inference data model, which includes elements illustrated within data layer 4103. An inference may be a session inference, a historical inference, or a historical cross inference. A session inference causes a dialog generation and deployment based on collection and analysis of real time data available to the system during the course of a live session. A historical inference causes dialog generation and deployment based on analysis of persistent historical data. A historical cross-inference causes generation and deployment of dialog based on an aggregated historical data set common to more than on or a group of callers. An inference may also be generated based on both real time data and historical data known about a caller.

Data layer 4103 may be thought of as an inference model. Data layer 4103 has a semantic index 4110, an ontology set 4111, which in this example includes enterprise business rules governing the inference decision process and ultimate dialog generation and delivery parameters. Data layer 4103 also contains a knowledge base 4112. Data layer 4103 is analogous to the repositories connected to application server 3415 of FIG. 34 above.

Referring back to layer 4101, an inference router 4106 is provided and adapted to route selected inference dialogs to be used in the appropriate active call flow of a live session. It will be appreciated that there will be many live sessions ongoing at a same time period in actual practice of the invention. Likewise, sessions that are ongoing may be in different stages of progress and may use different dialog sequences of a voice application and, in some cases different voice applications.

Application layer 4102 supports a universal grammar adapter (UGA) 4107 adapted to convert AXML into a universal grammar script (UGS) that may be transformed into one of several existing script languages using a transformation language like XSLT. In one embodiment of the invention UGA 4107 is used to create new voice application scripts that may be used in one or more than one leased TTS/STT engine.

Application layer 4102 has one or more internal/external data adapters 4109 provided therein and adapted in a multi-modal sense to convert data between normally disparate platforms used in a single or existing between two separate enterprises.

In one embodiment of the present invention, inference engine capability is integrated with the capabilities of the behavioral adaptation engine 2801 described with reference to FIG. 28 above.

Figure 42:
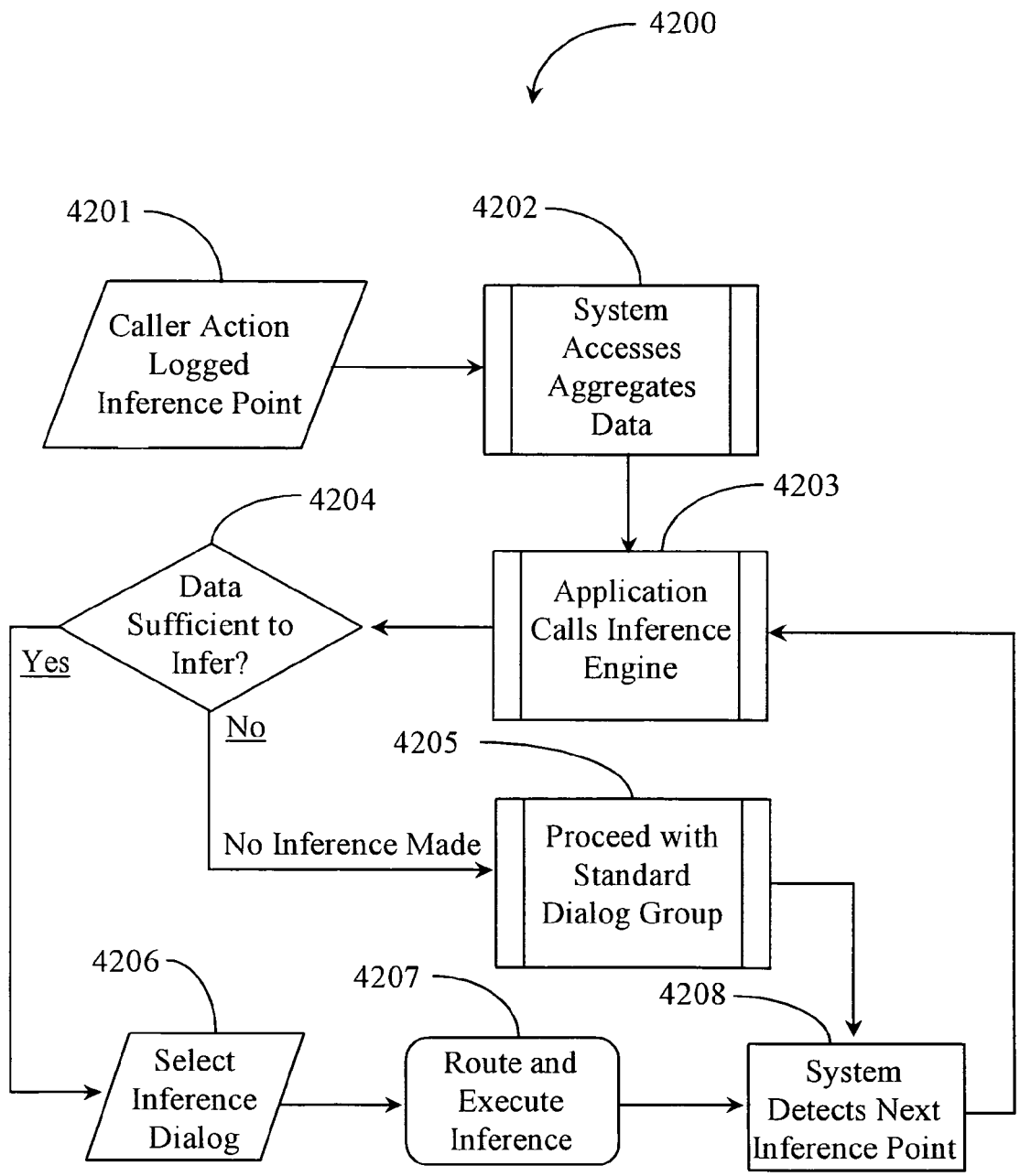
FIG. 42 is a process flow diagram illustrating steps for executing an inference action during a client/system session according to an embodiment of the present invention.

FIG. 42 is a process flow diagram 4200 illustrating steps for executing an inference action during a client/system session according to an embodiment of the present invention. At step 4201, a caller action is logged at an inference point. An action may be that the caller has just accesses the system and has been identified to the system. An action may be logged at some other point in a call flow before or after a transaction point. One call flow may have multiple inference points. At step 4202, the system accesses and aggregates data about the client, which may simply involve detection of and access of statistical values related to historical activity or real time data collected from voice systems like caller identification data, call purpose information, and any real time session data previously given by the caller in the same session.

At an inference point, which is predetermined in a call flow, the application calls an inference engine analogous to engines 3427 and 3428 of FIG. 34. At step 4204, the system decides whether there is sufficient data to trigger an inference. At step 4204 a computation is made, in a preferred embodiment, the results of which will either trigger an inference action or not. If at step 4204 it is decided that no inference will be executed, then at step 4205 the system proceeds with the standard dialog group of the voice application running during the session. At step 4208, the system detects the next predetermined inference point and the process resolves back to step 4203.

If at step 4204, the system decides that there is sufficient evidence to run an inference then at step 4206 an inference dialog or dialog group is selected for execution. The computation made at step 4204 may involve detecting a data statistic related to the nature of the call flow, comparing the data values against a packaged inference model, which may contain a threshold value, for example of a statistic that when breached triggers an actual inference dialog selection at step 4206. An example might be if it is found that a client asks for a particular option among more than one option offered in the previous system prompt 70% of the time according to historical data. The threshold value for causing an inference based on this data may be 60%. In this case an inference would be run and the system would select the inference dialog over the next standard dialog to route to the session. At step 4204 the computation may also consider all evidence factors in deciding if a planned inference will be a session inference, a historical inference, or a historical cross inference.

At step 4207, assuming inference, the system executes the inference dialog and inserts it into the call flow. The inference dialog may widely vary from the standard dialog and may cause the voice application to take on a whole new direction. In a preferred application there are pre-transaction inference points and post-transaction inference points. It may be assumed that an inference dialog leads to a transaction point defined as an achievement of a particular goal. A transaction may be simply defined as asking for and receiving some information parameter. A transaction may include the necessary steps for effecting a purchase agreement for one or more products. Any time a particular goal of the enterprise is realized it may be considered a transaction.

At step 4208, the system detects the next inference point and the process resolves back to step 4203. An inference engine may be called at every inference point detected in a call flow of a session in progress. In one embodiment, data about the caller may be aggregated in real time as it becomes available, but may not necessarily be cause to trigger an inference until there is enough data to warrant one.

In one embodiment of the present invention, inference dialog is generated on the fly based on the nature of the inference run at a particular point in a call flow. For example, a generated dialog might be a splice of two existing dialogs. In some cases where a rich semantic based is used, a dialog may be constructed by selecting incomplete phrases that when combined produce the desired dialog.

The method and apparatus of the present invention may be applied to any voice-enabled portal system capable of speech to text and text to speech rendering. There are no network constraints on application of the invention as the voice portal may be a CTI enabled IVR maintained on a telephony network, or a voice server maintained on a data-packet-network (DPN). There are many architectural possibilities.

Further to the above, the methods and apparatus of the present invention may be provided with all or a combination of the components described and with integration to other components described in one or more of the specifications reference herein without departing from the spirit and scope of the present invention.

The method and apparatus of the invention should be afforded to broadest interpretation under examination in view of the many possible embodiments and uses. The spirit and scope of the invention is limited only be the claims that follow.

What is claimed is:

1. A voice application creation and deployment system comprising:
   a voice application sewer to create and serve voice applications to clients over a communication network;
   at least one voice portal node coupled to the communication network, the portal node to facilitate client interaction with the voice applications; and
   an inference engine executable from the voice application server, wherein
   the inference engine is activated at one or more predetermined points of an ongoing voice interaction, wherein the inference engine is configured to determine whether an inference of client need can be performed, this determination being based on analysis of real-time client data related to the interaction during a pre-determined point in an active call flow of the served voice application and further based on analysis of historical data associated with client interaction, the inference engine further configured to determine which inference dialog is executed and inserted into the call flow if an inference is appropriate.

2. The system of claim 1 wherein the communications network is the Internet network.

3. The system of claim 1 wherein the communications network is a combination of an Internet and telephony network.

4. The system of claim 1 wherein the inference engine is part of the application logic maintained in the voice application server.

5. The system of claim 1 wherein the at least one voice portal is an interactive voice response system combined with a telephony server.

6. The system of claim 1 wherein the at least one voice portal is a computerized node connected to a data network having access to the Internet.

7. The system of claim 1 wherein the inference engine is called at pre-determined points in a call flow of an interaction using a voice application.

8. The system of claim 1 wherein the inference engine uses session information and historical data collected about a caller to determine if an inference should be executed.

9. The system of claim 1 further comprising a universal grammar adapter adapted to produce universal grammar script from a specialized input, the script transformable into any one of a plurality of scripting languages supported by and referred to as a specification parameter of a speech-to-text or text-to-speech engine.

10. The system of claim 1 wherein the inference dialogs are multi part composites of separate dialogs.

11. The system of claim 1 wherein the related data includes at least one of caller line identification, caller number identification, and caller history data.

12. The system of claim 1 wherein the related data is mined for statistics that are compared with an inference model to determine a particular inference.

13. The system of claim 1 further comprising an inference model, including an ontology set and a semantic index.

14. The system of claim 1 wherein the inference engine causes generation of voice dialog from a base of semantics.

15. The system of claim 1 wherein the inference engine causes an inference to occur at more than one time during the course of an interaction.

* * * * *